United States Patent
Nakao et al.

(10) Patent No.: US 12,394,434 B2
(45) Date of Patent: *Aug. 19, 2025

(54) MAGNETIC HEAD, MAGNETIC TAPE, MAGNETIC TAPE CARTRIDGE, MAGNETIC TAPE DRIVE, AND MAGNETIC TAPE READING METHOD

(71) Applicant: FUJIFILM Corporation, Tokyo (JP)

(72) Inventors: Toru Nakao, Kanagawa (JP); Tetsuya Kaneko, Kanagawa (JP); Yoichi Akano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/768,256

(22) Filed: Jul. 10, 2024

(65) Prior Publication Data

US 2024/0363142 A1    Oct. 31, 2024

Related U.S. Application Data

(63) Continuation of application No. 18/171,919, filed on Feb. 21, 2023, now Pat. No. 12,068,011.

(30) Foreign Application Priority Data

Mar. 29, 2022   (JP) .................. 2022-054513

(51) Int. Cl.
  *G11B 5/55*   (2006.01)
  *G11B 5/592*  (2006.01)
(52) U.S. Cl.
  CPC .......... *G11B 5/5508* (2013.01); *G11B 5/5928* (2013.01)

(58) Field of Classification Search
  CPC ....... G11B 5/584; G11B 5/09; G11B 5/00826; G11B 5/265; G11B 5/2651; G11B 5/2652;
  (Continued)

(56) References Cited

U.S. PATENT DOCUMENTS

| 6,088,184 A | 7/2000 | Hu |
| 7,342,738 B1 | 3/2008 | Anderson |

(Continued)

FOREIGN PATENT DOCUMENTS

JP   2008-146818 A   6/2008

OTHER PUBLICATIONS

Extended European Search Report dated Aug. 22, 2023, issued in European Application No. 23164138.2.

*Primary Examiner* — Nabil Z Hindi
(74) *Attorney, Agent, or Firm* — Sughrue Mion, PLLC

(57) ABSTRACT

A magnetic head includes a first servo reading element pair, a second servo reading element pair, and a plurality of magnetic elements. The first servo reading element pair consists of a first servo reading element and a second servo reading element, the second servo reading element pair consists of a third servo reading element and a fourth servo reading element, the first servo reading element and the third servo reading element are disposed on one end side of the plurality of magnetic elements and read one servo band of the pair of servo bands, and the second servo reading element and the fourth servo reading element are disposed on the other end side of the plurality of magnetic elements and read the other servo band of the pair of servo bands.

6 Claims, 37 Drawing Sheets

(58) Field of Classification Search
CPC ........... G11B 5/29; G11B 5/56; G11B 5/4893; G11B 20/20; G11B 5/59633; G11B 15/444; G11B 5/5517; G11B 5/00817; G11B 27/36; G11B 5/78; G11B 5/59688
USPC ..................................................... 360/77.04
See application file for complete search history.

(56) References Cited

U.S. PATENT DOCUMENTS

| | | |
|---|---|---|
| 9,251,827 B2 * | 2/2016 | Cherubini .............. G11B 5/584 |
| 2008/0137235 A1 | 6/2008 | Biskeborn et al. |
| 2009/0027803 A1 | 1/2009 | Biskeborn et al. |
| 2015/0318006 A1 | 11/2015 | Cherubini et al. |

* cited by examiner

FIG.7
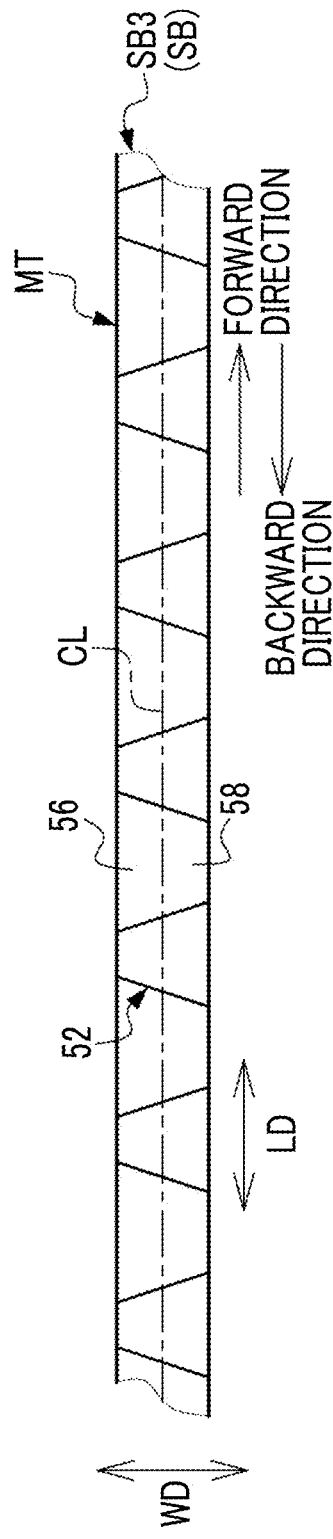
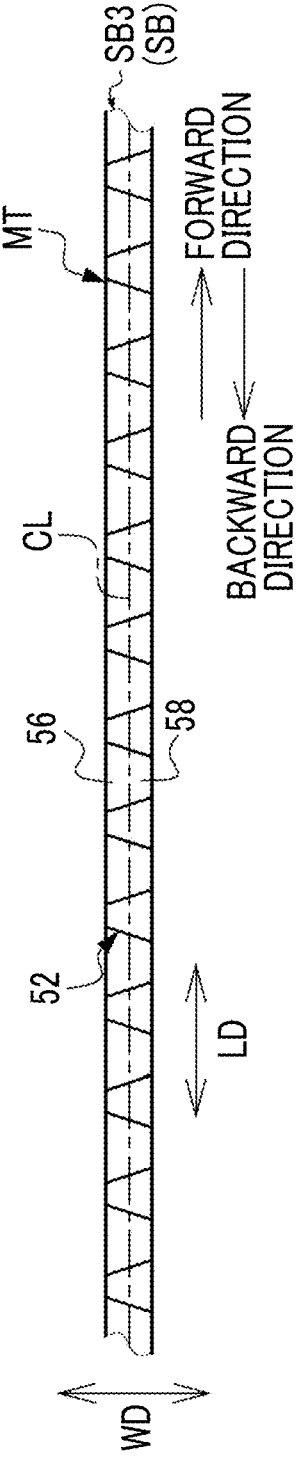

MAGNETIC HEAD, MAGNETIC TAPE, MAGNETIC TAPE CARTRIDGE, MAGNETIC TAPE DRIVE, AND MAGNETIC TAPE READING METHOD

CROSS-REFERENCE TO RELATED APPLICATIONS

This application is a continuation of U.S. patent application Ser. No. 18/171,919, filed on Feb. 21, 2023, which claims priority under 35 USC 119 from Japanese Patent Application No. 2022-054513 filed on Mar. 29, 2022, the disclosure of which is incorporated by reference herein.

BACKGROUND

1. Technical Field

The technology of the present disclosure relates to a magnetic head, a magnetic tape, a magnetic tape cartridge, a magnetic tape drive, and a magnetic tape reading method.

2. Related Art

JP2008-146818A discloses a tape head for converting data on a magnetic recording tape that is subjected to a tape dimension change. The tape head disclosed in JP2008-146818A includes an array of two or more transducer elements having different transducer interval distances corresponding to different track interval distances to be converted.

JP2008-146818A discloses a method of writing the data on the magnetic recording tape simultaneously with the absorption of the tape dimension change. The method disclosed in JP2008-146818A includes a step of causing a tape to flow from one end to the other end of the tape head including the array of two or more transducer elements having different transducer interval distances corresponding to different track interval distances to be converted, a step of deciding a dimension condition of the tape, and a step of selecting one of transducer arrays for performing the conversion in accordance with which of the transducer interval distances most closely matches the dimension condition of the tape.

JP2008-146818A discloses the tape head for converting data on the magnetic recording tape that is subjected to the tape dimension change in a tape drive. The tape head disclosed in JP2008-146818A includes a plurality of tape head modules. Each tape head module includes a first array of transducer elements having transducer elements disposed at intervals from each other by a first transducer interval distance that corresponds to a nominal tape track interval distance, a second array of transducer elements disposed at intervals from each other by a second transducer interval distance that corresponds to a reduced tape track interval distance caused by tape contraction, and a third array of transducer elements disposed at intervals from each other by a third transducer interval distance that corresponds to an enlarged tape track interval distance caused by tape expansion, in which the arrays are disposed at intervals from each other in a cross-track direction.

SUMMARY

One embodiment according to the technology of the present disclosure provides a magnetic head, a magnetic tape, a magnetic tape cartridge, a magnetic tape drive, and a magnetic tape reading method capable of realizing magnetic processing on a data band of a magnetic tape having a common servo band width even in a case in which the number of channels is different.

A first aspect according to the technology of the present disclosure relates to a magnetic head comprising a first servo reading element pair that reads a pair of servo bands adjacent to each other via a data band having a plurality of tracks from a magnetic tape in which the data band and the pair of servo bands are formed, a second servo reading element pair that reads the pair of servo bands at a timing different from a timing of the first servo reading element pair, and a plurality of magnetic elements that are disposed in a straight line and perform magnetic processing on a track in accordance with a reading result of the first servo reading element pair or the second servo reading element pair among the plurality of tracks, in which the first servo reading element pair consists of a first servo reading element and a second servo reading element, the second servo reading element pair consists of a third servo reading element and a fourth servo reading element, the first servo reading element and the third servo reading element are disposed on one end side of the plurality of magnetic elements and read one servo band of the pair of servo bands, and the second servo reading element and the fourth servo reading element are disposed on the other end side of the plurality of magnetic elements and read the other servo band of the pair of servo bands.

A second aspect according to the technology of the present disclosure relates to the magnetic head according to the first aspect, in which the data band is divided into two regions, a forward region and a reverse region, along a width direction of the magnetic tape, the first servo reading element pair reads the pair of servo bands in a case in which the plurality of magnetic elements perform the magnetic processing on the forward region, and the second servo reading element pair reads the pair of servo bands in a case in which the plurality of magnetic elements perform the magnetic processing on the reverse region.

A third aspect according to the technology of the present disclosure relates to the magnetic head according to the second aspect, in which the first servo reading element reads a region that exceeds half of the one servo band in the width direction of the magnetic tape and the second servo reading element reads a region that exceeds half of the other servo band in the width direction of the magnetic tape in a case in which the plurality of magnetic elements perform the magnetic processing on the forward region.

A fourth aspect according to the technology of the present disclosure relates to the magnetic head according to the second or third aspect, in which the third servo reading element reads a region that exceeds half of the one servo band in the width direction of the magnetic tape and the fourth servo reading element reads a region that exceeds half of the other servo band in the width direction of the magnetic tape in a case in which the plurality of magnetic elements perform the magnetic processing on the reverse region.

A fifth aspect according to the technology of the present disclosure relates to the magnetic head according to any one of the first to fourth aspects, in which the servo band is divided into two regions, a first region and a second region, along a width direction of the magnetic tape, the data band is divided into two regions, a forward region and a reverse region, along the width direction of the magnetic tape, the first servo reading element pair reads the first region in a case in which the plurality of magnetic elements perform the magnetic processing on the forward region, and the first servo reading element pair reads the second region in a case in which the plurality of magnetic elements perform the magnetic processing on the reverse region.

A sixth aspect according to the technology of the present disclosure relates to the magnetic head according to any one of the first to fifth aspects, in which the first servo reading element pair out of the first servo reading element pair and the second servo reading element pair reads the pair of servo bands in a case in which the number of the plurality of magnetic elements corresponds to a first number of channels, and the first servo reading element pair and the second servo reading element pair read the pair of servo bands at different timings in a case in which the number of the plurality of magnetic elements corresponds to a second number of channels, which is half of the first number of channels.

A seventh aspect according to the technology of the present disclosure relates to the magnetic head according to the sixth aspect, in which the servo band is divided into two regions, a first region and a second region, along a width direction of the magnetic tape, the data band is divided into two regions, a forward region and a reverse region, along the width direction of the magnetic tape, the first servo reading element pair reads the first region in a case in which the number of the plurality of magnetic elements corresponds to the first number of channels and the plurality of magnetic elements perform the magnetic processing on the forward region, and the first servo reading element pair reads the second region in a case in which the number of the plurality of magnetic elements corresponds to the first number of channels and the plurality of magnetic elements perform the magnetic processing on the reverse region.

An eighth aspect according to the technology of the present disclosure relates to the magnetic head according to the sixth or seventh aspect, in which the data band is divided into two regions, a forward region and a reverse region, along a width direction of the magnetic tape, the first servo reading element pair reads the pair of servo bands in a case in which the number of the plurality of magnetic elements corresponds to the second number of channels and the plurality of magnetic elements perform the magnetic processing on the forward region, and the second servo reading element pair reads the pair of servo bands in a case in which the number of the plurality of magnetic elements corresponds to the second number of channels and the plurality of magnetic elements perform the magnetic processing on the reverse region.

A ninth aspect according to the technology of the present disclosure relates to the magnetic head according to any one of the first to fifth aspects, in which the number of the plurality of magnetic elements corresponds to a first number of channels, all the plurality of magnetic elements are activated in a case in which the number of the plurality of tracks corresponds to the first number of channels, and only the magnetic elements as many as the number corresponding to a second number of channels, which is half of the first number of channels, among the plurality of magnetic elements are activated in a case in which the number of the plurality of tracks corresponds to the second number of channels.

A tenth aspect according to the technology of the present disclosure relates to the magnetic head according to any one of the sixth to ninth aspects. In the magnetic head according to the tenth aspect according to the technology of the present disclosure, the first number of channels is 64 channels, and the second number of channels is 32 channels.

An eleventh aspect according to the technology of the present disclosure relates to a magnetic tape in which the data band and the pair of servo bands read by the magnetic head according to any one of the first to tenth aspects are formed.

A twelfth aspect according to the technology of the present disclosure relates to the magnetic tape according to the eleventh aspect, in which the pair of servo bands is shared in a plurality of numbers of channels.

A thirteenth aspect according to the technology of the present disclosure relates to the magnetic tape according to the twelfth aspect. In the magnetic tape according to the thirteenth aspect according to the technology of the present disclosure, the plurality of numbers of channels are 32 channels and 64 channels.

A fourteenth aspect according to the technology of the present disclosure relates to the magnetic tape according to the thirteenth aspect. In the magnetic tape according to the fourteenth aspect according to the technology of the present disclosure, a length of the servo band in a width direction of the magnetic tape is a length common to a case in which the number of the plurality of magnetic elements corresponds to 32 channels and a case in which the number of the plurality of magnetic elements corresponds to 64 channels.

A fifteenth aspect according to the technology of the present disclosure relates to the magnetic tape according to the fourteenth aspect, in which the servo band is read by the first servo reading element pair in a case in which the number of the plurality of magnetic elements corresponds to 32 channels and the magnetic processing on the data band is performed in a forward direction, and the servo band is read by the second servo reading element pair in a case in which the number of the plurality of magnetic elements corresponds to 32 channels and the magnetic processing on the data band is performed in a reverse direction.

A sixteenth aspect according to the technology of the present disclosure relates to the magnetic tape according to the fourteenth or fifteenth aspect, in which one region obtained by dividing the servo band into two regions in the width direction of the magnetic tape is read by the first servo reading element pair in a case in which the number of the plurality of magnetic elements corresponds to 64 channels and the magnetic processing on the data band is performed in a forward direction, and the other region obtained by dividing the servo band into two regions in the width direction of the magnetic tape is read by the first servo reading element pair in a case in which the number of the plurality of magnetic elements corresponds to 64 channels and the magnetic processing on the data band is performed in a reverse direction A seventeenth aspect according to the technology of the present disclosure relates to a magnetic tape cartridge comprising the magnetic tape according to any one of the eleventh to sixteenth aspects accommodated therein.

An eighteenth aspect according to the technology of the present disclosure relates to a magnetic tape drive comprising the magnetic head according to any one of the first to tenth aspects, and a control device that controls the magnetic tape and the magnetic head.

A nineteenth aspect according to the technology of the present disclosure relates to a magnetic tape reading method comprising, in a magnetic head including a first servo reading element pair that reads a pair of servo bands adjacent to each other via a data band having a plurality of tracks from a magnetic tape in which the data band and the pair of servo bands are formed, a second servo reading element pair that reads the pair of servo bands at a timing different from a timing of the first servo reading element pair, and a plurality of magnetic elements that are disposed in a straight line and perform magnetic processing on a track in accordance with a reading result of the first servo reading element pair or the second servo reading element pair among the plurality of tracks, in which the first servo reading element pair consists of a first servo reading element and a second servo reading element, and the second servo reading element pair consists of a third servo reading element and a fourth servo reading element, reading one servo band of the pair of servo bands by the first servo reading element and the third servo reading element which are disposed on one end side of the plurality of magnetic elements, and reading the other servo band of the pair of servo bands by the second servo reading element and the fourth servo reading element which are disposed on the other end side of the plurality of magnetic elements.

A twentieth aspect according to the technology of the present disclosure relates to the magnetic tape reading method according to the nineteenth aspect, in which the data band is divided into two regions, a forward region and a reverse region, along a width direction of the magnetic tape, and the magnetic tape reading method further comprises reading the pair of servo bands by the first servo reading element pair in a case in which the plurality of magnetic elements perform the magnetic processing on the forward region, and reading the pair of servo bands by the second servo reading element pair in a case in which the plurality of magnetic elements perform the magnetic processing on the reverse region.

A twenty-first aspect according to the technology of the present disclosure relates to the magnetic tape reading method according to the twentieth aspect, further comprising reading a region that exceeds half of the one servo band in the width direction of the magnetic tape by the first servo reading element and reading a region that exceeds half of the other servo band in the width direction of the magnetic tape by the second servo reading element in a case in which the plurality of magnetic elements perform the magnetic processing on the forward region.

A twenty-second aspect according to the technology of the present disclosure relates to the magnetic tape reading method according to the twentieth or twenty-first aspect, further comprising reading a region that exceeds half of the one servo band in the width direction of the magnetic tape by the second servo reading element and reading a region that exceeds half of the other servo band in the width direction of the magnetic tape by the fourth servo reading element in a case in which the plurality of magnetic elements perform the magnetic processing on the reverse region.

A twenty-third aspect according to the technology of the present disclosure relates to the magnetic tape reading method according to any one of the nineteenth to twenty-second aspects, in which the servo band is divided into two regions, a first region and a second region, along a width direction of the magnetic tape, the data band is divided into two regions, a forward region and a reverse region, along the width direction of the magnetic tape, and the magnetic tape reading method further comprises reading the first region by the first servo reading element pair in a case in which the plurality of magnetic elements perform the magnetic processing on the forward region, and reading the second region by the first servo reading element pair in a case in which the plurality of magnetic elements perform the magnetic processing on the reverse region.

A twenty-fourth aspect according to the technology of the present disclosure relates to the magnetic tape reading method according to any one of the nineteenth to twenty-third aspects, further comprising reading the pair of servo bands by the first servo reading element pair out of the first servo reading element pair and the second servo reading element pair in a case in which the number of the plurality of magnetic elements corresponds to a first number of channels, and reading the pair of servo bands at different timings by the first servo reading element pair and the second servo reading element pair in a case in which the number of the plurality of magnetic elements corresponds to a second number of channels, which is half of the first number of channels.

A twenty-fifth aspect according to the technology of the present disclosure relates to the magnetic tape reading method according to the twenty-fourth aspect, in which the servo band is divided into two regions, a first region and a second region, along a width direction of the magnetic tape, the data band is divided into two regions, a forward region and a reverse region, along the width direction of the magnetic tape, and the magnetic tape reading method further comprises reading the first region by the first servo reading element pair in a case in which the number of the plurality of magnetic elements corresponds to the first number of channels and the plurality of magnetic elements perform the magnetic processing on the forward region, and reading the second region by the first servo reading element pair in a case in which the number of the plurality of magnetic elements corresponds to the first number of channels and the plurality of magnetic elements perform the magnetic processing on the reverse region.

A twenty-sixth aspect according to the technology of the present disclosure relates to the magnetic tape reading method according to the twenty-fourth or twenty-fifth aspect, in which the data band is divided into two regions, a forward region and a reverse region, along a width direction of the magnetic tape, and the magnetic tape reading method further comprises reading the pair of servo bands by the first servo reading element pair in a case in which the number of the plurality of magnetic elements corresponds to the second number of channels and the plurality of magnetic elements perform the magnetic processing on the forward region, and reading the pair of servo bands by the second servo reading element pair in a case in which the number of the plurality of magnetic elements corresponds to the second number of channels and the plurality of magnetic elements perform the magnetic processing on the reverse region.

A twenty-seventh aspect according to the technology of the present disclosure relates to the magnetic tape reading method according to any one of the nineteenth to twenty-third aspects, in which the number of the plurality of magnetic elements corresponds to a first number of channels, and the magnetic tape reading method further comprises activating all the plurality of magnetic elements in a case in which the number of the plurality of tracks corresponds to the first number of channels, and activating only the magnetic elements as many as the number corresponding to a second number of channels, which is half of the first number of channels, among the plurality of magnetic elements in a case in which the number of the plurality of tracks corresponds to the second number of channels.

A twenty-eighth aspect according to the technology of the present disclosure relates to the magnetic tape reading method according to any one of the twenty-fourth to twenty-seventh aspects, in which the first number of channels is 64 channels, and the second number of channels is 32 channels.

BRIEF DESCRIPTION OF THE DRAWINGS

Exemplary embodiments of the technology of the disclosure will be described in detail based on the following figures, wherein:

FIG. 7 is a conceptual diagram showing an example of a servo band of an existing magnetic tape for 32 channels and an example of a servo band of a magnetic tape for 64 channels;

DETAILED DESCRIPTION

Hereinafter, examples of embodiments of a magnetic head, a magnetic tape, a magnetic tape cartridge, a magnetic tape drive, and a magnetic tape reading method according to the technology of the present disclosure will be described with reference to the accompanying drawings.

First, the terms used in the following description will be described.

CPU refers to an abbreviation of "central processing unit". NVM refers to an abbreviation of "non-volatile memory". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". USB refers to an abbreviation of "universal serial bus". ASIC refers to an abbreviation of "application specific integrated circuit". FPGA refers to an abbreviation of "field-programmable gate array". PLC refers to an abbreviation of "programmable logic controller". SoC refers to an abbreviation of "system-on-a-chip". IC refers to an abbreviation of "integrated circuit". RFID refers to an abbreviation of "radio frequency identifier". UI refers to an abbreviation of "user interface". WAN refers to an abbreviation of "wide area network". LAN refers to an abbreviation of "local area network". ch refers to an abbreviation of "channel". In addition, in the following description, the geometrical characteristic refers to a generally recognized geometrical characteristic, such as a length, a shape, an orientation, and/or a position.

Figure 1:
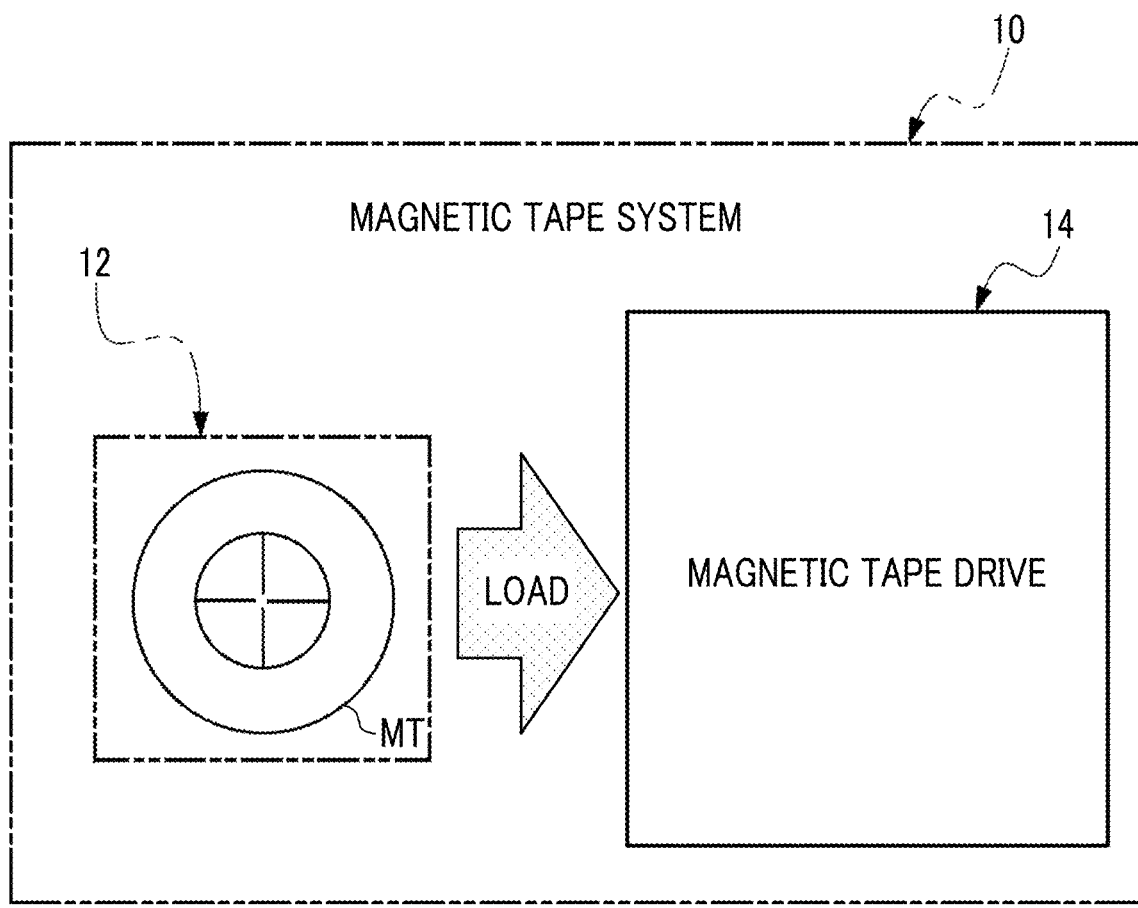
FIG. 1 is a block diagram showing an example of a configuration of a magnetic tape system.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
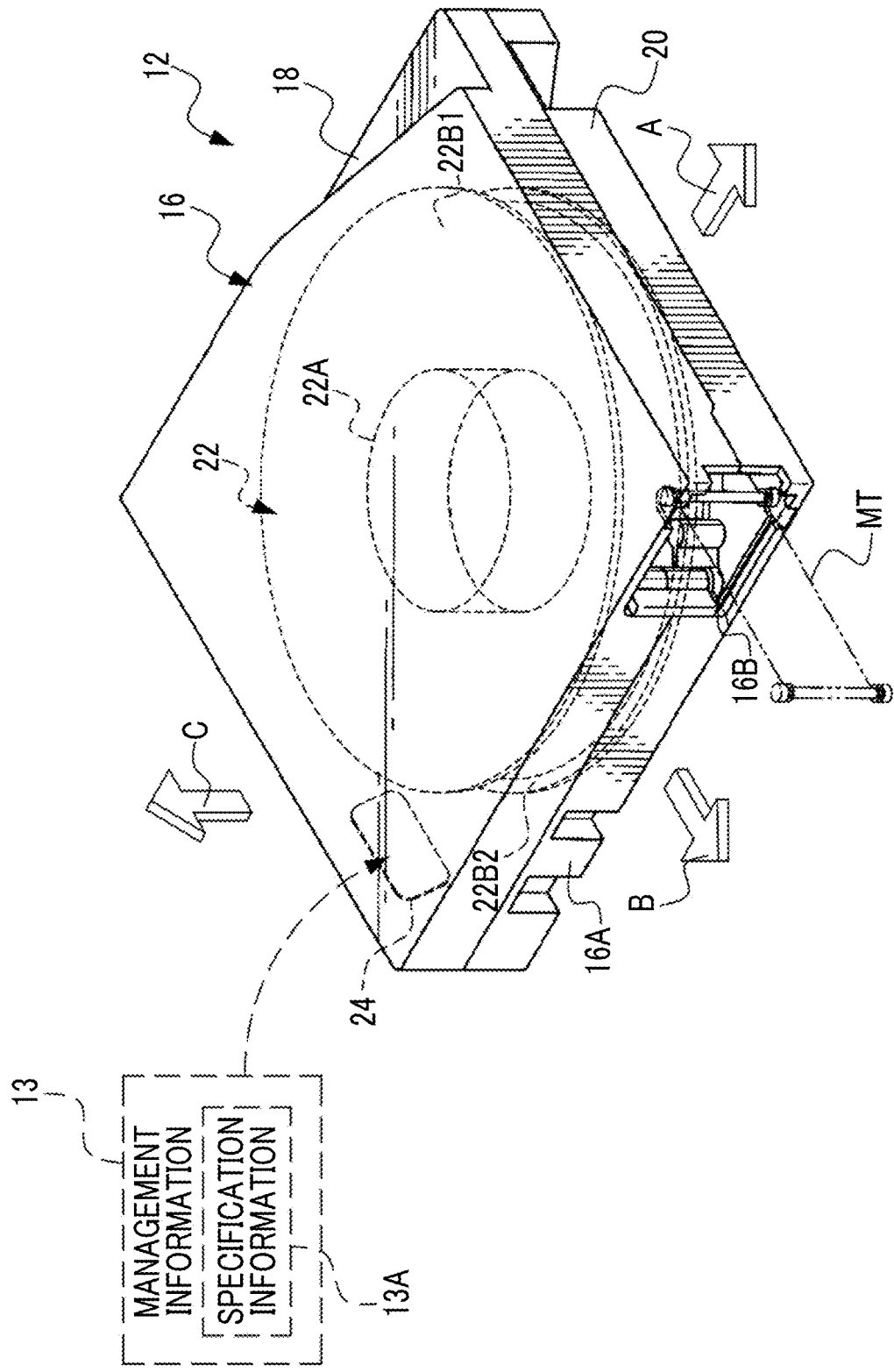
FIG. 2 is a schematic perspective view of an example of an appearance of a magnetic tape cartridge.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is an axial center portion of the sending reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A.

It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner. It should be noted that, in the present embodiment, the form example has been described in which the cartridge memory 24 is provided in the lower case 20, but the technology of the present disclosure is not limited to this, and the cartridge memory 24 need only be provided in the case 16 at a position at which various pieces of information can be read and written in a noncontact manner.

The cartridge memory 24 stores management information 13 for managing the magnetic tape cartridge 12. The management information 13 includes, for example, information on the cartridge memory 24 (for example, information for specifying the magnetic tape cartridge 12), information on the magnetic tape MT, and information on the magnetic tape drive 14 (for example, information that indicates specifications of the magnetic tape drive 14 and a signal used in the magnetic tape drive 14). The information on the magnetic tape MT includes specification information 13A. The specification information 13A is information for specifying the specifications of the magnetic tape MT. In addition, the information on the magnetic tape MT also includes information that indicates an outline of the data recorded in the magnetic tape MT, information that indicates an item of the data recorded in the magnetic tape MT, information that indicates a recording format of the data recorded in the magnetic tape MT, and the like.

Figure 3:
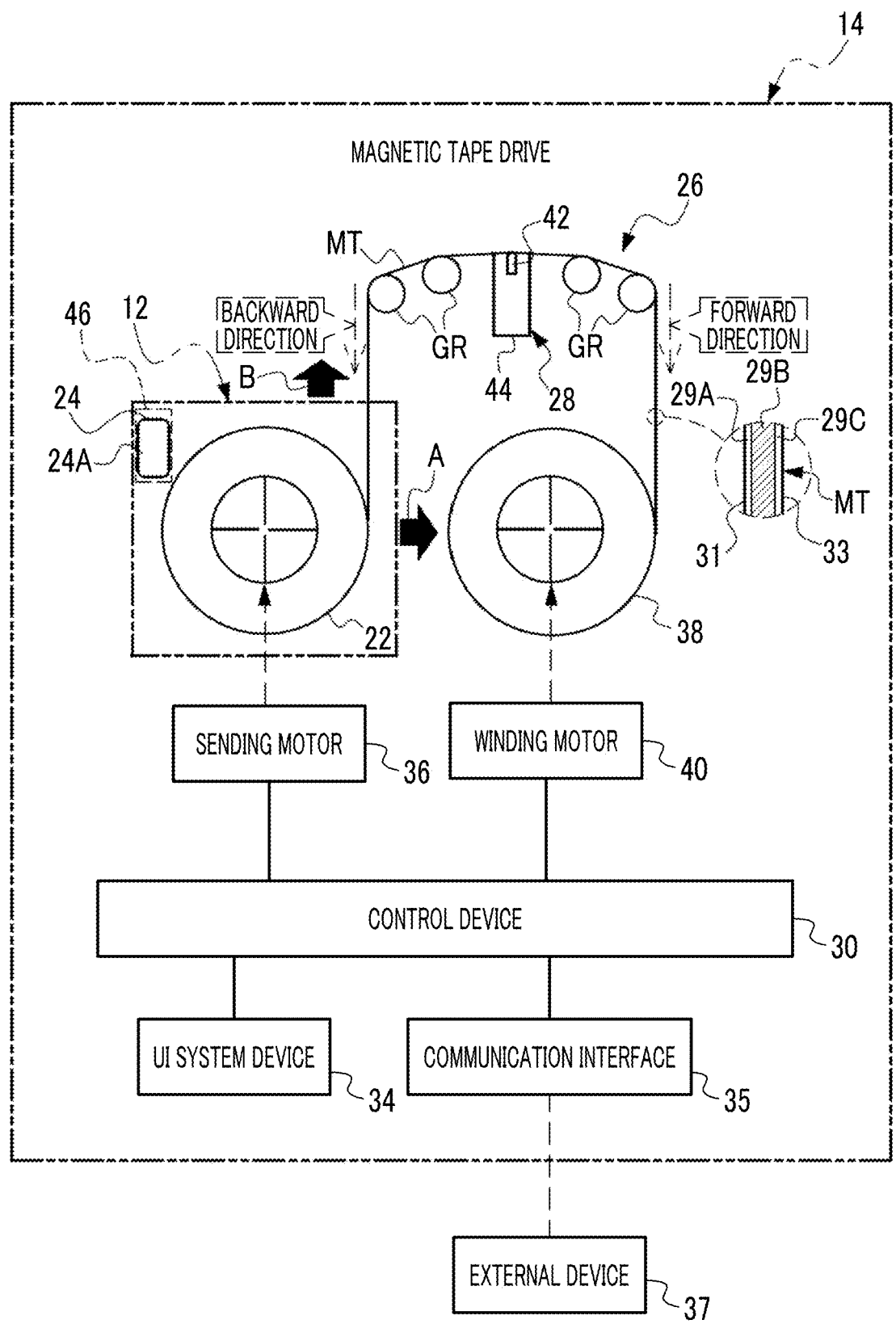
FIG. 3 is a schematic configuration diagram showing an example of a hardware configuration of a magnetic tape drive.

As an example, as shown in FIG. 3, the magnetic tape drive 14 comprises a transport device 26, a magnetic head 28, a control device 30, a UI system device 34, and a communication interface 35. In the present embodiment, the control device 30 is an example of a "control device" according to the technology of the present disclosure.

The magnetic tape drive 14 is loaded into the magnetic tape cartridge 12 along the direction of the arrow A. In the magnetic tape drive 14, the magnetic tape MT is pulled out from the magnetic tape cartridge 12 and used.

The control device 30 controls the entire magnetic tape drive 14. For example, the control device 30 controls the entire magnetic tape drive 14 (for example, the magnetic tape MT, the magnetic head 28, and the like) by using the management information 13 and the like stored in the cartridge memory 24.

In the present embodiment, although the control device 30 is realized by an ASIC, the technology of the present disclosure is not limited to this. For example, the control device 30 may be realized by an FPGA and/or a PLC. In addition, the control device 30 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device 30 may be realized by a combination of a hardware configuration and a software configuration.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The control device 30 causes the magnetic head 28 to perform magnetic processing in a state in which the magnetic tape MT travels. Here, the magnetic processing refers to recording the data (that is, writing the data) in the front surface 31 of the magnetic tape MT and reading the data (that is, reproducing the data) from the front surface 31 of the magnetic tape MT. In the present embodiment, the magnetic head 28 selectively performs recording the data in the front surface 31 of the magnetic tape MT and reading the data from the front surface 31 of the magnetic tape MT. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The UI system device 34 is a device having a reception function of receiving a command from a user and a presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the control device 30. The control device 30 acquires the command received by the UI system device 34. The UI system device 34 presents various pieces of information to the user under the control of the control device 30.

The communication interface 35 is connected to the control device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the control device 30) between the control device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT. The forward direction is an example of a "forward direction" according to the technology of the present disclosure, and the backward direction is an example of a "reverse direction" according to the technology of the present disclosure.

The sending motor 36 rotates the sending reel 22 in the magnetic tape cartridge 12 under the control of the control device 30. The control device 30 controls the sending motor 36 to control a rotation direction, a rotation speed, a rotation torque, and the like of the sending reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case in which the magnetic tape MT is wound by the winding reel 38, the control device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 30, the tension is applied to the magnetic tape MT. In addition, the tension applied to the magnetic tape MT is controlled by adjusting the rotation speed, the rotation torque, and the like of each of the sending motor 36 and the winding motor 40 by the control device 30.

It should be noted that, in a case in which the magnetic tape MT is rewound to the sending reel 22, the control device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 52 (see FIG. 6) and the data other than the servo pattern 52, that is, the data recorded in a data band DB (see FIG. 6).

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
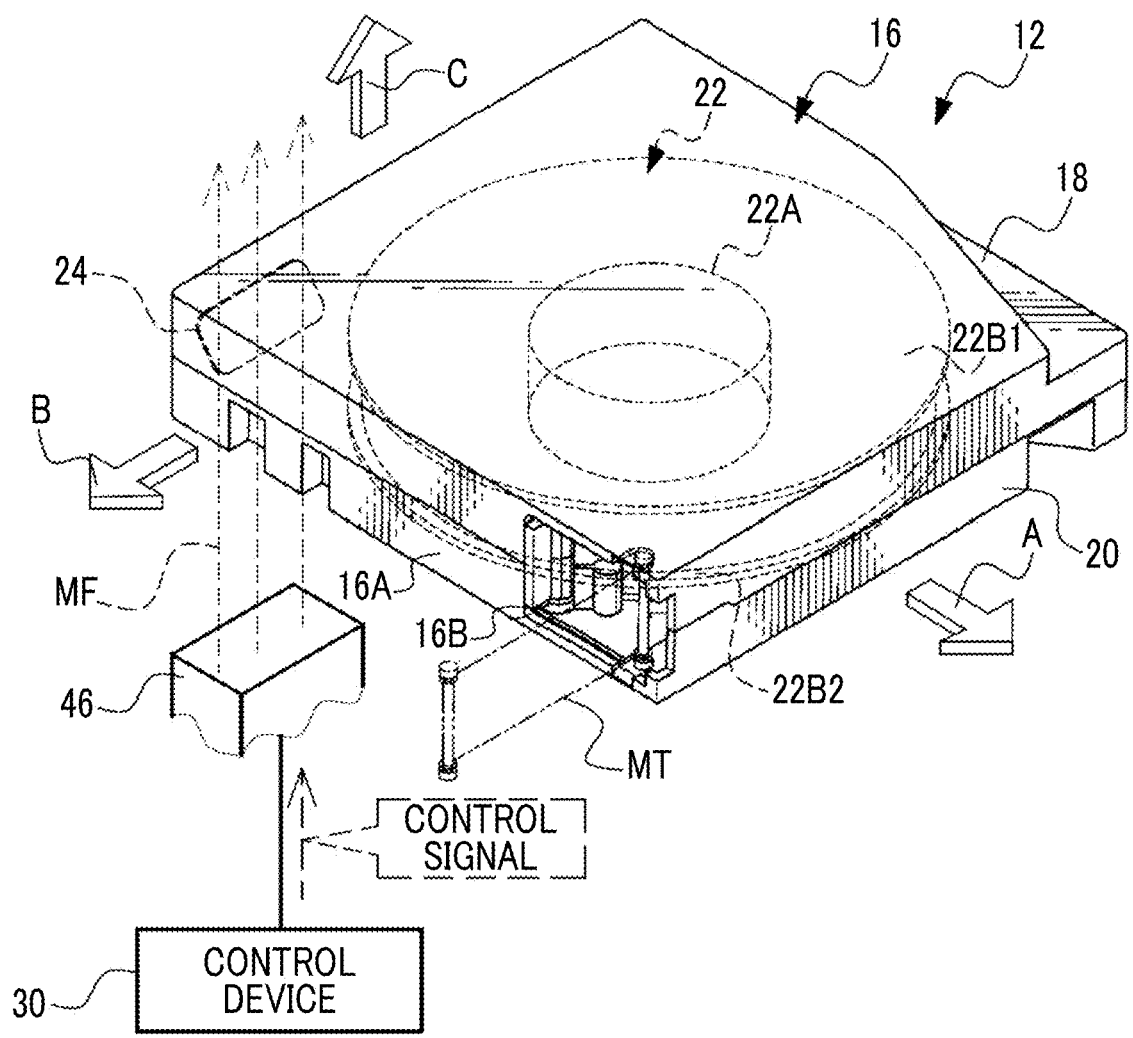
FIG. 4 is a schematic perspective view showing an example of an aspect in which a magnetic field is released by a noncontact read/write device from a lower side of the magnetic tape cartridge.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the control device 30. The control device 30 outputs a control signal to the noncontact read/write device 46. The control signal is a signal for controlling the cartridge memory 24. The noncontact read/write device 46 generates the magnetic field MF in response to the control signal input from the control device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the control signal.

For example, the noncontact read/write device 46 selectively performs, under the control of the control device 30, processing of reading the information from the cartridge memory 24 and processing of storing the information in the cartridge memory 24 (that is, processing of writing the information to the cartridge memory 24). In other words, the control device 30 reads the information from the cartridge memory 24 and stores the information in the cartridge memory 24 by performing communication with the cartridge memory 24 via the noncontact read/write device 46 in a noncontact manner.

Figure 5:
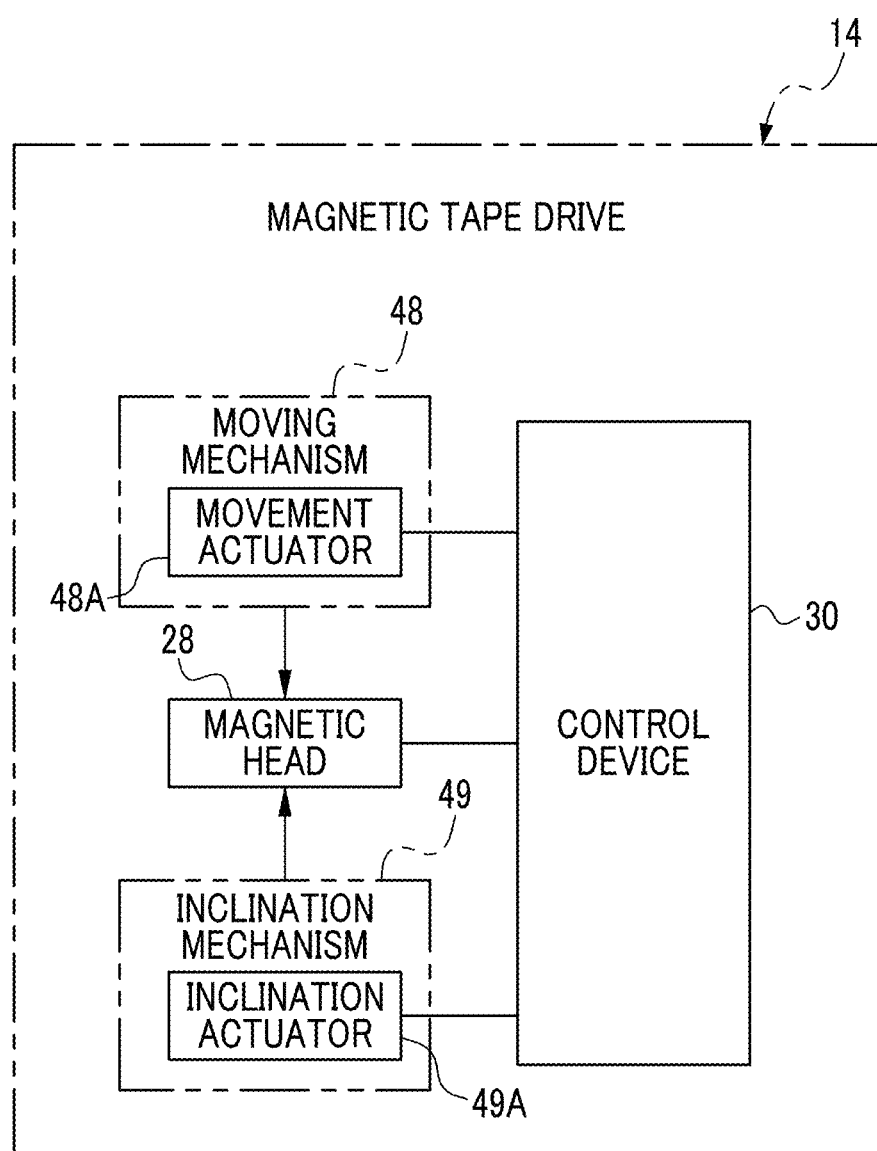
FIG. 5 is a schematic configuration diagram showing an example of the hardware configuration of the magnetic tape drive.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in a width direction WD (see FIG. 6) of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to a width direction WD of the magnetic tape MT by receiving the power generated by the inclination actuator 49A. That is, the magnetic head 28 is skewed on the magnetic tape MT by applying power from the inclination mechanism 49 under the control of the control device 30.

Figure 6:
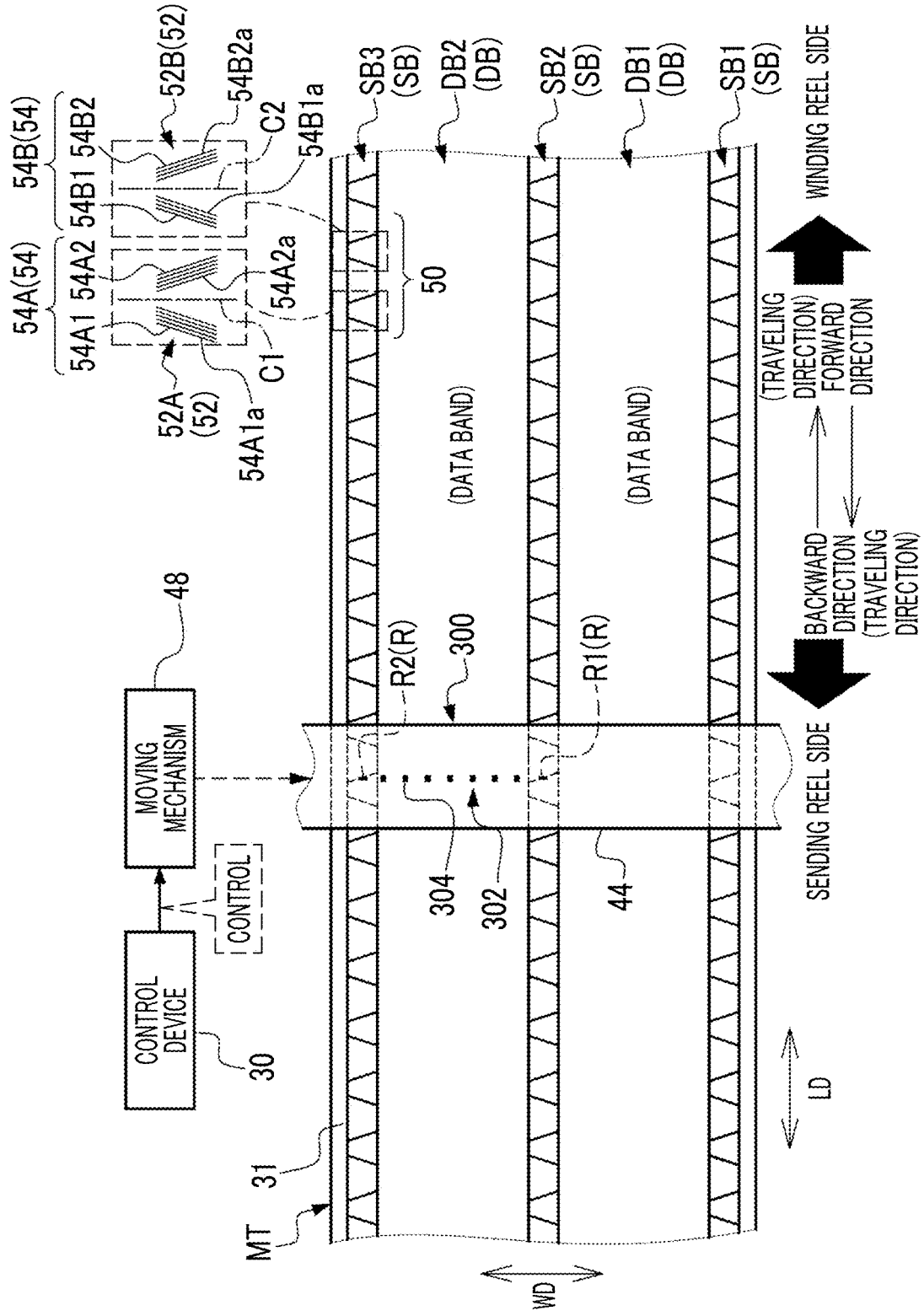
FIG. 6 is a conceptual diagram showing an example of a relative relationship between a magnetic tape and a magnetic head according to a related-art example in a case in which data is recorded in a data band or a signal in the data band is reproduced while the magnetic head travels on the magnetic tape.

As an example, as shown in FIG. 6, on the front surface 31 of the magnetic tape MT, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT. Here, the total length direction of the magnetic tape MT refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as "forward direction"), and the backward direction which is a direction in which the magnetic tape MT travels from the winding reel 38 side to the sending reel 22 side (hereinafter, also simply referred to as "backward direction").

The servo bands SB1 to SB3 are arranged at positions spaced in the width direction WD of the magnetic tape MT (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3.

That is, the servo bands SB and the data bands DB are arranged alternately along the width direction WD. In other words, the data band DB and a pair of servo bands SB adjacent to each other via the data band DB are formed on the magnetic tape MT.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD of the magnetic tape MT. The servo patterns 52 are classified into a servo pattern 52A and a servo pattern 52B. The plurality of servo patterns 52 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The servo band SB is divided by a plurality of frames 50 along the longitudinal direction LD of the magnetic tape MT. The frame 50 is defined by one set of servo patterns 52. In the example shown in FIG. 6, the servo patterns 52A and 52B are shown as an example of the set of servo patterns 52. The servo patterns 52A and 52B are adjacent to each other along the longitudinal direction LD of the magnetic tape MT, and the servo pattern 52A is positioned on the upstream side in the forward direction in the frame 50, and the servo pattern 52B is positioned on the downstream side in the forward direction.

The servo pattern 52 consists of a linear magnetization region pair 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side of the magnetic tape MT with the imaginary straight line C1 as the symmetry axis.

The linear magnetization region 54A1 is a set of magnetization straight lines 54A1a, which are five magnetized straight lines. The linear magnetization region 54A2 is a set of magnetization straight lines 54A2a, which are five magnetized straight lines.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side of the magnetic tape MT with the imaginary straight line C2 as the symmetry axis.

The linear magnetization region 54B1 is a set of magnetization straight lines 54B1a, which are four magnetized straight lines. The linear magnetization region 54B2 is a set of magnetization straight lines 54B2a, which are four magnetized straight lines.

Here, an example of a configuration of a magnetic head 300 according to a related-art example will be described. The magnetic head 300 is different from the magnetic head 28 (see FIG. 3) in that a magnetic element unit 302 is used instead of the magnetic element unit 42. The magnetic head 300 is disposed on the front surface 31 side of the magnetic tape MT. The holder 44 is formed in a rectangular parallelepiped shape, and is disposed to cross the front surface 31 of the magnetic tape MT along the width direction WD. The plurality of magnetic elements of the magnetic element unit 302 are arranged in a straight line along the longitudinal direction of the holder 44. The magnetic element unit 302 has a pair of servo reading elements R and a plurality of data read/write elements 304 as the plurality of magnetic elements.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 302 is disposed at any position on the magnetic tape MT.

The pair of servo reading elements R are mounted on the magnetic head 300. In the magnetic head 300, a relative positional relationship between the holder 44 and the pair of servo reading elements R is fixed. The pair of servo reading elements R consists of servo reading elements R1 and R2. The servo reading element R1 is disposed at one end of the magnetic element unit 302, and the servo reading element R2 is disposed at the other end of the magnetic element unit 302. In the example shown in FIG. 6, the servo reading element R1 is provided at a position corresponding to the servo band SB2, and the servo reading element R2 is provided at a position corresponding to the servo band SB3.

The plurality of data read/write elements 304 are disposed in a straight line between the servo reading element R1 and the servo reading element R2. The plurality of data read/write elements 304 are disposed at intervals along the longitudinal direction of the magnetic head 300 (for example, are disposed at equal intervals along the longitudinal direction of the magnetic head 300). In the example shown in FIG. 6, the plurality of data read/write elements 304 are provided at positions corresponding to the data band DB2.

The control device 30 acquires a servo pattern signal which is a result obtained by reading the servo pattern 52 by the servo reading element R, and performs a tracking control (also referred to as "servo control") in response to the acquired servo pattern signal. Here, the tracking control refers to a control of positioning the magnetic head 28 to a designated portion by moving the magnetic head 28 in the width direction WD of the magnetic tape MT via the moving mechanism 48 in accordance with the servo pattern 52 read by the servo reading element SR.

By performing the tracking control, the plurality of data read/write elements 304 are positioned on a designated region in the data band DB, and perform the magnetic processing on the designated region in the data band DB in this state. In the example shown in FIG. 6, the plurality of data read/write elements 304 perform the magnetic processing on the designated region in the data band DB2.

In addition, in a case in which the data band DB of which the data is to be read by the magnetic element unit 302 is changed (in the example shown in FIG. 6, the data band DB of which the data is to be read by the magnetic element unit 302 is changed from the data band DB2 to the data band DB1), the moving mechanism 48 moves, under the control of the control device 30, the magnetic head 28 in the width direction WD to change the position of the pair of servo reading elements R. That is, by moving the magnetic head 300 in the width direction WD, the moving mechanism 48 moves the servo reading element R1 to a position corresponding to the servo band SB1 and moves the servo reading element R2 to the position corresponding to the servo band SB2. As a result, the positions of the plurality of data read/write elements 304 are changed from the data band DB2 to the data band DB1, and the plurality of data read/write elements 304 perform the magnetic processing on the data band DB1.

By the way, linear tape-open (LTO) is known as one of the large-capacity high-speed tape formats. The number of data channels of the LTO is steadily increased to 8 channels, 16 channels, and 32 channels. The number of data channels at present is 32 channels, and it is expected that the number of data channels will be 64 channels or more in the future.

In a case in which the number of data channels is 64 channels, as shown in FIG. 7 as an example, a length in the width direction WD of the servo band SB included in the magnetic tape MT of which the number of data channels is 64 channels is half of a length in the width direction WD of the servo band SB included in the magnetic tape MT of which the number of data channels is 32 channels. Here, as an example for realizing the tracking control in the forward direction and the backward direction with respect to the magnetic tape MT of which the number of data channels is 32 channels and the magnetic tape MT of which the number of data channels is 64 channels, as shown in FIG. 7, a form example is considered in which the servo band SB is divided into two regions, a first region 56 and a second region 58. In the example shown in FIG. 7, the servo band SB is divided into the first region 56 and the second region 58 along the width direction WD. A center line CL passing through the center of the width direction WD is imaginarily set in the servo band SB, and one region obtained by dividing the servo band SB into two in the vertical direction via the center line CL is the first region 56, and the other region is the second region 58.

For example, the region 56 is a region used for reading the servo pattern 52 in a case in which the magnetic processing is performed in a state in which the magnetic tape MT travels in the forward direction. The region 58 is a region used for reading the servo pattern 52 in a case in which the magnetic processing is performed in a state in which the magnetic tape MT travels in the backward direction.

The data band DB is roughly divided into a forward region which is a region in which the magnetic processing is performed in a case in which the magnetic tape MT travels in the forward direction and a reverse region which is a region in which the magnetic processing is performed in a case in which the magnetic tape MT travels in the backward direction. For example, the tracking control or the like is realized by reading the servo pattern 52 in the region 56 in a case in which the magnetic processing is performed on the forward region and by reading the servo pattern 52 in the region 58 in a case in which the magnetic processing is performed on the reverse region.

It is preferable that a width of the servo band SB is the same width as in a case of 32 channels or in a case of 64 channels. Therefore, some merits can be obtained, such as the reduction of a blank region (that is, an edge guard band) on the end side of the magnetic tape MT in the width direction WD, and securing of a large data band DB. Therefore, at present, the inventors and the like diligently study enabling to read the servo pattern 52 at the width (that is, the servo band SB having the same length in the width direction WD) of the same servo band SB as that in a case of 64 channels even in a case of 32 channels.

However, in this case, in the related-art method described above, the servo band SB can be read by the servo reading element R in a case in which the data in one region of the forward region or the reverse region is read, but the servo band SB cannot be read by the servo reading element R in a case in which the data in the other region of the forward region or the reverse region is read. The reason of the above description is that the length of the servo band SB in the width direction WD is insufficient.

Therefore, in view of such circumstances, in the present embodiment, as shown in FIGS. 8 to 12 as an example, the magnetic head 28 is configured and used.

Figure 8:
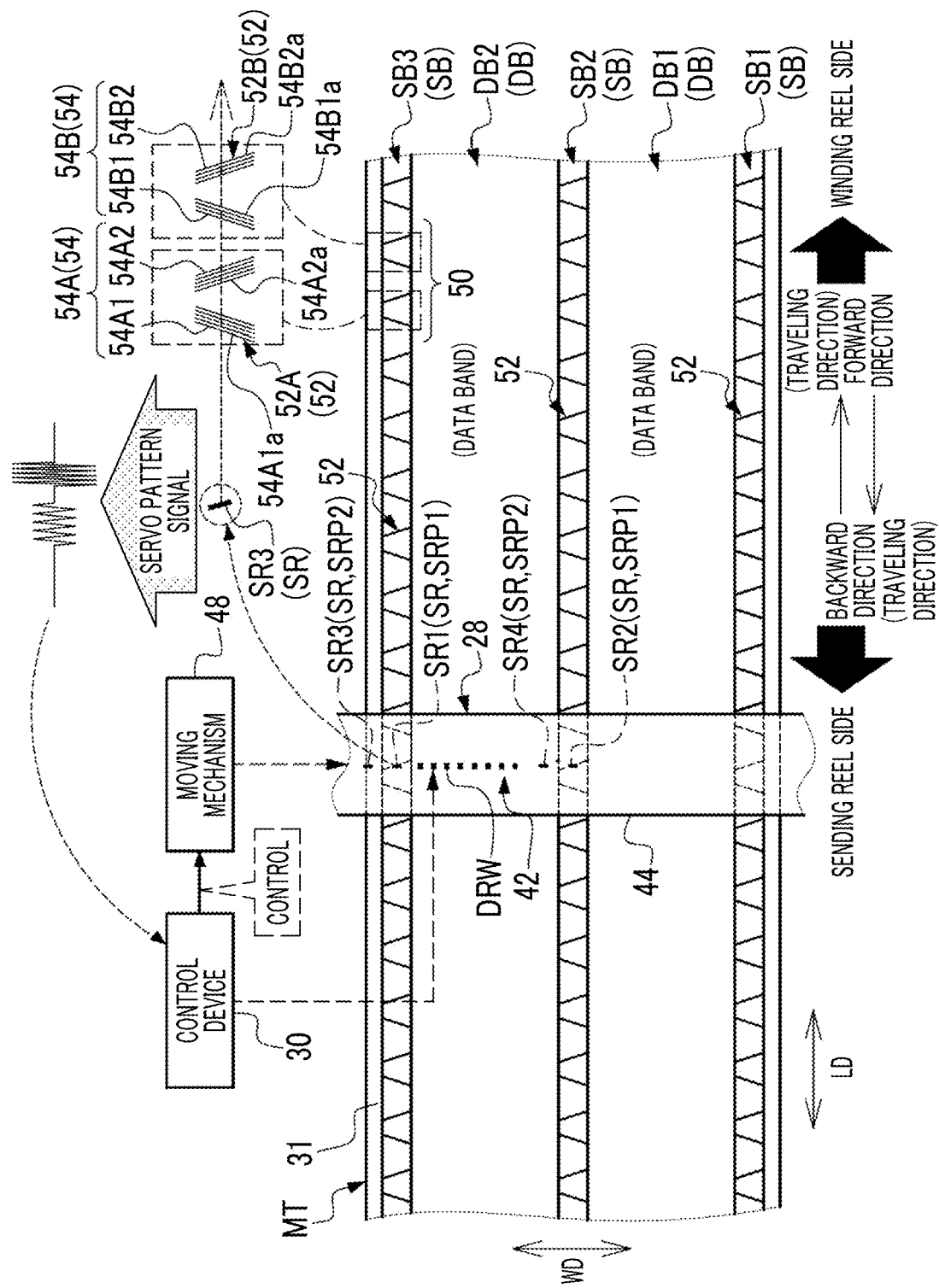
FIG. 8 is a conceptual diagram showing an example of an aspect in which a state in which the magnetic head is disposed on the magnetic tape is observed from a front surface side of the magnetic tape.

As shown in FIG. 8 as an example, the magnetic head 28 is disposed on the front surface 31 side of the magnetic tape MT. The holder 44 is formed in a rectangular parallelepiped shape, and is disposed to cross the front surface 31 of the magnetic tape MT along the width direction WD. The plurality of magnetic elements of the magnetic element unit 42 are arranged in a straight line along the longitudinal direction of the holder 44. The magnetic element unit 42 has a first servo reading element pair SRP1, a second servo reading element pair SRP2, and a plurality of data read/write elements DRW as the plurality of magnetic elements. The length of the holder 44 in the longitudinal direction is set to a length exceeding the width of the magnetic tape MT even in a case in which the magnetic element unit 42 is disposed at any position on the magnetic tape MT.

In the present embodiment, the first servo reading element pair SRP1 is an example of a "first servo reading element pair" according to the technology of the present disclosure. The second servo reading element pair SRP2 is an example of a "second servo reading element pair" according to the technology of the present disclosure. The plurality of data read/write elements DRW is an example of a "plurality of magnetic elements" according to the technology of the present disclosure. Hereinafter, for convenience of description, in a case in which the distinction is not specifically needed, the first servo reading element pair SRP1 and the second servo reading element pair SRP2 are referred to as a "servo reading element pair SRP".

The plurality of servo reading elements SR are mounted on the magnetic head 28. In the example shown in FIG. 8, A first servo reading element SR1, A second servo reading element SR2, A third servo reading element SR3, and A fourth servo reading element SR4 are shown as the plurality of servo reading elements SR. The first servo reading element pair SRP1 consists of the first servo reading element SR1 and the second servo reading element SR2, and reads the pair of servo bands SB (for example, the servo bands SB2 and SB3). The second servo reading element pair SRP2 consists of the third servo reading element SR3 and the fourth servo reading element SR4, and reads the pair of servo bands SB.

In the present embodiment, the "first servo reading element SR1" is an example of a "first servo reading element" according to the technology of the present disclosure. The second servo reading element SR2 is an example of a "second servo reading element" according to the technology of the present disclosure. The third servo reading element SR3 is an example of a "third servo reading element" according to the technology of the present disclosure. The fourth servo reading element SR4 is an example of a "fourth servo reading element" according to the technology of the present disclosure.

In the magnetic head 28, a relative positional relationship between the holder 44 and the first servo reading element pair SRP1 and a relative positional relationship between the holder 44 and the second servo reading element pair SRP2 are fixed. In addition, in the magnetic head 28, a relative positional relationship between the first servo reading element pair SRP1 and the second servo reading element pair SRP2 is also fixed.

The first servo reading element SR1 included in the first servo reading element pair SRP1 is disposed on one end side of the plurality of data read/write elements DRW. In the example shown in FIG. 8, the first servo reading element SR1 is disposed on the servo band SB3. The servo band SB3 is read by the first servo reading element SR1. Reading the servo band SB3 means reading the servo pattern 52 from the servo band SB3. In the example shown in FIG. 8, the servo bands SB2 and SB3 are an example of a "pair of servo bands" according to the technology of the present disclosure, and the servo band SB3 is an example of a "one servo band" according to the technology of the present disclosure.

The second servo reading element SR2 included in the first servo reading element pair SRP1 is disposed on the other end side of the plurality of data read/write elements DRW. In the example shown in FIG. 8, the second servo reading element SR2 is disposed on the servo band SB2. The servo band SB2 is read by the second servo reading element SR2. Reading the servo band SB2 means reading the servo pattern 52 from the servo band SB2. In the example shown in FIG. 8, the servo band SB2 is an example of "the other servo band" according to the technology of the present disclosure.

The third servo reading element SR3 included in the second servo reading element pair SRP2 is disposed on one end side of the plurality of data read/write elements DRW. In the example shown in FIG. 8, the third servo reading element SR3 is adjacent to the first servo reading element SR1 on a side farther from one end of the plurality of data read/write elements DRW than the first servo reading element SR1 in a direction in which the plurality of data read/write elements DRW are disposed. By moving the magnetic head 28 from the servo band SB3 side to the servo band SB2 side along the width direction WD, the third servo reading element SR3 is disposed on the servo band SB3 and reads the servo band SB3.

The fourth servo reading element SR4 included in the second servo reading element pair SRP2 is disposed on the other end side of the plurality of data read/write elements DRW. In the example shown in FIG. 8, the fourth servo reading element SR4 is adjacent to the second servo reading element SR2 on a side closer to the other end of the plurality of data read/write elements DRW than the second servo reading element SR2 in a direction in which the plurality of data read/write elements DRW are disposed. By moving the magnetic head 28 from the servo band SB3 side to the servo band SB2 side along the width direction WD, the fourth servo reading element SR4 is disposed on the servo band SB2 and reads the servo pattern 52 from the servo band SB2.

The plurality of data read/write elements DRW are disposed in a straight line between the first servo reading element SR1 and the fourth servo reading element SR4. The plurality of data read/write elements DRW are disposed at intervals along the longitudinal direction of the magnetic head 28 (for example, are disposed at equal intervals along the longitudinal direction of the magnetic head 28). In the example shown in FIG. 8, the plurality of data read/write elements DRW are provided at positions corresponding to the data band DB2.

The control device 30 acquires a servo pattern signal which is a result obtained by reading the servo pattern 52 by the servo reading element SR, and performs the tracking control in response to the acquired servo pattern signal. Here, the tracking control refers to a control of moving the magnetic head 28 in the width direction WD of the magnetic tape MT by operating the moving mechanism 48 in accordance with the servo pattern 52 read by the servo reading element SR.

By performing the tracking control, the plurality of data read/write elements DRW are positioned on a designated region in the data band DB, and read the data from the designated region in the data band DB in this state. In the example shown in FIG. 8, the plurality of data read/write elements DRW read the data from the designated region in the data band DB2.

The number of the plurality of data read/write elements DRW mounted on the magnetic head 28 is 64. The control device 30 causes the magnetic head 28 to perform the magnetic processing by 32 channels or 64 channels. In a case in which the magnetic head 28 performs the magnetic processing by 32 channels, 32 data read/write elements DRW thinned out at one interval among the plurality of data read/write elements DRW are activated. In a case in which the magnetic head 28 performs the magnetic processing by 64 channels, all the plurality of data read/write elements DRW are activated. Here, the activation refers to, for example, a state in which the data read/write elements DRW are turned on (that is, a state in which data can be read or written). Here, 64 channels are an example of a "first number of channels" according to the technology of the present disclosure, and 32 channels are an example of a "second number of channels" according to the technology of the present disclosure.

It should be noted that, although the magnetic head 28 that shares 32 channels and 64 channels is shown here, this is merely an example. For example, in a case in which it has already been determined that reading and/or writing is performed by 32 channels, the magnetic head 28 may be a magnetic head having specifications in which only the data read/write element DRW at the position activated in a case of 32 channels among the plurality of data read/write elements DRW is disposed. In addition, for example, in a case in which it has already been determined that reading and/or writing is performed by 64 channels, the magnetic head 28 may be a magnetic head having specifications in which only the data read/write element DRW at the position activated in a case of 64 channels among the plurality of data read/write elements DRW is disposed.

The pair of servo bands SB, that is, the servo bands SB2 and SB3 in the example shown in FIG. 8 are shared in a case in which the magnetic processing is performed by 32 channels and a case in which the magnetic processing is performed by 64 channels. In addition, the length of the servo band SB in the width direction WD is a common length between a case in which the magnetic processing is performed by 32 channels and a case in which the magnetic processing is performed by 64 channels.

Hereinafter, a case in which the magnetic processing is performed on the data band DB by 32 channels by the magnetic head 28 and a case in which the magnetic processing is performed by 64 channels by the magnetic head 28 will be described.

First, an example of a case in which the magnetic processing is performed on the data band DB by the magnetic head 28 in 32 channels will be described with reference to FIGS. 9 and 10.

Figure 9:
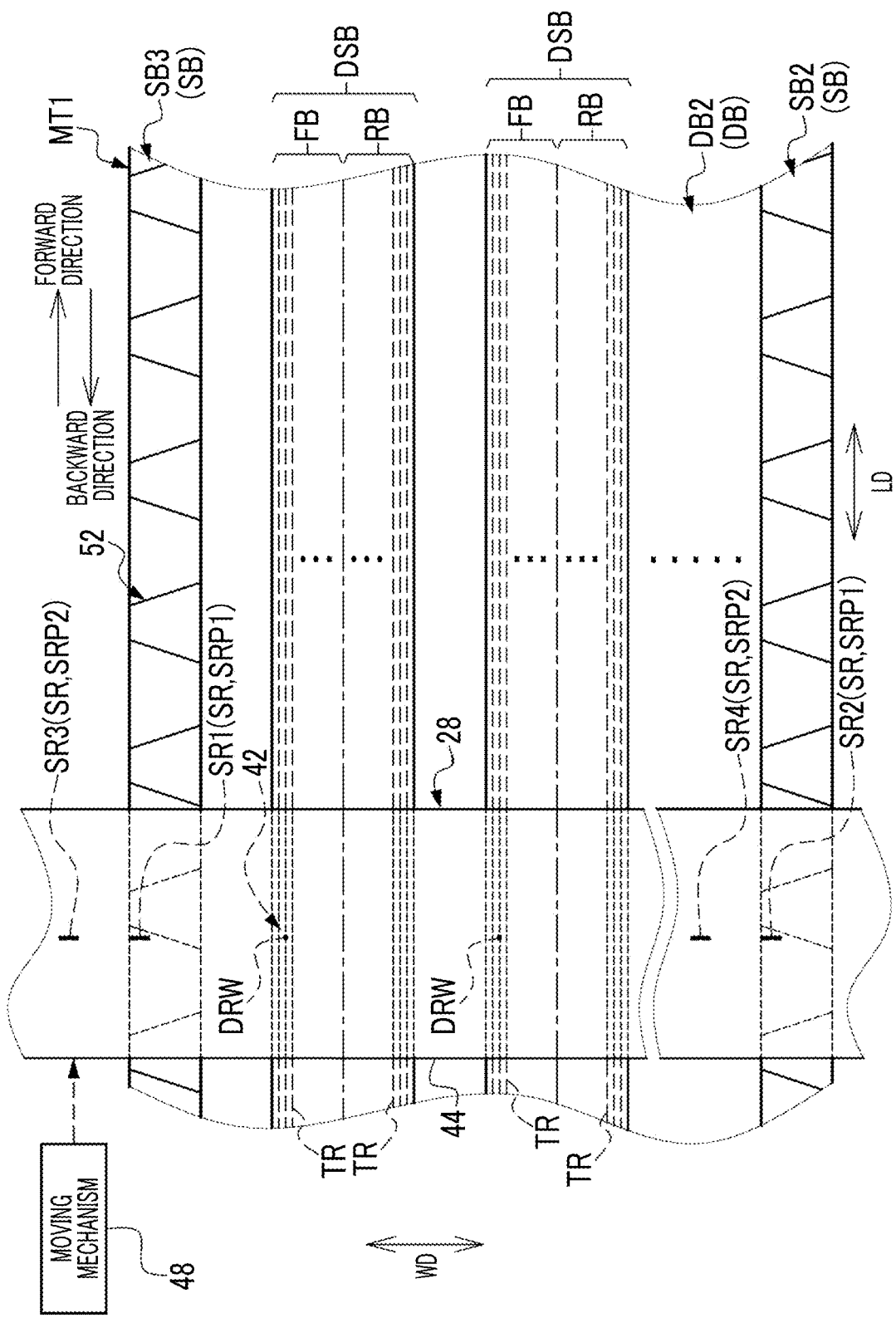
FIG. 9 is a conceptual diagram showing an example of an aspect in which magnetic processing is performed on a forward band by the magnetic head in a state in which the magnetic tape corresponding to 32 channels is made to travel in a forward direction.
Figure 10:
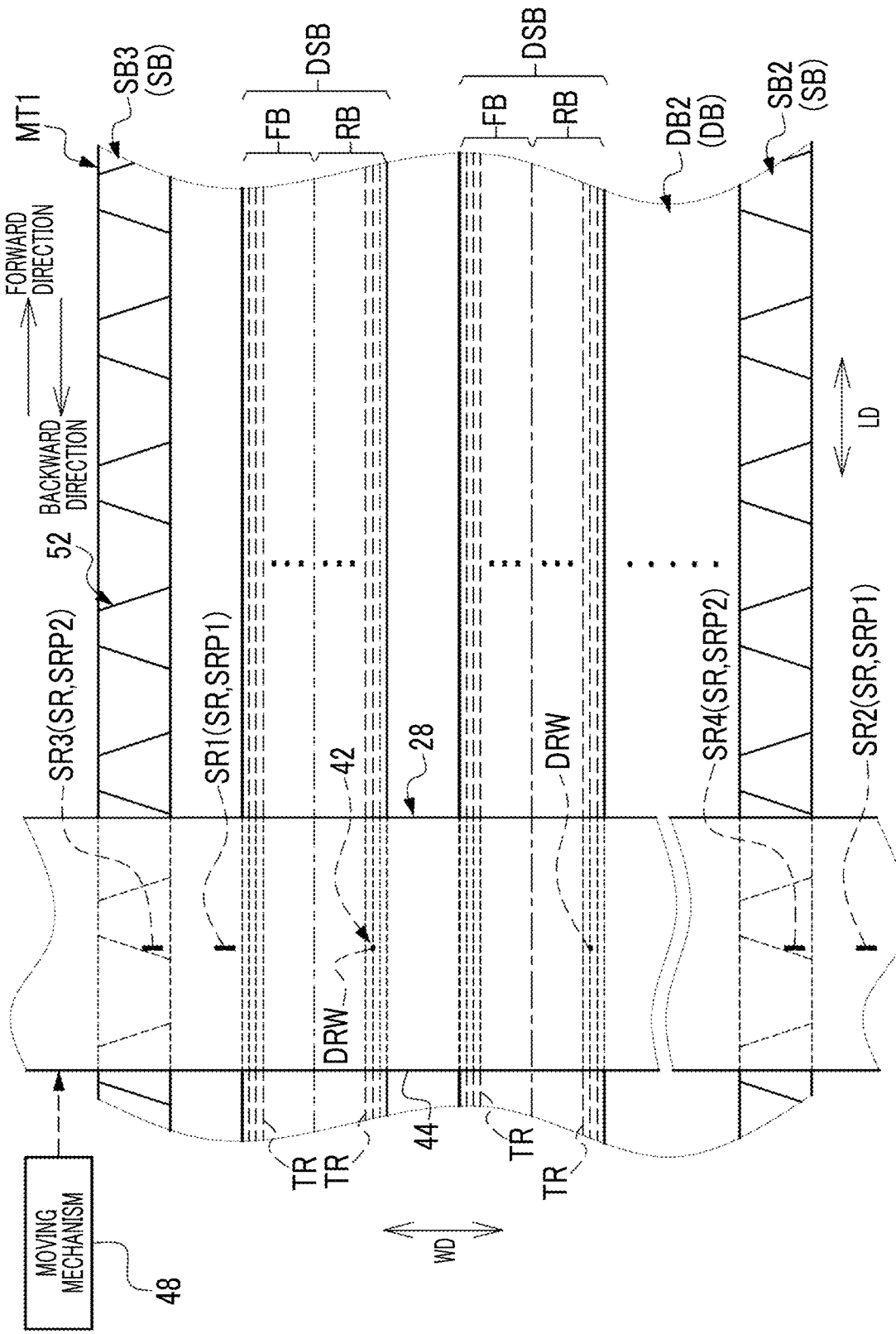
FIG. 10 is a conceptual diagram showing an example of an aspect in which the magnetic processing is performed on the forward band by the magnetic head in a state in which the magnetic tape corresponding to 32 channels is made to travel in a backward direction.

FIG. 9 and FIG. 10 show a part of a magnetic tape MT1 which is an example of the magnetic tape MT on which the data band DB for 32 channels according to the present embodiment is formed. FIG. 9 is a conceptual diagram showing an example of an aspect in which the tracking control is performed by using the first servo reading element pair SRP1, and FIG. 10 is a conceptual diagram showing an example of an aspect in which the tracking control is performed by using the second servo reading element pair SRP2. The magnetic tape MT1 is an example of a "magnetic tape" according to the technology of the present disclosure.

As shown in FIG. 9 as an example, the first servo reading element pair SRP1 is disposed on the adjacent servo bands SB in the width direction WD and used. In the example shown in FIG. 9, the first servo reading element SR1 included in the first servo reading element pair SRP1 is disposed on the servo band SB3, and the second servo reading element SR2 included in the second servo reading element pair SRP2 is disposed on the servo band SB2.

32 data sub-bands DSB are formed in the data band DB for 32 channels. The magnetic processing is performed by assigning 32 data read/write elements DRW of the magnetic head 28 (that is, 32 data read/write elements DRW obtained by thinning out all the data read/write elements DRW at one interval) to the 32 data sub-bands DSB.

One data sub-band DSB consists of a forward band FB and a reverse band RB. One region obtained by dividing the data sub-band DSB into two regions in the width direction WD (for example, in the example shown in FIG. 9, in the data band DB2, a region on a side closer to the servo band SB3) is the forward band FB. In addition, the other region obtained by dividing the data sub-band DSB into two regions in the width direction WD (for example, in the example shown in FIG. 9, in the data band DB2, a region on a side closer to the servo band SB2) is the reverse band RB.

It should be noted that, here, one region obtained by dividing the data sub-band DSB into two regions in the width direction WD is an example of "one region" according to the technology of the present disclosure. In addition, the other region obtained by dividing the data sub-band DSB into two regions in the width direction WD is an example of "the other region" according to the technology of the present disclosure. Further, the forward band FB is an example of a "forward region" according to the technology of the present disclosure. Moreover, the reverse band RB is an example of a "reverse region" according to the technology of the present disclosure.

A plurality of tracks TR are formed in each of the forward band FB and the reverse band RB. The data read/write element DRW performs the magnetic processing on the track TR of the forward band FB while causing the magnetic tape MT to travel in the forward direction. The data read/write element DRW performs the magnetic processing on the track TR of the reverse band RB while causing the magnetic tape MT to travel in the backward direction.

In a case in which the magnetic processing is performed on the forward band FB, the moving mechanism 48 moves the magnetic head 28 in the width direction WD to position the first servo reading element SR1 and the second servo reading element SR2 on the servo bands SB adjacent to each other in the width direction WD. In the example shown in FIG. 9, the first servo reading element SR1 is positioned on the servo band SB3, and the second servo reading element SR2 is positioned on the servo band SB2. The servo band SB3 is read by the first servo reading element SR1, and the servo band SB2 is read by the second servo reading element SR2.

In a case in which the magnetic processing is performed on the forward band FB, a region (here, for example, the entire width of the servo band SB3) that exceeds half of the servo band SB3 in the width direction WD is used as a read target range by the first servo reading element SR1. In addition, in a case in which the magnetic processing is performed on the forward band FB, a region (here, for example, the entire width of the servo band SB2) that exceeds half of the servo band SB2 in the width direction WD is used as a read target range by the second servo reading element SR2.

In a case in which the data read/write element DRW corresponding to the position of the data sub-band DSB performs the magnetic processing on the forward band FB for each data sub-band DSB, the moving mechanism 48 moves the magnetic head 28 in the width direction WD in accordance with the reading result of the servo pattern 52 by the servo reading element SR. The moving mechanism 48 moves the magnetic head 28 in the width direction WD in accordance with the reading result of the servo pattern 52, to position the data read/write element DRW on the designated track TR in the forward band FB. Moreover, the data read/write element DRW performs the magnetic processing on the designated track TR in the forward band FB included in the data sub-band DSB at the position corresponding to each data read/write element DRW.

On the other hand, in a case in which the magnetic processing is performed on the reverse band RB, the moving mechanism 48 moves the magnetic head 28 in the width direction WD to position the third servo reading element SR3 and the fourth servo reading element SR4 on the servo bands SB adjacent to each other in the width direction WD, as shown in FIG. 10 as an example. In the example shown in FIG. 10, the third servo reading element SR3 is positioned on the servo band SB3, and the fourth servo reading element SR4 is positioned on the servo band SB2. The servo band SB3 is read by the third servo reading element SR3, and the servo band SB2 is read by the fourth servo reading element SR4.

That is, the servo band SB is read by the first servo reading element pair SRP1 in a state in which the magnetic tape MT1 is made to travel in the forward direction, whereas the servo band SB is read by the second servo reading element pair SRP2 in a state in which the magnetic tape MT1 is made to travel in the backward direction. The above description means that the first servo reading element pair SRP1 and the second servo reading element pair SRP2 read the pair of servo bands SB (here, for example, the servo bands SB2 and SB3) at different timings.

In a case in which the magnetic processing is performed on the reverse band RB, a region (here, for example, the entire width of the servo band SB3) that exceeds half of the servo band SB3 in the width direction WD is used as a read target range by the third servo reading element SR3. In addition, in a case in which the magnetic processing is performed on the reverse band RB, a region (here, for example, the entire width of the servo band SB2) that exceeds half of the servo band SB2 in the width direction WD is used as a read target range by the fourth servo reading element SR4.

In a case in which the data read/write element DRW corresponding to the position of the data sub-band DSB performs the magnetic processing on the reverse band RB for each data sub-band DSB, the moving mechanism 48 moves the magnetic head 28 in the width direction WD in accordance with the reading result of the servo pattern 52 by the servo reading element SR. The moving mechanism 48 moves the magnetic head 28 in the width direction WD in accordance with the reading result of the servo pattern 52 to position the data read/write element DRW on the designated track TR in the reverse band RB. Moreover, the data read/write element DRW performs the magnetic processing on the designated track TR in the reverse band RB included in the data sub-band DSB at the position corresponding to each data read/write element DRW.

Figure 11:
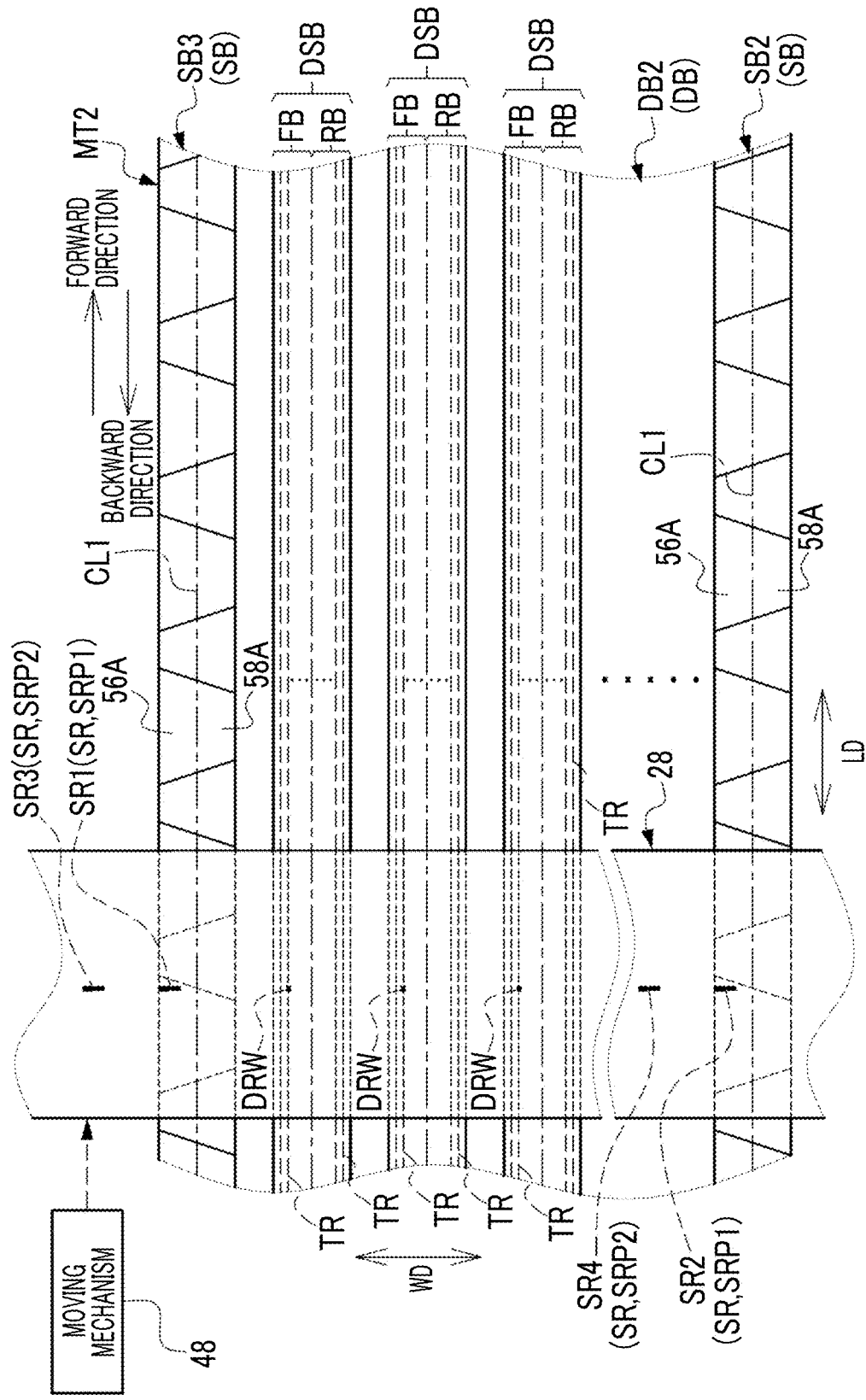
FIG. 11 is a conceptual diagram showing an example of an aspect in which the magnetic processing is performed on the forward band by the magnetic head in a state in which the magnetic tape corresponding to 64 channels is made to travel in the forward direction.
Figure 12:
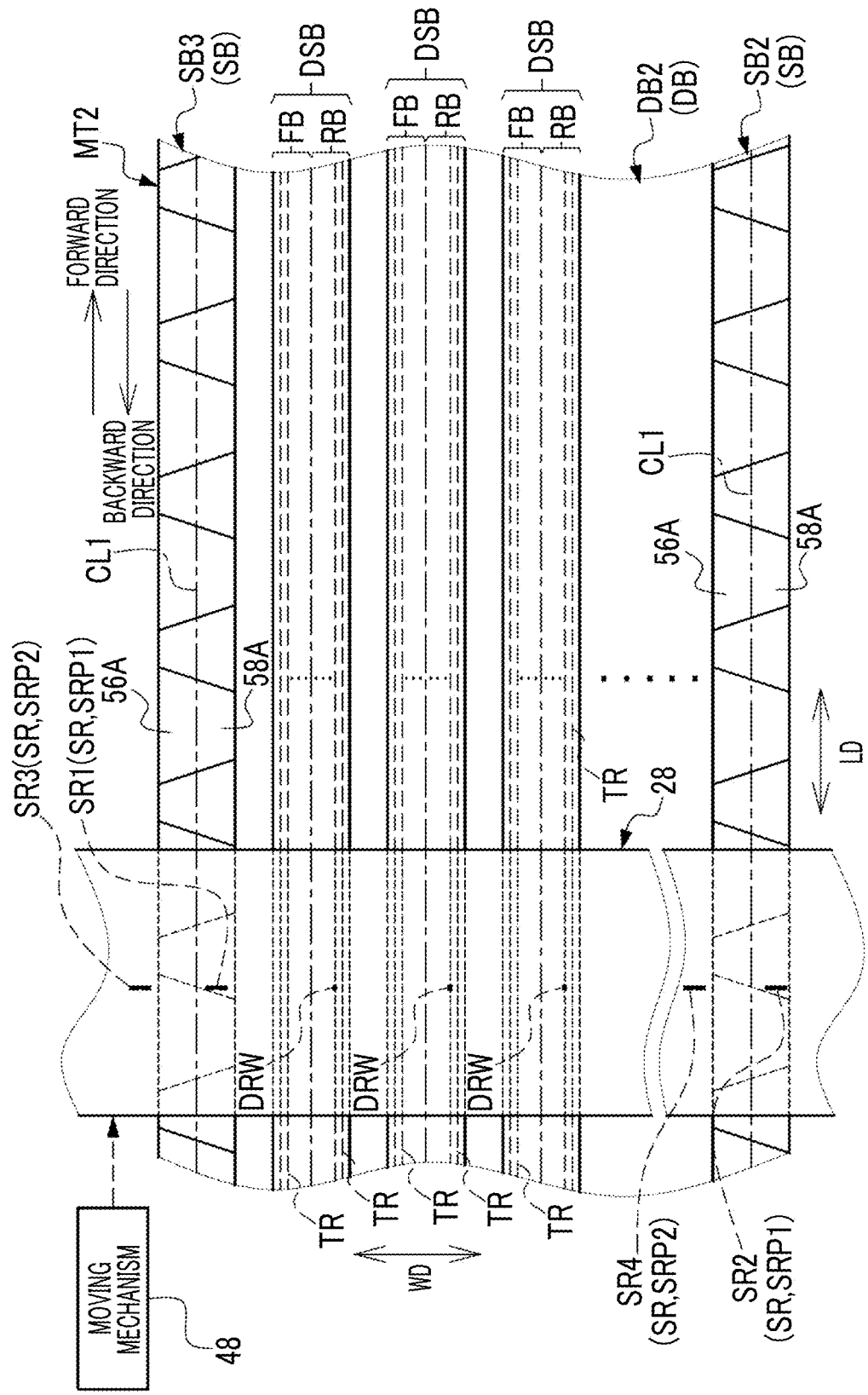
FIG. 12 is a conceptual diagram showing an example of an aspect in which the magnetic processing is performed on the forward band by the magnetic head in a state in which the magnetic tape corresponding to 64 channels is made to travel in the backward direction.

FIG. 11 and FIG. 12 show a part of a magnetic tape MT2 which is the magnetic tape MT on which the data band DB for 64 channels according to the present embodiment is formed. FIG. 11 is a conceptual diagram showing an example of an aspect in which the data is read from the forward band FB by performing the tracking control using the first servo reading element pair SRP1, and FIG. 12 is a conceptual diagram showing an example of an aspect in which the data is read from the reverse band RB by performing the tracking control using the first servo reading element pair SRP1. The magnetic tape MT2 is an example of a "magnetic tape" according to the technology of the present disclosure.

In the examples shown in FIGS. 11 and 12, the width of the data band DB of the magnetic tape MT2 (that is, the length in the width direction WD) is the same as the width of the data band DB of the magnetic tape MT1. In addition, in the examples shown in FIGS. 11 and 12, the width of the servo band SB of the magnetic tape MT2 (that is, the length in the width direction WD) is also the same as the width of the servo band SB of the magnetic tape MT1.

As shown in FIG. 11 as an example, the servo band SB is divided into a first region 56A and a second region 58A along the width direction WD. A center line CL1 passing through the center of the width direction WD is imaginarily set in the servo band SB, and one region obtained by dividing the servo band SB into two in the vertical direction via the center line CL1 is the first region 56A, and the other region is the second region 58A. In the example shown in FIG. 11, in the servo band SB3, the first region 56A is positioned on a side farther from the data band DB2 than the second region 58A in the width direction WD. In other words, the second region 58A is positioned on a side closer to the data band DB2 than the first region 56A in the width direction WD. In addition, in the example shown in FIG. 11, in the servo band SB2, the first region 56A is positioned on a side closer to the data band DB2 than the second region 58A in the width direction WD. In other words, the second region 58A is positioned on the side farther from the data band DB2 from the first region 56A in the width direction WD. The first region 56A is an example of a "first region" according to the technology of the present disclosure, and the second region 58A is a "second region" according to the technology of the present disclosure.

64 data sub-bands DSB are formed in the data band DB for 64 channels. The magnetic processing is performed by assigning the 64 data read/write elements DRW (that is, all the data read/write elements DRW) of the magnetic head 28 to the 64 data sub-bands DSB.

The data sub-band DSB for 64 channels consists of the forward band FB and the reverse band RB, similarly to the data sub-band DSB for 32 channels. In addition, similarly to the data sub-band DSB for 32 channels, in the data sub-band DSB for 64 channels, the plurality of tracks TR are formed in each of the forward band FB and the reverse band RB.

Similarly to the forward band FB for 32 channels, the data read/write element DRW performs the magnetic processing on the forward band FB for 64 channels while causing the magnetic tape MT to travel in the forward direction. In addition, similarly to the reverse band RB for 32 channels, the data read/write element DRW performs the magnetic processing on the reverse band RB for 64 channels while causing the magnetic tape MT to travel in the backward direction.

In a case in which the magnetic processing is performed on the forward band FB for 64 channels, the moving mechanism 48 moves the magnetic head 28 in the width direction WD to position the first servo reading element SR1 and the second servo reading element SR2 on the first regions 56A of the servo bands SB adjacent to each other in the width direction WD. In the example shown in FIG. 11, the first servo reading element SR1 is positioned on the first region 56A of the servo band SB3, and the second servo reading element SR2 is positioned on the first region 56A of the servo band SB2. In a case in which the magnetic processing is performed on the forward band FB for 64 channels, the first region 56A of the servo band SB3 is used as the read target range by the first servo reading element SR1, and the first region 56A of the servo band SB2 is used as to the read target range by the second servo reading element SR2. That is, in a case in which the magnetic processing is performed on the forward band FB for 64 channels, the first region 56A of the servo band SB3 is read by the first servo reading element SR1, and the first region 56A of the servo band SB2 is read by the second servo reading element SR2.

In a case in which the data read/write element DRW corresponding to the position of the data sub-band DSB performs the magnetic processing on the forward band FB for each data sub-band DSB, the moving mechanism 48 moves the magnetic head 28 in the width direction WD in accordance with the reading result of the servo pattern 52 by the servo reading element SR. The moving mechanism 48 moves the magnetic head 28 in the width direction WD in accordance with the reading result of the servo pattern 52, to position the data read/write element DRW on the designated track TR in the forward band FB. Moreover, the data read/write element DRW performs the magnetic processing on the designated track TR in the forward band FB included in the data sub-band DSB at the position corresponding to each data read/write element DRW.

On the other hand, in a case in which the magnetic processing is performed on the reverse band RB for 64 channels, the moving mechanism 48 moves the magnetic head 28 in the width direction WD to position the first servo reading element SR1 and the second servo reading element SR2 on the second regions 58A of the servo bands SB adjacent to each other in the width direction WD, as shown in FIG. 12 as an example. In the example shown in FIG. 12, the first servo reading element SR1 is positioned on the second region 58A of the servo band SB3, and the second servo reading element SR2 is positioned on the second region 58A of the servo band SB2. In a case in which the magnetic processing is performed on the reverse band RB for 64 channels, the second region 58A of the servo band SB3 is used as the read target range by the first servo reading element SR1, and the second region 58A of the servo band SB2 is used as to the read target range by the second servo reading element SR2. That is, the second region 58A of the servo band SB3 is read by the first servo reading element SR1, and the second region 58A of the servo band SB2 is read by the second servo reading element SR2.

In a case in which the data read/write element DRW corresponding to the position of the data sub-band DSB performs the magnetic processing on the reverse band RB for each data sub-band DSB for 64 channels, the moving mechanism 48 moves the magnetic head 28 in the width direction WD in accordance with the reading result of the servo pattern 52 by the servo reading element SR. The moving mechanism 48 moves the magnetic head 28 in the width direction WD in accordance with the reading result of the servo pattern 52 to position the data read/write element DRW on the designated track TR in the reverse band RB. Moreover, the data read/write element DRW performs the magnetic processing on the designated track TR in the reverse band RB included in the data sub-band DSB at the position corresponding to each data read/write element DRW.

It should be noted that, for example, in the magnetic tape MT1 in a case in which the magnetic head 28 is operated by 32 channels, the length of the servo band SB in the width direction WD is about half of the length of the data sub-band DSB in the width direction WD (see FIGS. 9 and 10 as an example). In addition, for example, in the magnetic tape MT2 in a case in which the magnetic head 28 is operated by 64 channels, the length of the servo band SB in the width direction WD is substantially the same as the length of the data sub-band DSB in the width direction WD (see FIGS. 11 and 12 as an example).

Next, an action of the magnetic tape system 10 will be described with reference to FIGS. 13A and 13B.

Figure 13A:
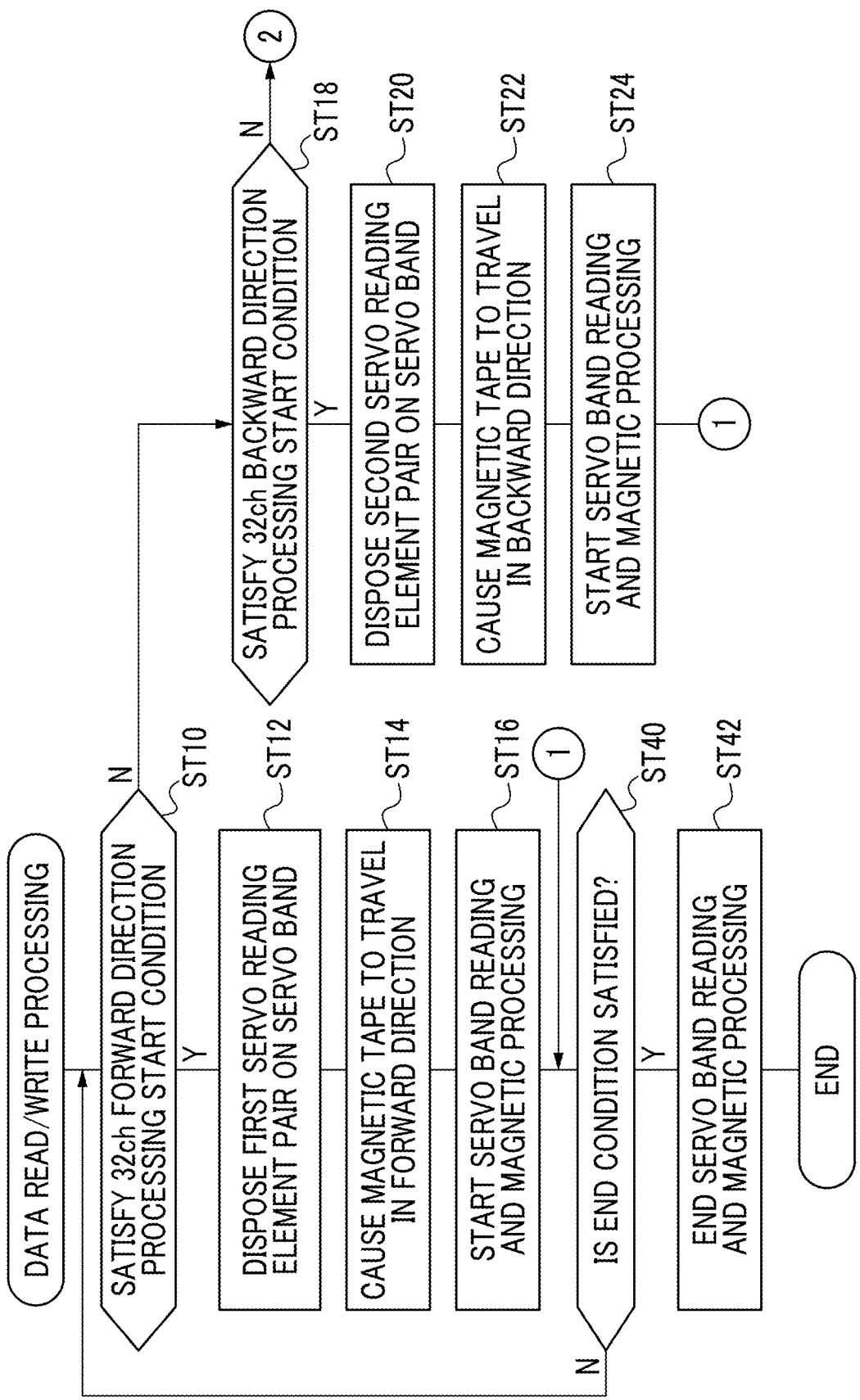
FIG. 13A is a flowchart showing an example of a flow of data read/write processing executed by a control device.
Figure 13B:
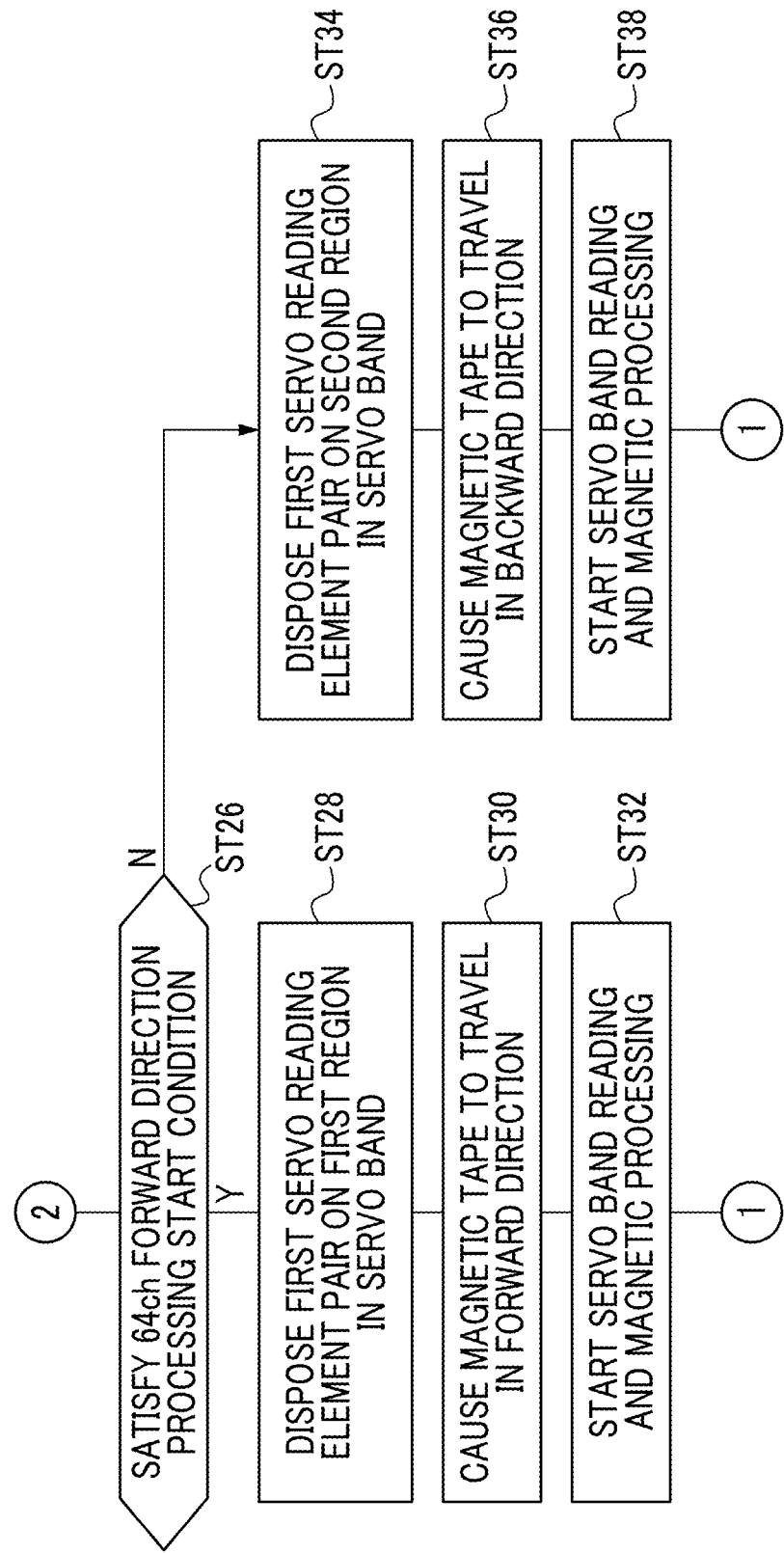
FIG. 13B is a continuation of the flowchart shown in FIG. 13A.
Figure 14:
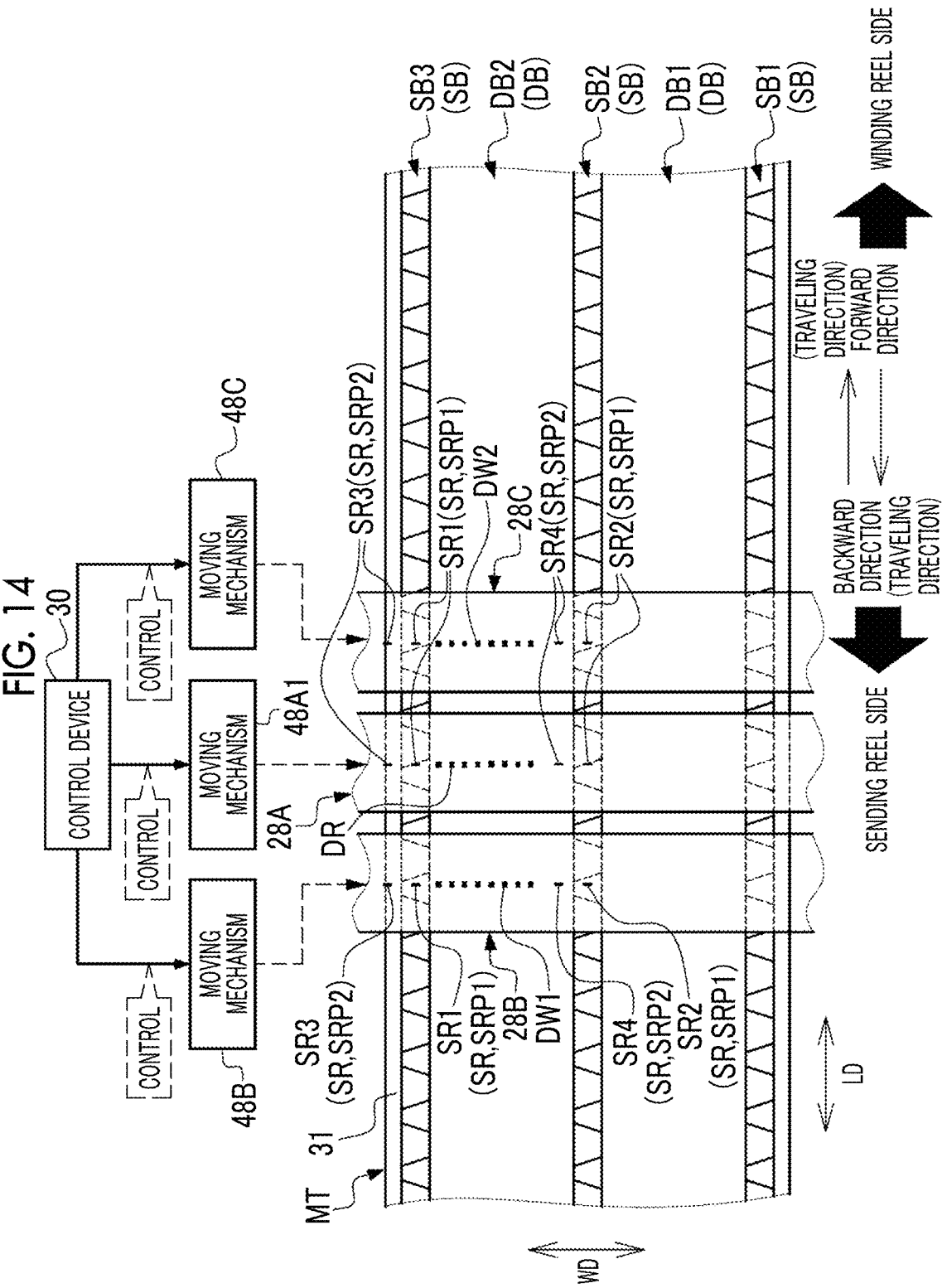
FIG. 14 is a conceptual diagram showing an example of a configuration of the magnetic head provided in the magnetic tape system according to a first modification example and a peripheral configuration of the magnetic head.

FIGS. 13A and 13B show an example of a flow of data read/write execution processing performed by the control device 30. The data read/write execution processing shown in FIGS. 13A and 13B is performed in a case in which a timing for starting the execution of the data read/write processing has arrived (for example, in a case in which a condition that a command to start the execution of the data read/write execution processing is received by the UI system device 34 is satisfied). It should be noted that the flow of the flowchart shown in FIGS. 13A and 13B is an example of a "magnetic tape reading method" according to the technology of the present disclosure.

In the data read/write processing shown in FIG. 13A, first, in step ST10, the control device 30 determines whether or not a condition (hereinafter, referred to as a "32ch forward direction processing start condition") for performing the magnetic processing on the data band DB while causing the magnetic tape MT for 32 channels, that is, the magnetic tape MT1 to travel in the forward direction is satisfied. Examples of the 32ch forward direction processing start condition include a condition that the magnetic tape MT1 is loaded into the magnetic tape drive 14 and a command to perform the magnetic processing on the data band DB while causing the magnetic tape MT1 to travel in the forward direction is received by the UI system device 34.

In step ST10, in a case in which the 32ch forward direction processing start condition is not satisfied, a negative determination is made, and the data read/write processing proceeds to step ST18. In step ST10, in a case in which the 32ch forward direction processing start condition is satisfied, a positive determination is made, and the data read/write processing proceeds to step ST12. It should be noted that a case in which a positive determination is made in this step ST10 is an example of a "case in which the number of the plurality of magnetic elements corresponds to 32 channels and the magnetic processing is performed on the data band in the forward direction" according to the technology of the present disclosure.

In step ST12, the control device 30 disposes the first servo reading element pair SRP1 on the servo band SB by adjusting the position of the magnetic head 28 via the moving mechanism 48. After executing the processing of step ST12, the data read/write processing proceeds to step ST14.

In step ST14, the control device 30 controls the sending motor 36 and the winding motor 40 to cause the magnetic tape MT1 to travel in the forward direction. After executing the processing of step ST14, the data read/write processing proceeds to step ST16.

In step ST16, the control device 30 causes the first servo reading element pair SRP1 to start reading the servo band SB, and to start the magnetic processing by the 32 data read/write elements DRW on the forward band FB. After executing the processing of step ST16, the data read/write processing proceeds to step ST40.

In step ST18, the control device 30 determines whether or not a condition (hereinafter, referred to as a "32ch backward direction processing start condition") for performing the magnetic processing on the data band DB while causing the magnetic tape MT1 to travel in the backward direction is satisfied. Examples of the 32ch backward direction processing start condition include a condition that the magnetic tape MT1 is loaded into the magnetic tape drive 14 and a command to perform the magnetic processing on the data band DB while causing the magnetic tape MT1 to travel in the backward direction is received by the UI system device 34.

In step ST18, in a case in which the 32ch backward direction processing start condition is not satisfied, a negative determination is made, and the data read/write processing proceeds to step ST26 shown in FIG. 13B.

In step ST18, in a case in which the 32ch backward direction processing start condition is satisfied, a positive determination is made, and the data read/write processing proceeds to step ST20. It should be noted that a case in which a positive determination is made in this step ST18 is an example of a "case in which the number of the plurality of magnetic elements corresponds to 32 channels and the magnetic processing is performed on the data band in the reverse direction" according to the technology of the present disclosure.

In step ST20, the control device 30 disposes the second servo reading element pair SRP2 on the servo band SB by adjusting the position of the magnetic head 28 via the moving mechanism 48. After executing the processing of step ST20, the data read/write processing proceeds to step ST22.

In step ST22, the control device 30 controls the sending motor 36 and the winding motor 40 to cause the magnetic tape MT1 to travel in the backward direction. After executing the processing of step ST22, the data read/write processing proceeds to step ST24.

In step ST24, the control device 30 causes the second servo reading element pair SRP2 to start reading the servo band SB, and to start the magnetic processing by the 32 data read/write elements DRW on the reverse band RB. After executing the processing of step ST24, the data read/write processing proceeds to step ST40.

In step ST26 shown in FIG. 13B, the control device 30 determines whether or not a condition (hereinafter, referred to as a "64ch forward direction processing start condition") for performing the magnetic processing on the data band DB while causing the magnetic tape MT for 64 channels, that is, the magnetic tape MT2 to travel in the forward direction is satisfied. Examples of the 64ch forward direction processing start condition include a condition that the magnetic tape MT2 is loaded into the magnetic tape drive 14 and a command to perform the magnetic processing on the data band DB while causing the magnetic tape MT2 to travel in the forward direction is received by the UI system device 34.

In step ST26, in a case in which the 64ch forward direction processing start condition is not satisfied (that is, in a case in which the magnetic processing is performed on the data band DB while causing the magnetic tape MT2 to travel in the backward direction), a negative determination is made, and the data read/write processing proceeds to step ST34.

In step ST26, in a case in which the 64ch forward direction processing start condition is satisfied, a positive determination is made, and the data read/write processing proceeds to step ST28.

It should be noted that a case in which a positive determination is made in this step ST26 is an example of a "case in which the number of the plurality of magnetic elements corresponds to 64 channels and the magnetic processing is performed on the data band in the forward direction" according to the technology of the present disclosure. In addition, a case in which a negative determination is made in this step ST26 is an example of a "case in which the number of the plurality of magnetic elements corresponds to 64 channels and the magnetic processing is performed on the data band in the reverse direction" according to the technology of the present disclosure.

In step ST28, the control device 30 disposes the first servo reading element pair SRP1 on the first region 56A of the servo band SB by adjusting the position of the magnetic head 28 via the moving mechanism 48. After executing the processing of step ST28, the data read/write processing proceeds to step ST30.

In step ST30, the control device 30 controls the sending motor 36 and the winding motor 40 to cause the magnetic tape MT2 to travel in the forward direction. After executing the processing of step ST30, the data read/write processing proceeds to step ST32.

In step ST32, the control device 30 causes the first servo reading element pair SRP1 to start reading the first region 56A of the servo band SB, and to start the magnetic processing by all the data read/write elements DRW (that is, 64 data read/write elements DRW) on the forward band FB. After executing the processing of step ST32, the data read/write processing proceeds to step ST40 shown in FIG. 13A.

In step ST34, the control device 30 disposes the first servo reading element pair SRP1 on the second region 58A of the servo band SB by adjusting the position of the magnetic head 28 via the moving mechanism 48. After executing the processing of step ST34, the data read/write processing proceeds to step ST36.

In step ST36, the control device 30 controls the sending motor 36 and the winding motor 40 to cause the magnetic tape MT2 to travel in the backward direction. After executing the processing of step ST36, the data read/write processing proceeds to step ST38.

In step ST38, the control device 30 causes the first servo reading element pair SRP1 to start reading the second region 58A of the servo band SB, and to start the magnetic processing by all the data read/write elements DRW (that is, 64 data read/write elements DRW) on the reverse band RB. After executing the processing of step ST38, the data read/write processing proceeds to step ST40 shown in FIG. 13A.

In step ST40 shown in FIG. 13A, the control device 30 determines whether or not a condition for ending the data read/write processing (hereinafter, referred to as an "end condition") is satisfied. A first example of the end condition is a condition that a predetermined position of the magnetic tape MT (for example, an end edge of the magnetic tape MT in the forward direction or the backward direction) has reached on the magnetic element unit 42. A second example of the end condition is a condition that a command to end the data read/write processing is received by the UI system device 34.

In step ST40, in a case in which the end condition is not satisfied, a negative determination is made, and the data read/write processing proceeds to step ST10. In step ST40, in a case in which the end condition is satisfied, a positive determination is made, and the data read/write processing proceeds to step ST42.

In step ST42, the control device 30 ends the reading of the servo band SB by the servo reading element pair SRP and ends the magnetic processing by the data read/write element DRW. After executing the processing of step ST42, the data read/write processing ends.

As described above, in the magnetic tape system 10, the magnetic head 28 comprises the first servo reading element pair SRP1 and the second servo reading element pair SRP2. The first servo reading element pair SRP1 and the second servo reading element pair SRP2 read the pair of servo bands SB (for example, the servo bands SB2 and SB3) at different timings.

For example, with respect to the magnetic tape MT1 which is the magnetic tape MT for 32 channels, the pair of servo bands SB is read by the first servo reading element pair SRP1 in a case in which the magnetic tape MT2 travels in the forward direction (see FIG. 9), and the pair of servo bands SB is read by the second servo reading element pair SRP2 in a case in which the magnetic tape MT2 travels in the backward direction (see FIG. 10). In addition, the pair of servo bands SB of the magnetic tape MT2, which is the magnetic tape MT for 64 channels, is read by the first servo reading element pair SRP1 (see FIGS. 11 and 12).

The first servo reading element SR1 included in the first servo reading element pair SRP1 and the third servo reading element SR3 included in the second servo reading element pair SRP2 read one servo band SB of the pair of servo bands SB (for example, the servo band SB3) (see FIGS. 9 to 12). On the other hand, the second servo reading element SR2 included in the first servo reading element pair SRP1 and the fourth servo reading element SR4 included in the second servo reading element pair SRP2 read the other servo band SB of the pair of servo bands SB (for example, the servo band SB2) (see FIGS. 9 to 12).

That is, even in a case in which the number of channels is different (that is, even in a case of 32 channels or 64 channels), the servo reading element pair SRP reads the servo band SB, so that the tracking control can be performed on the data bands DB of the magnetic tapes MT1 and MT2 having the common width of the servo band SB. Therefore, even in a case in which the number of channels is different, it is possible to realize the magnetic processing on the data bands DB of the magnetic tapes MT1 and MT2 having the common width of the servo band SB. As a result, for example, even in a case in which the magnetic tape MT1 is loaded into the magnetic tape drive 14 and even in a case in which the magnetic tape MT2 is loaded into the magnetic tape drive 14, the tracking control using the servo reading element pair SRP is performed, so that the magnetic processing can be performed on each track TR in the data bands DB of the magnetic tapes MT1 and MT2.

In addition, in the magnetic tape system 10, the data band DB of the magnetic tape MT1 is divided into two regions, the forward band FB and the reverse band RB, along the width direction WD. Then, in a case in which the magnetic processing is performed on the forward band FB of the magnetic tape MT1, the pair of servo bands SB (for example, the servo bands SB2 and SB3) are read by the first servo reading element pair SRP1 (see FIG. 9). That is, the tracking control in a case in which the magnetic processing is performed on the forward band FB of the magnetic tape MT1 is performed in response to the servo pattern signals obtained by reading the pair of servo bands SB by the first servo reading element pair SRP1. Therefore, it is possible to realize the magnetic processing on the forward band FB of the magnetic tape MT1.

In addition, in a case in which the magnetic processing is performed on the reverse band RB of the magnetic tape MT1, the pair of servo bands SB is read by the second servo reading element pair SRP2 (see FIG. 10). That is, in a case in which the magnetic processing is performed on the reverse band RB of the magnetic tape MT1, the tracking control is performed in response to the servo pattern signals obtained by reading the pair of servo bands SB by the second servo reading element pair SRP2. Therefore, it is possible to realize the magnetic processing on the reverse band RB of the magnetic tape MT1.

In addition, in the magnetic tape system 10, in a case in which the magnetic processing is performed on the forward band FB of the magnetic tape MT1, the entire width of one servo band SB (for example, the servo band SB3) of the pair of servo bands SB is read by the first servo reading element SR1 (see FIG. 9). In addition, in parallel with this, the second servo reading element SR2 also reads the entire width of the other servo band SB (for example, the servo band SB2) of the pair of servo bands SB (see FIG. 9). That is, the tracking control in a case in which the magnetic processing is performed on the forward band FB of the magnetic tape MT1 is performed in response to the servo pattern signals obtained by reading the entire width of one servo band SB by the first servo reading element SR1 and reading the entire width of the other servo band SB by the second servo reading element SR2. Therefore, it is possible to realize the magnetic processing on the forward band FB of the magnetic tape MT1.

In addition, in the magnetic tape system 10, in a case in which the magnetic processing is performed on the reverse band RB of the magnetic tape MT1, the entire width of one servo band SB (for example, the servo band SB3) of the pair of servo bands SB is read by the third servo reading element SR3 (see FIG. 10). In addition, in parallel with this, the fourth servo reading element SR4 also reads the entire width of the other servo band SB (for example, the servo band SB2) of the pair of servo bands SB (see FIG. 10). That is, the tracking control in a case in which the magnetic processing is performed on the reverse band RB of the magnetic tape MT1 is performed in response to the servo pattern signals obtained by reading the entire width of one servo band SB by the third servo reading element SR3 and reading the entire width of the other servo band SB by the fourth servo reading element SR4. Therefore, it is possible to realize the magnetic processing on the reverse band RB of the magnetic tape MT1.

In addition, in the magnetic tape system 10, in a case in which the magnetic processing is performed on the forward band FB of the magnetic tape MT2, the first region 56A is read by the first servo reading element pair SRP1 (see FIG. 11). That is, the tracking control in a case in which the magnetic processing is performed on the forward band FB of the magnetic tape MT2 is performed in response to the servo pattern signal obtained by reading the first region 56A by the first servo reading element pair SRP1. Therefore, it is possible to realize the magnetic processing on the forward band FB of the magnetic tape MT2.

In addition, in the magnetic tape system 10, in a case in which the magnetic processing is performed on the reverse band RB of the magnetic tape MT2, the second region 58A is read by the first servo reading element pair SRP1 (see FIG. 12). That is, the tracking control in a case in which the magnetic processing is performed on the reverse band RB of the magnetic tape MT2 is performed in response to the servo pattern signal obtained by reading the second region 58A by the first servo reading element pair SRP1. Therefore, it is possible to realize the magnetic processing on the reverse band RB of the magnetic tape MT2.

In addition, in the magnetic tape system 10, in a case in which the number of data read/write elements DRW corresponds to 64 channels (that is, 64 data read/write elements DRW), the pair of servo bands SB are read by the first servo reading element pair SRP1 (see FIGS. 11 and 12). In addition, in a case in which the number of data read/write elements DRW corresponds to 32 channels (that is, 32 data read/write elements DRW), the pair of servo bands SB is read by the first servo reading element pair SRP1 and the second servo reading element pair SRP2 at different timings (that is, a timing for performing the magnetic processing in the forward direction and a timing for performing the magnetic processing in the backward direction) (see FIGS. 9 and 10). Therefore, even in a case in which the number of data read/write elements DRW corresponds to 64 channels and even in a case in which the number corresponds to 32 channels, it is possible to realize the magnetic processing on the data bands DB of the magnetic tapes MT1 and MT2 having the common width of the servo band SB.

In addition, in the magnetic tape system 10, in a case in which the number of data read/write elements DRW corresponds to 64 channels (that is, 64 data read/write elements DRW) and the magnetic processing is performed by all the data read/write elements DRW on a plurality of corresponding forward bands FB in the magnetic tape MT2, the first region 56A is read by the first servo reading element pair SRP1 (see FIG. 11). That is, the tracking control in a case in which the magnetic processing is performed on the forward band FB of the magnetic tape MT2 is performed in response to the servo pattern signal obtained by reading the first region 56A by the first servo reading element pair SRP1. Therefore, it is possible to realize the magnetic processing on the forward band FB of the magnetic tape MT2.

In addition, in the magnetic tape system 10, in a case in which the number of data read/write elements DRW corresponds to 64 channels (that is, 64 data read/write elements DRW) and the magnetic processing is performed by all the data read/write elements DRW on a plurality of corresponding reverse bands RB in the magnetic tape MT2, the second region 58A is read by the second servo reading element pair SRP2 (see FIG. 12). That is, the tracking control in a case in which the magnetic processing is performed on the reverse band RB of the magnetic tape MT2 is performed in response to the servo pattern signal obtained by reading the second region 58A by the second servo reading element pair SRP2. Therefore, it is possible to realize the magnetic processing on the reverse band RB of the magnetic tape MT2.

In addition, in the magnetic tape system 10, in a case in which the number of data read/write elements DRW corresponds to 32 channels (that is, 32 data read/write elements DRW) and the magnetic processing is performed by 32 data read/write elements DRW on a plurality of corresponding forward bands FB in the magnetic tape MT1, the pair of servo bands SB (that is, the servo bands SB2 and SB3) is read by the first servo reading element pair SRP1 (see FIG. 9). That is, the tracking control in a case in which the magnetic processing is performed on the forward band FB of the magnetic tape MT1 is performed in response to the servo pattern signals obtained by reading the pair of servo bands SB by the first servo reading element pair SRP1. Therefore, it is possible to realize the magnetic processing on the forward band FB of the magnetic tape MT1.

In addition, in the magnetic tape system 10, in a case in which the number of data read/write elements DRW corresponds to 32 channels (that is, 32 data read/write elements DRW) and the magnetic processing is performed by 32 data read/write elements DRW on a plurality of corresponding reverse bands RB in the magnetic tape MT1, the pair of servo bands SB (that is, the servo bands SB2 and SB3) is read by the second servo reading element pair SRP2 (see FIG. 10). That is, in a case in which the magnetic processing is performed on the reverse band RB of the magnetic tape MT1, the tracking control is performed in response to the servo pattern signals obtained by reading the pair of servo bands SB by the second servo reading element pair SRP2. Therefore, it is possible to realize the magnetic processing on the reverse band RB of the magnetic tape MT1.

In addition, in the magnetic tape system 10, in a case in which the magnetic head 28 performs the magnetic processing by 32 channels, 32 data read/write elements DRW thinned out at one interval among the plurality of data read/write elements DRW are activated. In a case in which the magnetic head 28 performs the magnetic processing by 64 channels, all the plurality of data read/write elements DRW are activated. Therefore, the magnetic processing on the magnetic tapes MT1 and MT2 having different numbers of channels can be realized without separately using the magnetic head for 32 channels and the magnetic head for 64 channels. As a result, for example, as long as the magnetic tape MT for 32 channels (that is, the magnetic tape MT1) and the magnetic tape MT for 64 channels (that is, the magnetic tape MT2) are continuously used, the magnetic head 28 can be used to handle the magnetic tape MT, and it is possible to contribute to the cost reduction.

In addition, in the magnetic tape system 10, the servo band SB of the magnetic tape MT1 and the servo band SB of the magnetic tape MT2 are shared. That is, the width of the servo band SB of the magnetic tape MT1 and the width of the servo band SB of the magnetic tape MT2 are common, and the configuration and the array of the servo patterns 52 are also common. Therefore, the same magnetic head 28 can be used even in a case in which the magnetic processing is performed on the magnetic tape MT1 or the magnetic processing is performed on the magnetic tape MT2.

It should be noted that, in the embodiment described above, the case has been described in which the technology of the present disclosure is applied to a combination of 32 channels and 64 channels, but the technology of the present disclosure is not limited to this. For example, in the same manner as in applying the technology of the present disclosure to the combination of 32 channels and 64 channels, the technology of the present disclosure can be applied to a combination of the number of channels of 64 or more channels (for example, 64 channels and 128 channels or 128 channels and 256 channels).

In the embodiment described above, the form example has been described on the premise of the magnetic head 28 having the specifications of switching between 32 channels and 64 channels by selectively activating the plurality of data read/write elements DRW. Therefore, for convenience, in the data read/write processing shown in FIGS. 13A and 13B, the form example has been described in which the determination is performed in step ST10, step ST18, and step ST26, but this is merely an example. For example, in a case in which the magnetic head 28 mounted on the magnetic tape drive 14 is a magnetic head having specifications that do not correspond to the activation of every other data read/write elements DRW (for example, a magnetic head having specifications in which only the data read/write element DRW at the position activated in a case of 32 channels among the plurality of data read/write elements DRW is disposed), the determination contents in step ST10, step ST18, and step ST26 are changed depending on the specifications of the magnetic head 28 mounted on the magnetic tape drive 14. For example, in a case in which the magnetic head 28 mounted on the magnetic tape drive 14 is a magnetic head having specifications in which only the data read/write element DRW at the position activated in a case of 32 channels among the plurality of data read/write elements DRW is disposed, the determination contents in step ST10, step ST18, and step ST26 included in the data read/write processing are the determination contents that can correspond only to reading and/or writing the data by the magnetic head 28 having 32 channels. In this case, for example, the determination processing in step ST26 shown in FIG. 13B is not necessary, as a result, step ST26 to step ST38 shown in FIG. 13B are not necessary.

In addition, for example, in a case in which the magnetic head 28 mounted on the magnetic tape drive 14 is a magnetic head having specifications in which only the data read/write element DRW at the position activated in a case of 64 channels among the plurality of data read/write elements DRW is disposed, the determination contents in step ST10, step ST18, and step ST26 included in the data read/write processing are the determination contents that can correspond only to reading and/or writing the data by the magnetic head 28 having 64 channels. In this case, for example, since the determination processing in step ST10 and step ST18 shown in FIG. 13A is not necessary, as a result, step ST10 to step ST24 shown in FIG. 13A are not necessary.

First Modification Example

In the embodiment described above, the form example has been described in which the magnetic processing is performed by using only one magnetic head 28, but the technology of the present disclosure is not limited to this. For example, the magnetic processing may be realized by using a magnetic head 28A that reads the data, a magnetic head 28B that records (writes) the data, and a magnetic head 28C that records (writes) the data in combination.

The plurality of data read/write elements DRW, the first servo reading element pair SRP1, and the second servo reading element pair SRP2 are mounted on the magnetic head 28A. The data read/write element DRW is a magnetic element that reads the data. In the magnetic head 28A, the plurality of data read/write elements DRW are arranged in the same manner as the plurality of data read/write elements DRW in the embodiment described above.

The magnetic head 28B is disposed on a side closer to the sending reel 22 than the magnetic head 28A. A plurality of data read/write elements DRW1, the first servo reading element pair SRP1, and the second servo reading element pair SRP2 are mounted on the magnetic head 28B. The plurality of data read/write elements DRW1 are magnetic elements that record (write) the data. In the magnetic head 28B, the plurality of data read/write elements DRW1 are arranged in the same manner as the plurality of data read/write elements DRW in the embodiment described above.

The magnetic head 28C is disposed on a side closer to the winding reel 38 than the magnetic head 28A. A plurality of data read/write elements DRW2, the first servo reading element pair SRP1, and the second servo reading element pair SRP2 are mounted on the magnetic head 28C. The plurality of data read/write elements DRW2 are magnetic elements that record (write) the data. In the magnetic head 28C, the plurality of data read/write elements DRW2 are arranged in the same manner as the plurality of data read/write elements DRW in the embodiment described above.

A moving mechanism 48A1 having the same configuration as the moving mechanism 48 in the embodiment described above is connected to the magnetic head 28A, and the moving mechanism 48A1 is controlled by the control device 30 in the same manner as the moving mechanism 48 in the embodiment described above. The moving mechanism 48A1 moves the magnetic head 28A along the width direction WD to adjust the position of the magnetic head 28A in the width direction WD, under the control of the control device 30.

A moving mechanism 48B having the same configuration as the moving mechanism 48 in the embodiment described above is connected to the magnetic head 28B, and the moving mechanism 48B is controlled by the control device 30 in the same manner as the moving mechanism 48 in the embodiment described above. The moving mechanism 48B moves the magnetic head 28B along the width direction WD to adjust the position of the magnetic head 28B in the width direction WD, under the control of the control device 30.

A moving mechanism 48C having the same configuration as the moving mechanism 48 in the embodiment described above is connected to the magnetic head 28C, and the moving mechanism 48C is controlled by the control device 30 in the same manner as the moving mechanism 48 in the embodiment described above. The moving mechanism 48C moves the magnetic head 28C along the width direction WD to adjust the position of the magnetic head 28C in the width direction WD, under the control of the control device 30.

It should be noted that the magnetic head 28A is also used as a verification head that performs verification on the data written in the magnetic tape MT by the magnetic head 28B or 28C.

Second Modification Example

By the way, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 15:
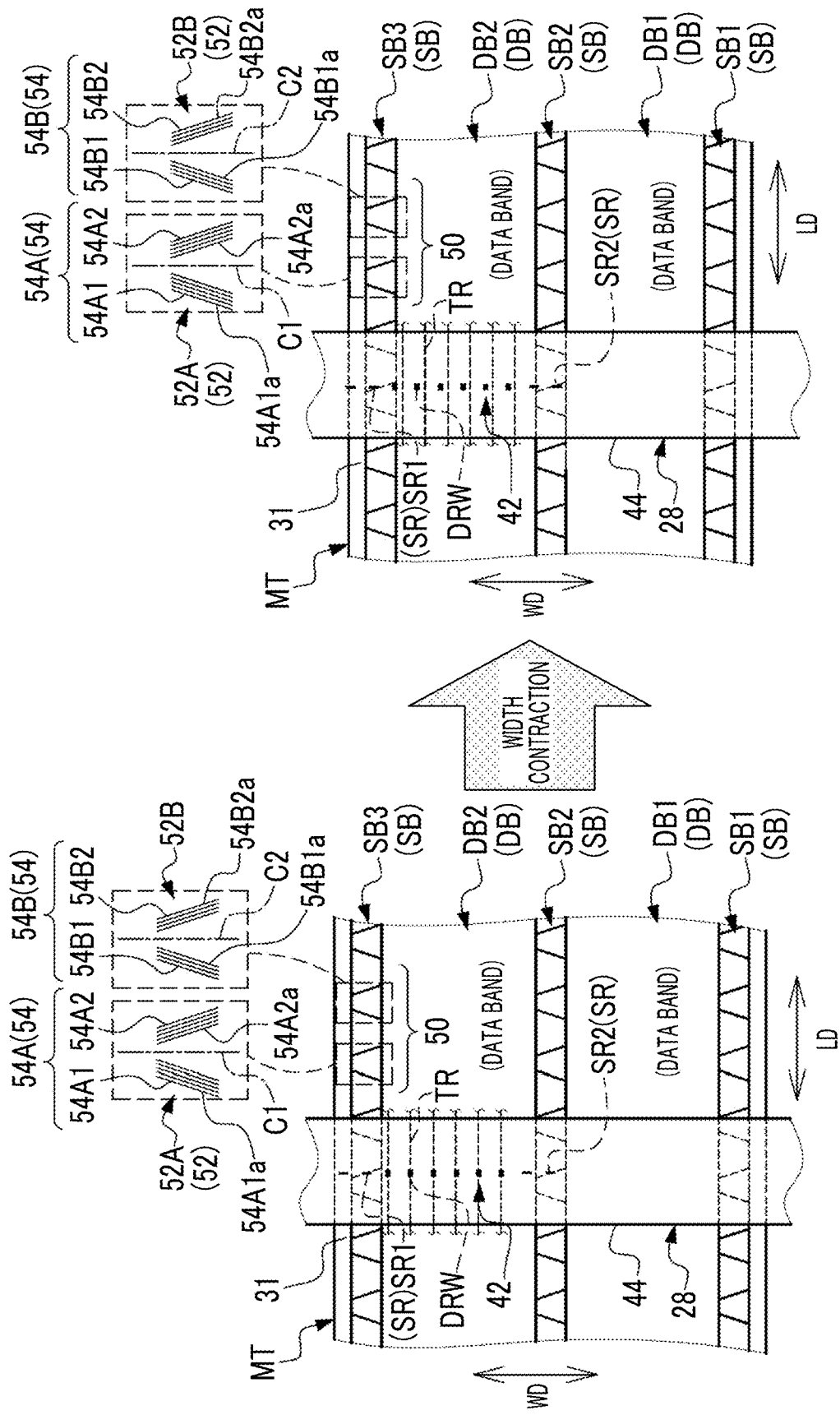
FIG. 15 is a conceptual diagram showing an example of an aspect in which the magnetic tape before and after a width of the magnetic tape contracts is observed from the front surface side of the magnetic tape.

In the example shown in FIG. 15, an aspect is shown in which the width of the magnetic tape MT contracts with the elapse of time. In this case, the off-track occurs. The off-track means a state in which the data read/write element DRW is not positioned on the designated track TR in the data band DB (that is, a state in which the position of the designated track TR and the position of the data read/write element DRW deviate from each other in the width direction WD).

In some cases, the width of the magnetic tape MT expands, and the off-track occurs in this case as well. That is, in a case in which the width of the magnetic tape MT contracts or expands with the elapse of time, the position of the servo reading element SR with respect to the servo pattern 52 diverges from a predetermined position (that is, a predetermined position determined in design with respect to each of the linear magnetization regions 54A1, 54A2, 54B1, and 54B2) determined in design in the width direction WD. In a case in which the position of the servo reading element SR with respect to the servo pattern 52 diverges from the predetermined position determined in design in the width direction WD, the accuracy of the tracking control is deteriorated, and the position of the designated track TR in the data band DB and the position of the data read/write element DRW deviate from each other. Then, an originally planned track TR will not be subjected to the magnetic processing.

Figure 16:
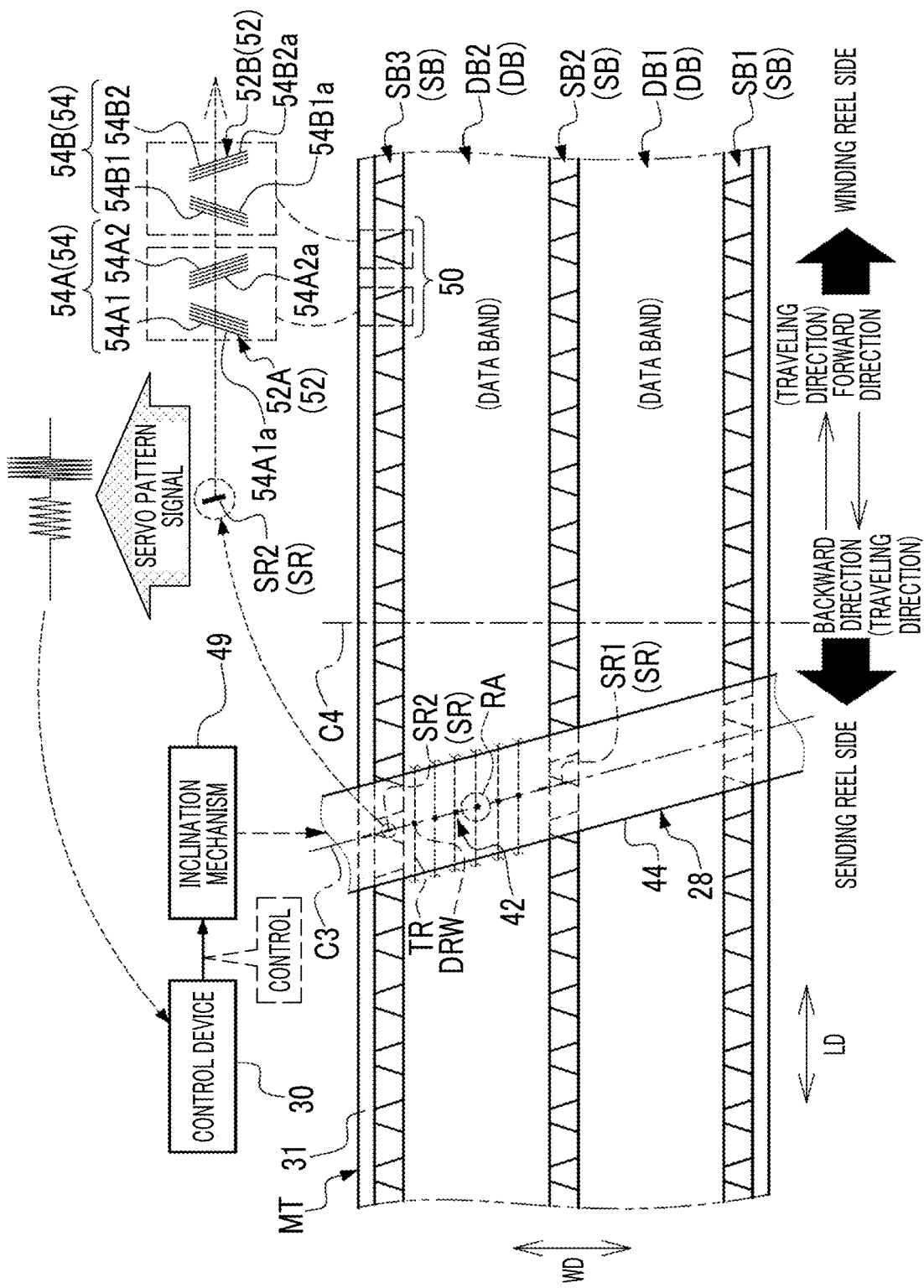
FIG. 16 is a conceptual diagram showing an example of an aspect in which a state in which the magnetic head is skewed on the magnetic tape in the magnetic tape system according to a second modification example is observed from the front surface side of the magnetic tape.

As a method of reducing the influence of the TDS, a method of adjusting the width of the magnetic tape MT by adjusting the tension applied to the magnetic tape MT is considered. However, in a case in which an amount of deformation of the magnetic tape MT in the width direction WD is too large, the off-track may not be eliminated even in a case in which the tension applied to the magnetic tape MT is adjusted. In addition, in a case in which the tension applied to the magnetic tape MT is increased, the load applied to the magnetic tape MT is also increased, which may lead to shortening the life of the magnetic tape MT. Further, in a case in which the tension applied to the magnetic tape MT is too weak, the contact state between the magnetic head 28 and the magnetic tape MT is unstable, and it is difficult for the magnetic head 28 to perform the magnetic processing on the magnetic tape MT. As a method of reducing the influence of the TDS other than the method of adjusting the tension applied to the magnetic tape MT, as shown in FIG. 16 as an example, a method of holding the position of the servo reading element SR with respect to the servo pattern 52 at the predetermined position determined in design by skewing the magnetic head 28 on the magnetic tape MT is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA.

An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is disposed in an inclined posture with respect to the width direction WD along the front surface 31 (in other words, a posture in which the imaginary straight line C3 is inclined with respect to the imaginary straight line C4 along the front surface 31). In the example shown in FIG. 16, the magnetic head 28 is held by the inclination mechanism 49 to have a posture in which the imaginary straight line C3 is inclined to the longitudinal direction LD side of the magnetic tape MT with respect to an imaginary straight line C4 which is an imaginary straight line along the width direction WD. In the example shown in FIG. 16, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 16). An angle formed by the imaginary straight line C3 and the imaginary straight line C4 corresponds to an angle at which the magnetic head 28 is inclined with respect to the width direction WD by rotating the magnetic head 28 on the front surface 31 with the rotation axis RA as a central axis along the front surface 31. The skew angle, which is an angle formed by the imaginary straight line C3 and the imaginary straight line C4, is an angle defined such that the counterclockwise direction as viewed from the paper surface side of FIG. 10 is positive and the clockwise direction as viewed from the paper surface side of FIG. 16 is negative.

The inclination mechanism 49 rotates the magnetic head 28 around the rotation axis RA on the front surface 31 of the magnetic tape MT, under the control of the control device 30. The inclination mechanism 49 rotates the magnetic head 28 around the rotation axis RA on the front surface 31 of the magnetic tape MT to change the direction of the inclination of the imaginary straight line C3 with respect to the imaginary straight line C4 (that is, azimuth) and the inclined angle. The change the direction of the inclination and the inclined angle of the imaginary straight line C3 with respect to the imaginary straight line C4 is realized by changing an angle at which the magnetic head 28 is inclined with respect to the width direction WD along the front surface 31, that is, the skew angle of the magnetic head 28. In the present embodiment, the direction of the inclination and the inclined angle of the imaginary straight line C3 with respect to the imaginary straight line C4 are represented by the skew angle of the magnetic head 28.

By changing the direction of the inclination of the imaginary straight line C3 with respect to the imaginary straight line C4 and the inclined angle, that is, the skew angle in accordance with the temperature, the humidity, the pressure at which the magnetic tape MT is wound around the reel, the temporal deterioration, and the like, or expansion and contraction of the magnetic tape MT in the width direction WD due to these, the position of the servo reading element SR with respect to the servo pattern 52 is held at the predetermined position determined in design. In this case, the on-track occurs. The on-track means a state in which the data read/write element DRW is positioned on the track TR (that is, a state in which the position of the designated track TR and the position of the data read/write element DRW match in the width direction WD).

In the above description, the servo pattern 52 is described as an example, but the servo pattern 52 is merely an example, and the technology of the present disclosure is established even in a case in which other types of servo patterns (that is, servo patterns having the geometrical characteristic different from the geometrical characteristic of the servo pattern 52) are used. In the following third modification example to tenth modification example, an aspect example of the magnetic tape MT in which a servo pattern of a type different from that of the servo pattern 52 is recorded will be described.

Third Modification Example

Figure 17:
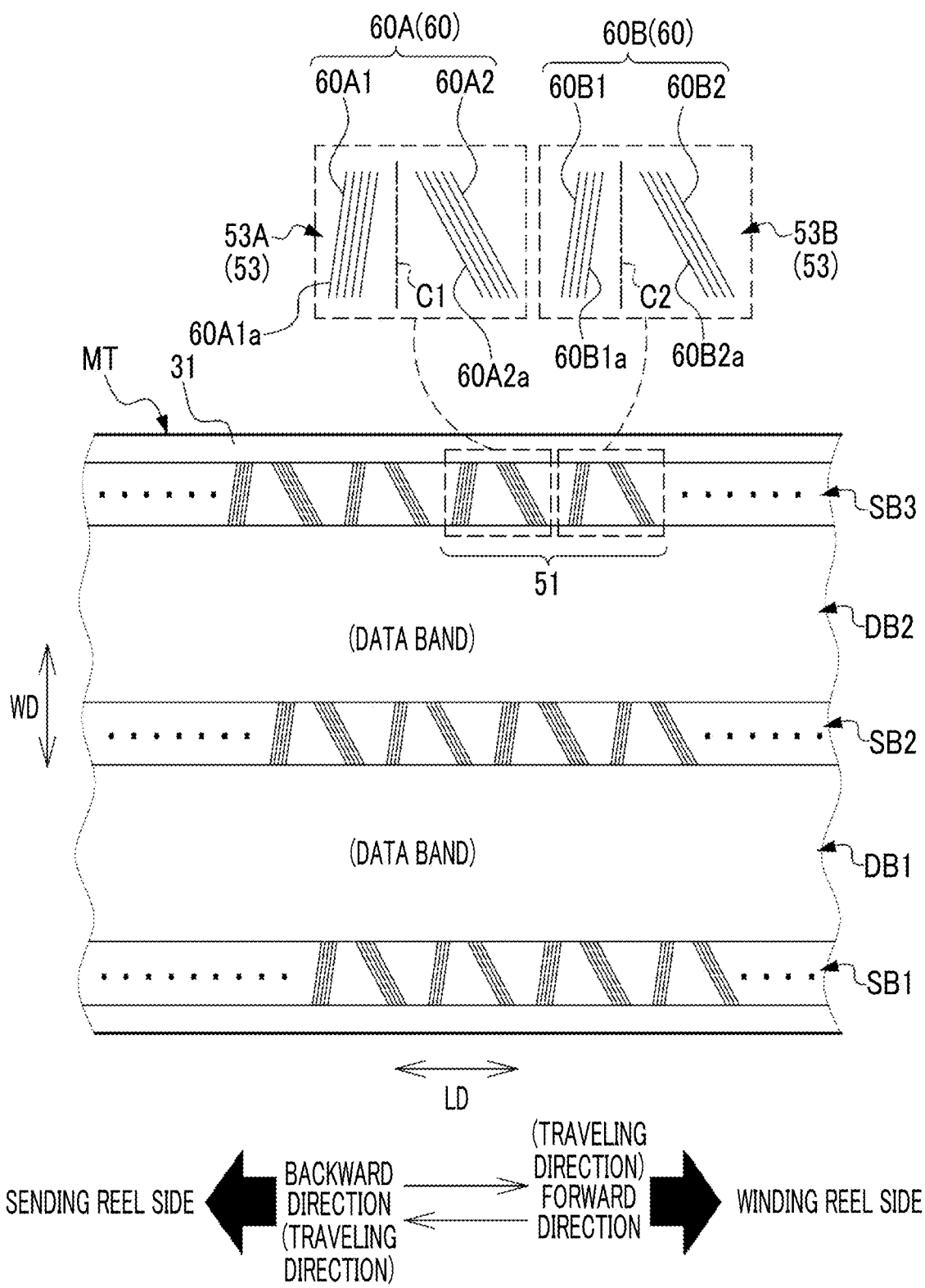
FIG. 17 is a conceptual diagram showing a third modification example, and is a conceptual diagram showing a modification example of the magnetic tape according to the embodiment (conceptual diagram showing an example of an aspect in which the magnetic tape is observed from the front surface side of the magnetic tape)

As shown in FIG. 17 as an example, the magnetic tape MT according to the third modification example is different from the magnetic tape MT shown in FIG. 8 in that a frame 51 is provided instead of the frame 50. The frame 51 is defined by a set of servo patterns 53. A plurality of servo patterns 53 are recorded in the servo band SB along the longitudinal direction LD of the magnetic tape MT. The plurality of servo patterns 53 are disposed at regular intervals along the longitudinal direction LD of the magnetic tape MT, similarly to the plurality of servo patterns 52 recorded in the magnetic tape MT shown in FIG. 8.

In the example shown in FIG. 17, servo patterns 53A and 53B are shown as an example of the set of servo patterns 53 included in the frame 51. The servo patterns 53A and 53B are adjacent to each other along the longitudinal direction LD of the magnetic tape MT, and the servo pattern 53A is positioned on the upstream side in the forward direction in the frame 51, and the servo pattern 53B is positioned on the downstream side in the forward direction.

The servo pattern 53 consists of a linear magnetization region pair 60. The linear magnetization region pair 60 is classified into a linear magnetization region pair 60A and a linear magnetization region pair 60B.

The servo pattern 53A consists of the linear magnetization region pair 60A. In the example shown in FIG. 17, a pair of linear magnetization regions 60A1 and 60A2 is shown as an example of the linear magnetization region pair 60A. Each of the linear magnetization regions 60A1 and 60A2 is a linearly magnetized region.

The linear magnetization regions 60A1 and 60A2 are inclined in opposite directions with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep" means that, for example, an angle of the linear magnetization region 60A1 with respect to the imaginary straight line C1 is smaller than an angle of the linear magnetization region 60A2 with respect to the imaginary straight line C1. In addition, a total length of the linear magnetization region 60A1 is shorter than a total length of the linear magnetization region 60A2.

In the servo pattern 53A, a plurality of magnetization straight lines 60A1*a* are included in the linear magnetization region 60A1, and a plurality of magnetization straight lines 60A2*a* are included in the linear magnetization region 60A2. The number of the magnetization straight lines 60A1*a* included in the linear magnetization region 60A1 is the same as the number of the magnetization straight lines 60A2*a* included in the linear magnetization region 60A2.

The linear magnetization region 60A1 is a set of magnetization straight lines 60A1*a*, which are five magnetized straight lines, and the linear magnetization region 60A2 is a set of magnetization straight lines 60A2*a*, which are five magnetized straight lines. In the servo band SB, the positions of both ends of the linear magnetization region 60A1 (that is, the positions of both ends of each of the five magnetization straight lines 60A1*a*) and the positions of both ends of the linear magnetization region 60A2 (that is, the positions of both ends of each of the five magnetization straight lines 60A2*a*) are aligned in the width direction WD. It should be noted that, here, the example has been described in which the positions of both ends of each of the five magnetization straight lines 60A1*a* and the positions of both ends of each of the five magnetization straight lines 60A2*a* are aligned, but this is merely an example, and the positions of both ends of one or more magnetization straight lines 60A1*a* among the five magnetization straight lines 60A1*a* and the positions of both ends of one or more magnetization straight lines 60A2*a* among of the five magnetization straight lines 60A2*a* need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 53B consists of the linear magnetization region pair 60B. In the example shown in FIG. 17, a pair of linear magnetization regions 60B1 and 60B2 is shown as an example of the linear magnetization region pair 60B. Each of the linear magnetization regions 60B1 and 60B2 is a linearly magnetized region.

The linear magnetization regions 60B1 and 60B2 are inclined in opposite directions with respect to the imaginary straight line C2. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2. In addition, a total length of the linear magnetization region 60B1 is shorter than a total length of the linear magnetization region 60B2.

In the servo pattern 53B, a plurality of magnetization straight lines 60B1*a* are included in the linear magnetization region 60B1, and a plurality of magnetization straight lines 60B2*a* are included in the linear magnetization region 60B2. The number of the magnetization straight lines 60B1*a* included in the linear magnetization region 60B1 is the same as the number of the magnetization straight lines 60B2*a* included in the linear magnetization region 60B2.

The total number of the magnetization straight lines 60B1*a* and 60B2*a* included in the servo pattern 53B is different from the total number of the magnetization straight lines 60A1*a* and 60A2*a* included in the servo pattern 53A. In the example shown in FIG. 17, the total number of the magnetization straight lines 60A1*a* and 60A2*a* included in the servo pattern 53A is ten, whereas the total number of the magnetization straight lines 60B1*a* and 60B2*a* included in the servo pattern 53B is eight.

The linear magnetization region 60B1 is a set of magnetization straight lines 60B1*a*, which are four magnetized straight lines, and the linear magnetization region 60B2 is a set of magnetization straight lines 60B2*a*, which are four magnetized straight lines. In the servo band SB, the positions of both ends of the linear magnetization region 60B1 (that is, the positions of both ends of each of the four magnetization straight lines 60B1*a*) and the positions of both ends of the linear magnetization region 60B2 (that is, the positions of both ends of each of the four magnetization straight lines 60B2*a*) are aligned in the width direction WD.

It should be noted that, here, the example has been described in which the positions of both ends of each of the four magnetization straight lines 60B1*a* and the positions of both ends of each of the four magnetization straight lines 60B2*a* are aligned, but this is merely an example, and the positions of both ends of one or more magnetization straight lines 60B1*a* among the four magnetization straight lines 60B1*a* and the positions of both ends of one or more magnetization straight lines 60B2*a* among of the four magnetization straight lines 60B2*a* need only be aligned.

In addition, here, the set of magnetization straight lines 60A1*a*, which are five magnetized straight lines, is described as an example of the linear magnetization region 60A1, the set of magnetization straight lines 60A2*a*, which are five magnetized straight lines, is described as an example of the linear magnetization region 60A2, the set of magnetization straight lines 60B1*a*, which are four magnetized straight lines, is described as an example of the linear magnetization region 60B1, and the set of magnetization straight lines 60B2*a*, which are four magnetized straight lines, is described as an example of the linear magnetization region 60B2, but the technology of the present disclosure is not limited thereto. For example, the linear magnetization region 60A1 need only have the number of the magnetization straight lines 60A1*a* that contribute to specifying the position of the magnetic head 28 on the magnetic tape MT, the linear magnetization region 60A2 need only have the number of the magnetization straight lines 60A2*a* that contribute to specifying the position of the magnetic head 28 on the magnetic tape MT, the linear magnetization region 60B1 need only have the number of the magnetization straight lines 60B1*a* that contribute to specifying the position of the magnetic head 28 on the magnetic tape MT, and the linear magnetization region 60B2 need only have the number of the magnetization straight lines 60B2*a* that contribute to specifying the position of the magnetic head 28 on the magnetic tape MT.

Here, the geometrical characteristic of the linear magnetization region pair 60A on the magnetic tape MT will be described with reference to FIG. 18.

Figure 18:
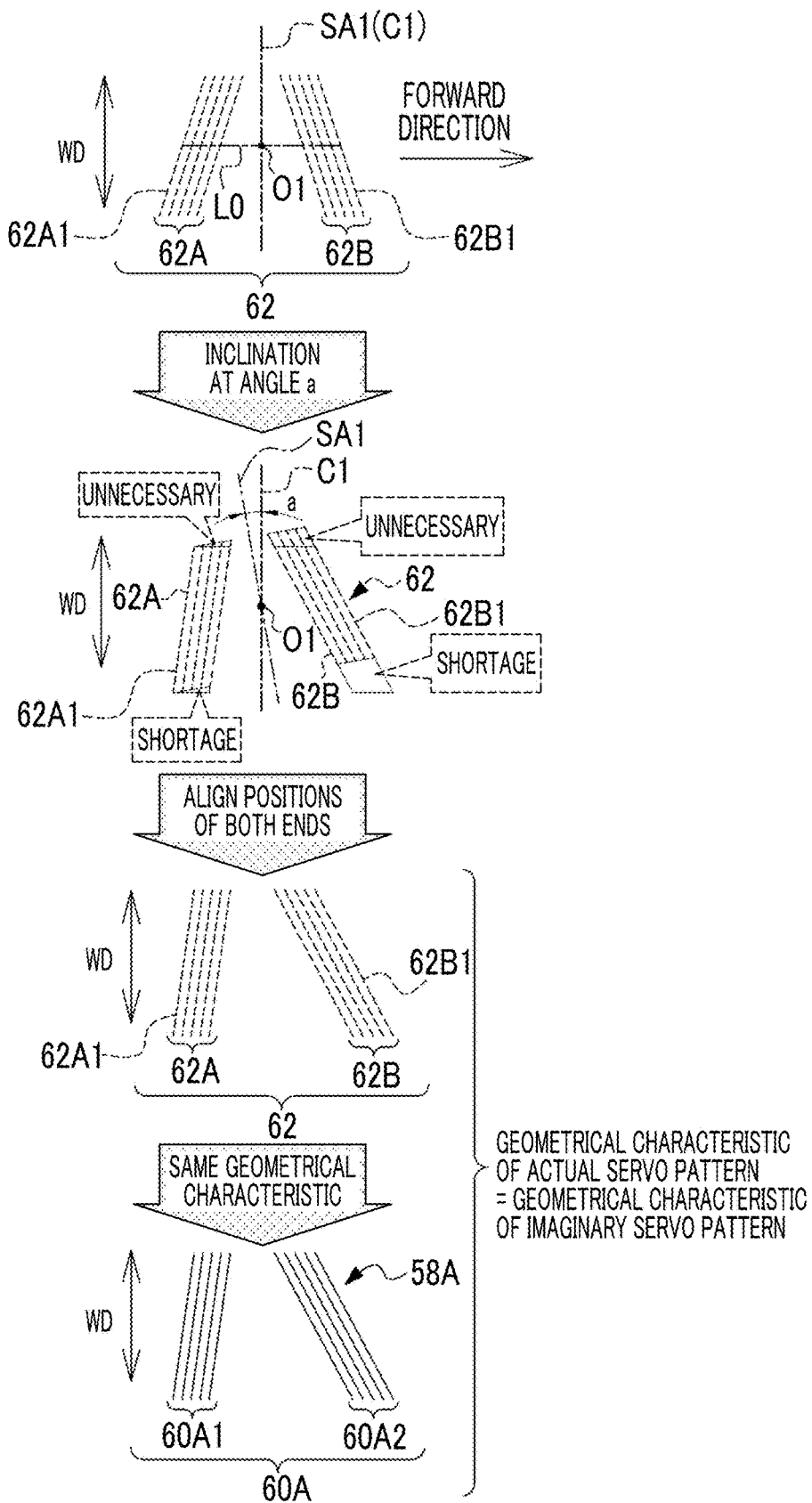
FIG. 18 is a conceptual diagram showing the third modification example, and is a conceptual diagram showing a relationship between a geometrical characteristic of an actual servo pattern and a geometrical characteristic of an imaginary servo pattern.

As an example, as shown in FIG. 18, the geometrical characteristic of the linear magnetization region pair 60A on the magnetic tape MT can be expressed by using an imaginary linear region pair 62. The imaginary linear region pair 62 consists of an imaginary linear region 62A and an imaginary linear region 62B. The geometrical characteristic of the linear magnetization region pair 60A on the magnetic tape MT corresponds to the geometrical characteristic based on the imaginary linear region pair 62 inclined line-symmetrically with respect to the imaginary straight line C1 in a case in which an entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region pair 62 is an imaginary linear magnetization region pair having the same geometrical characteristic as the linear magnetization region pair 54A shown in FIG. 8. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 8, and consists of five imaginary straight lines 62A1 corresponding to the five magnetization straight lines 54A1*a* shown in FIG. 8. The imaginary linear region 62B has the same geometrical characteristic as the linear magnetization region 54B1 shown in FIG. 8, and consists of five imaginary straight lines 62B1 corresponding to the five magnetization straight lines 54A2*a* shown in FIG. 8.

A center O1 is provided in the imaginary linear region pair 62. For example, the center O1 is a center of a line segment L0 connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 8, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which the entirety of the imaginary linear region pair 62 is inclined with respect to the imaginary straight line C1 by inclining the symmetry axis SA1 of the imaginary linear regions 62A and 62B at an angle a (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read but the imaginary linear region 62B is read. That is, in each of the imaginary linear regions 62A and 62B, in a case in which reading by the servo reading element SR is performed, a shortage part and an unnecessary part are generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 53A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

It should be noted that the linear magnetization region pair 60B is different from the linear magnetization region pair 60A only in that the four magnetization straight lines 60B1*a* are provided instead of the five magnetization straight lines 60A1*a* and the four magnetization straight lines 60B2*a* are provided instead of the five magnetization straight lines 60A2*a*. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 19:
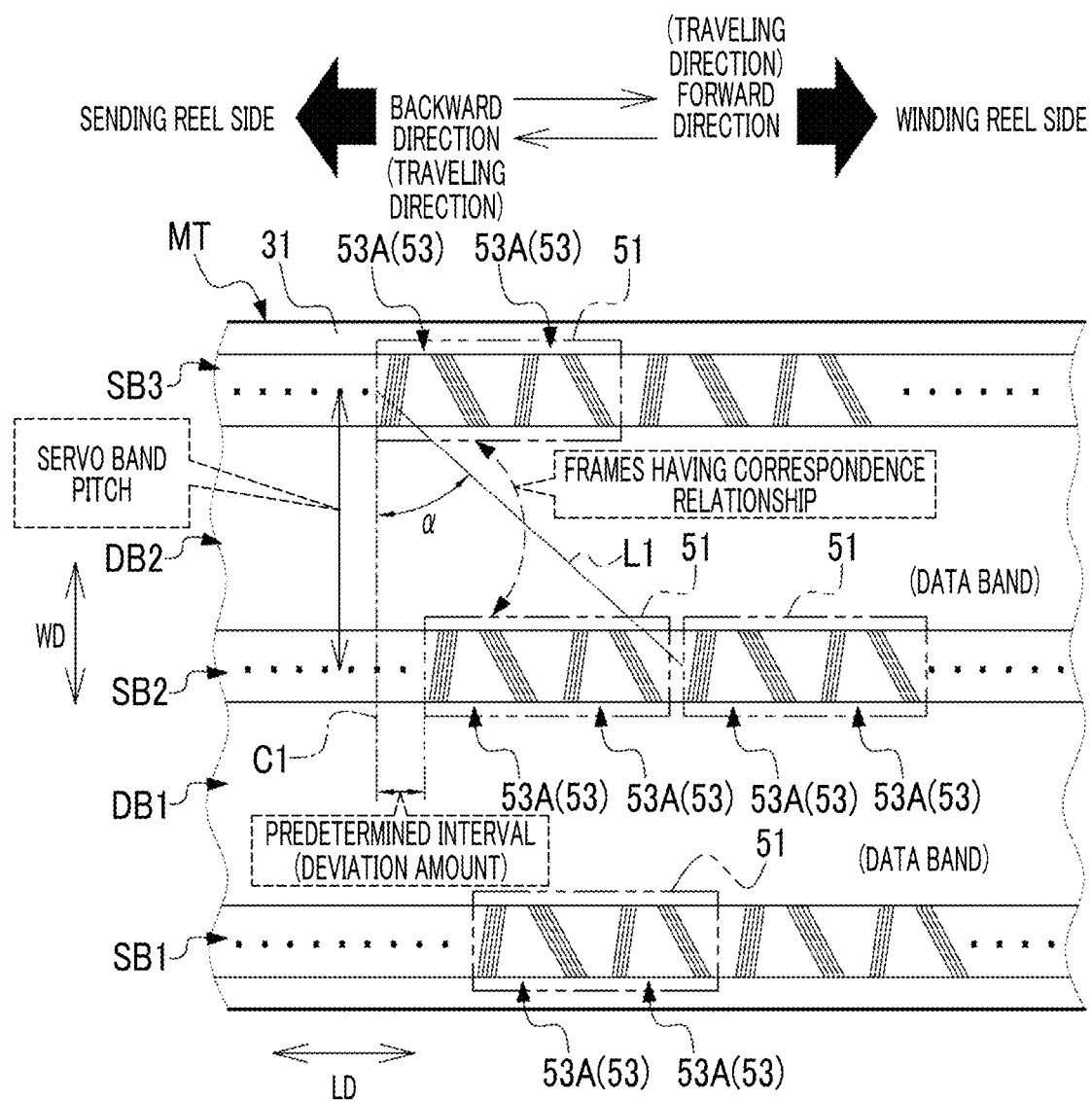
FIG. 19 is a conceptual diagram showing the third modification example, and is a conceptual diagram showing an example of an aspect in which a state in which frames corresponding to each other between the servo bands adjacent to each other in a width direction of the magnetic tape deviate from each other at a predetermined interval is observed from the front surface side of the magnetic tape.

As an example, as shown in FIG. 19, the plurality of servo bands SB are formed on the magnetic tape MT in the width direction WD, and the frames 51 having a correspondence relationship between the servo bands SB deviate from each other at predetermined intervals in the longitudinal direction LD, between the servo bands SB adjacent to each other in the width direction WD of the magnetic tape MT. The above description means that the servo patterns 53 having a correspondence relationship between the servo bands SB deviate from each other at the predetermined interval in the longitudinal direction LD between the servo bands SB adjacent to each other in the width direction WD of the magnetic tape MT.

The predetermined interval is defined based on an angle $\alpha$, a pitch between the servo bands SB adjacent to each other in the width direction WD (hereinafter, also referred to as a "servo band pitch"), and a frame length. In the example shown in FIG. 19, the angle $\alpha$ is exaggerated in order to make it easier to visually grasp the angle $\alpha$, but in reality, the angle $\alpha$ is, for example, about 15 degrees. The angle $\alpha$ is an angle formed by the frames 51 having no correspondence relationship between the servo bands SB adjacent to each other in the width direction WD and the imaginary straight line C1. In the example shown in FIG. 19, as an example of the angle $\alpha$, an angle formed by an interval (in the example shown in FIG. 19, a line segment L1) between one frame 51 of a pair of frames 51 having a correspondence relationship between the servo bands SB adjacent to each other in the width direction WD (in the example shown in FIG. 19, one frame 51 of the servo band SB3) and the frame 51 adjacent to the other frame 51 of the pair of frames 51 (in the example shown in FIG. 19, the frame 51 having a correspondence relationship with one frame 51 of the servo band SB3 among a plurality of frames 51 in the servo band SB2), and the imaginary straight line C1 is shown. In this case, the frame length refers to the total length of the frame 51 with respect to the longitudinal direction LD of the magnetic tape MT. The predetermined interval is defined by Expression (1). It should be noted that Mod (A/B) means a remainder generated in a case in which "A" is divided by "B".

$$\text{(Predetermined interval)} = \text{Mod}\{(\text{Servo band pitch} \times \tan \alpha)/(\text{Frame length})\} \quad (1)$$

It should be noted that, in the example shown in FIG. 19, the angle formed by the interval between one frame 51 of the pair of frames 51 having a correspondence relationship between the servo bands SB adjacent to each other in the width direction WD (hereinafter, also referred to as "first frame") and the frame 51 adjacent to the other frame 51 of the pair of frames 51 (hereinafter, also referred to as "second frame"), and the imaginary straight line C1 has been described as the angle $\alpha$, but the technology of the present disclosure is not limited to this. For example, as the angle $\alpha$, an angle formed by an interval between the first frame and the frame 51 away from the second frame by two or more frames (hereinafter, also referred to as "third frame") in the same servo band SB as the second frame, and the imaginary straight line C1 may be used. In this case, the "frame length" used in Expression (1) is the pitch between the second frame and the third frame in the longitudinal direction LD of the magnetic tape MT (for example, a distance from the distal end of the second frame to the distal end of the third frame).

Figure 20:
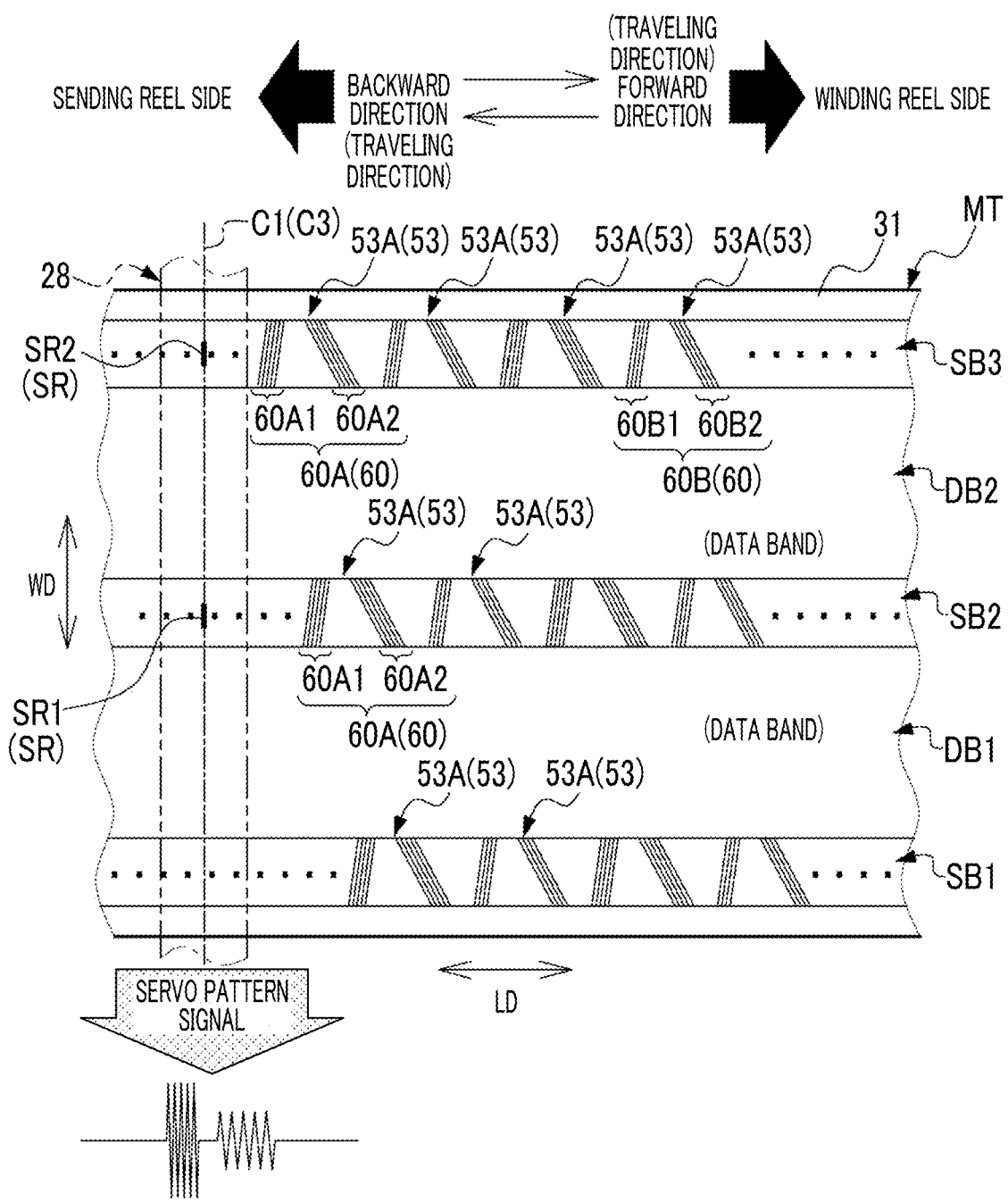
FIG. 20 is a conceptual diagram showing the third modification example, and is a conceptual diagram showing an example of an aspect in which a state in which the servo pattern is read by a servo reading element provided in the magnetic head that is not skewed on the magnetic tape is observed from the front surface side of the magnetic tape.

As an example, as shown in FIG. 20, in a case in which the servo pattern 53A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo pattern signal derived from the linear magnetization region 60A1 and the servo pattern signal derived from the linear magnetization region 60A2.

In addition, also in a case in which the servo pattern 53B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 21:
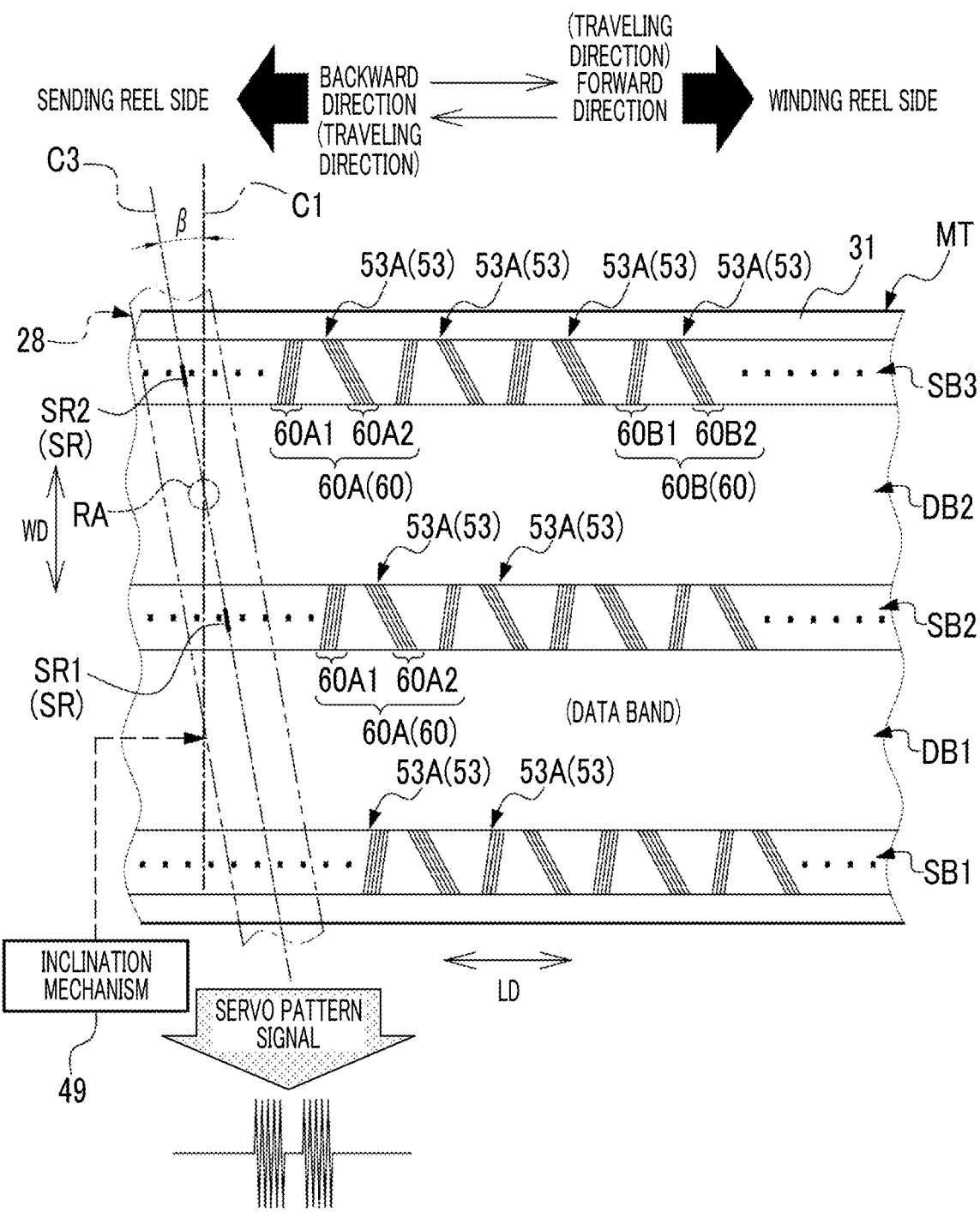
FIG. 21 is a conceptual diagram showing the third modification example, and is a conceptual diagram showing an example of an aspect in which a state in which the servo pattern is read by the servo reading element provided in the magnetic head that is skewed on the magnetic tape is observed from the front surface side of the magnetic tape.

Therefore, as an example, as shown in FIG. 21, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle $\beta$ (that is, the angle $\beta$ counterclockwise as viewed from the paper surface side of FIG. 21). As described above, since the magnetic head 28 is inclined to the upstream side in the forward direction at the angle $\beta$ on the magnetic tape MT, the variation due to the azimuth loss between the servo pattern signal derived from the linear magnetization region 60A1 and the servo pattern signal derived from the linear magnetization region 60A2 is smaller than that in the example shown in FIG. 20. In addition, also in a case in which the servo pattern 53B (that is, the linear magnetization region pair 60B) is read by the servo reading element SR, similarly, the variation due to the azimuth loss between the servo pattern signal derived from the linear magnetization region 60B1 and the servo pattern signal derived from the linear magnetization region 60B2 is small.

Fourth Modification Example

Figure 22:
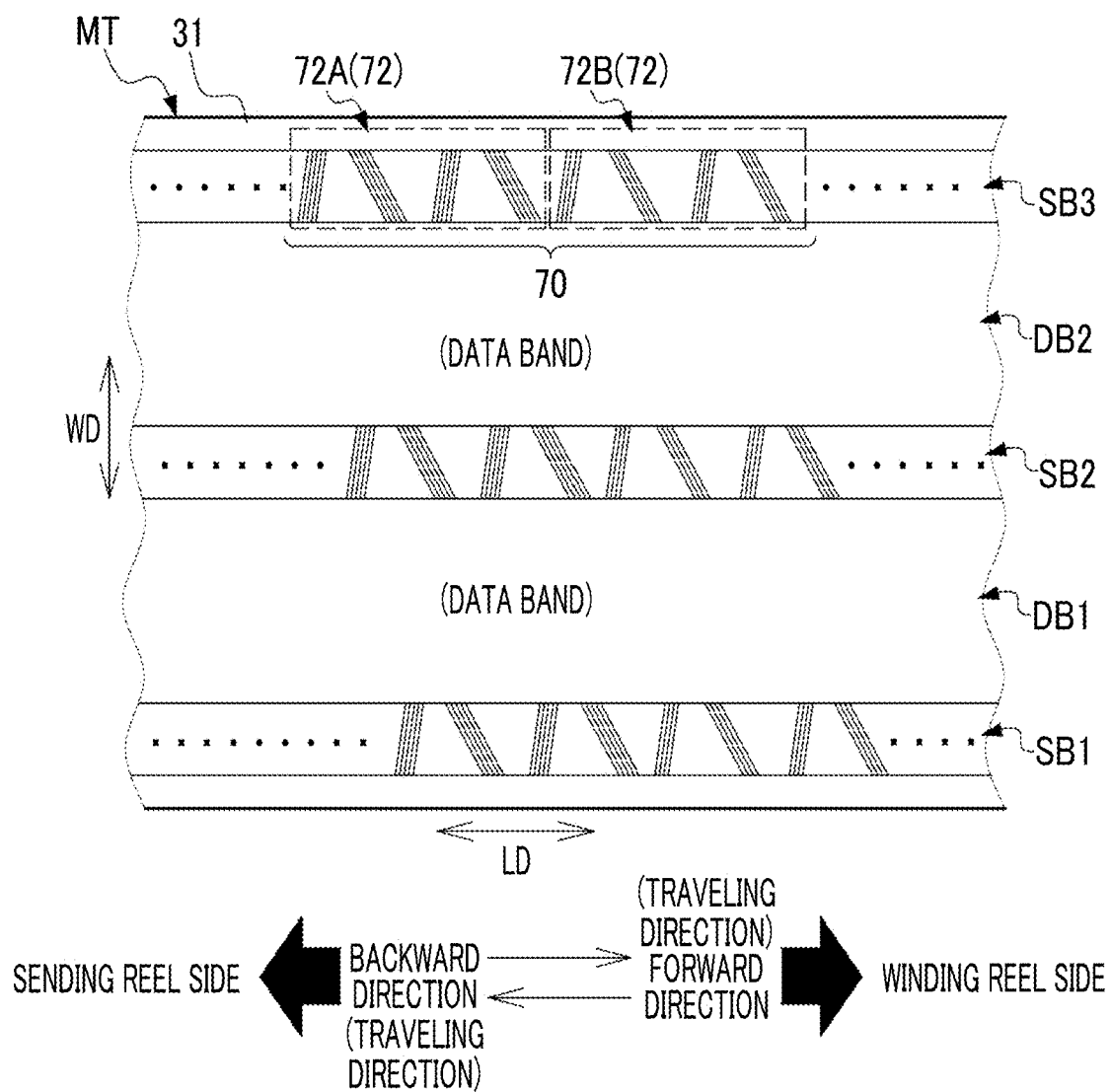
FIG. 22 is a conceptual diagram showing a fourth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the first modification example described above, the form example has been described in which the servo band SB is divided by a plurality of frames 51 along the longitudinal direction LD of the magnetic tape MT, but the technology of the present disclosure is not limited to this. For example, as shown in FIG. 22, the servo band SB may be divided by a frame 70 along the longitudinal direction LD of the magnetic tape MT. The frame 70 is defined by a set of servo patterns 72. A plurality of servo patterns 72 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 52.

In the example shown in FIG. 22, a pair of servo patterns 72A and 72B is shown as an example of the set of servo patterns 72. Each of the servo patterns 72A and 72B is an M-shaped magnetized servo pattern. The servo patterns 72A and 72B are adjacent to each other along the longitudinal direction LD of the magnetic tape MT, and the servo pattern 72A is positioned on the upstream side in the forward direction and the servo pattern 72B is positioned on the downstream side in the forward direction in the frame 70.

Figure 23:
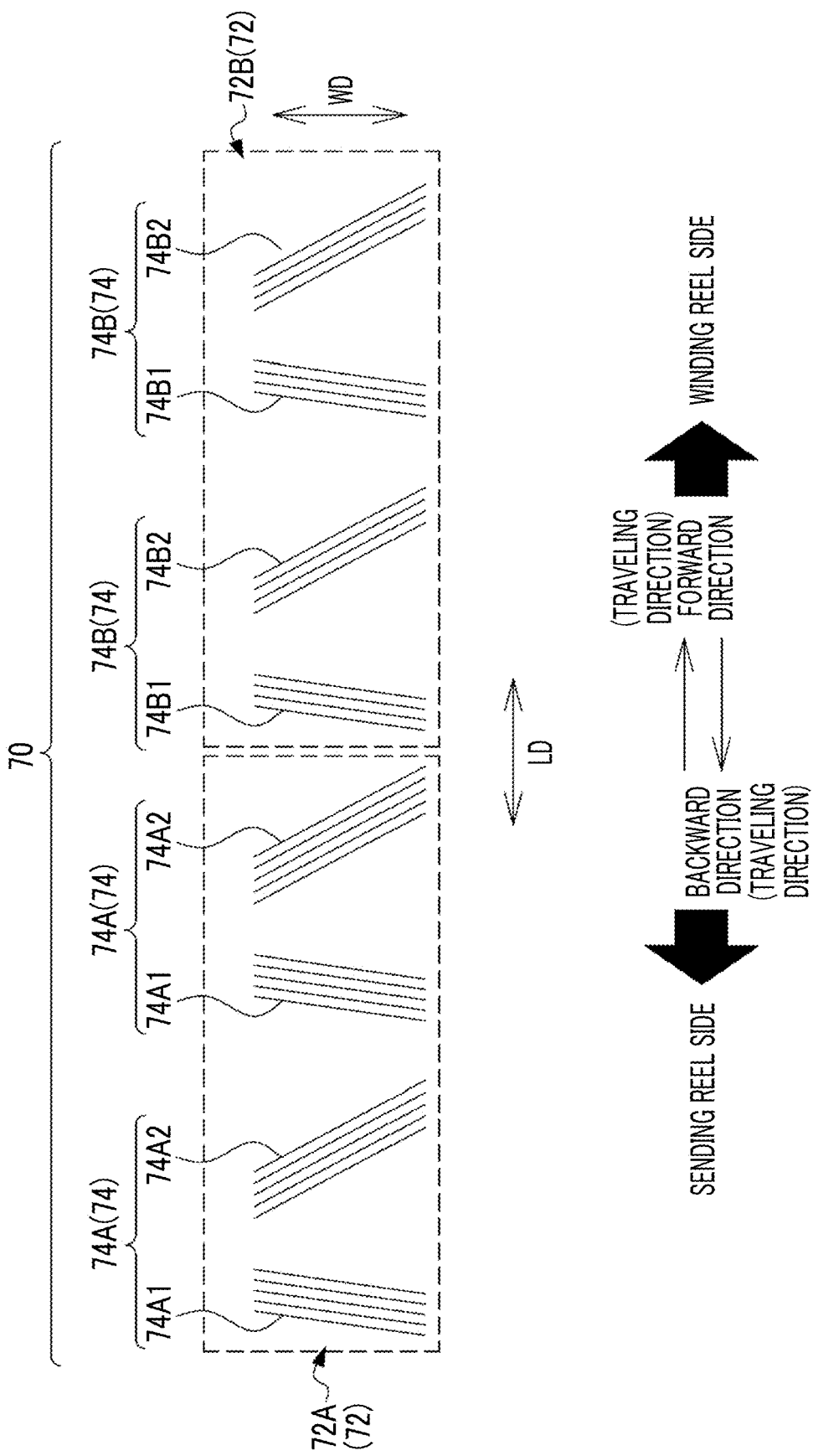
FIG. 23 is a conceptual diagram showing the fourth modification example, and is a conceptual diagram showing an example of an aspect of the servo pattern included in the magnetic tape.

As an example, as shown in FIG. 23, the servo pattern 72 consists of a linear magnetization region pair 74. The linear magnetization region pair 74 is classified into a linear magnetization region pair 74A and a linear magnetization region pair 74B.

The servo pattern 72A consists of a set of linear magnetization region pairs 74A. The set of linear magnetization region pairs 74A are disposed in a state of being adjacent to each other along the longitudinal direction LD of the magnetic tape MT.

In the example shown in FIG. 23, a pair of linear magnetization regions 74A1 and 74A2 is shown as an example of the linear magnetization region pair 74A. The linear magnetization region pair 74A is configured in the same manner as the linear magnetization region pair 60A described in the third modification example, and has the same geometrical characteristic as the linear magnetization region pair 60A. That is, the linear magnetization region 74A1 is configured in the same manner as the linear magnetization region 60A1 described in the third modification example, and has the same geometrical characteristic as the linear magnetization region 60A1, and the linear magnetization region 74A2 is configured in the same manner as the linear magnetization region 60A2 described in the third modification example, and has the same geometrical characteristic as the linear magnetization region 60A2.

The servo pattern 72B consists of a set of linear magnetization region pairs 74B. The set of linear magnetization region pairs 74B are disposed in a state of being adjacent to each other along the longitudinal direction LD of the magnetic tape MT.

In the example shown in FIG. 23 a pair of linear magnetization regions 74B1 and 74B2 is shown as an example of the linear magnetization region pair 74B. The linear magnetization region pair 74B is configured in the same manner as the linear magnetization region pair 60B described in the third modification example, and has the same geometrical characteristic as the linear magnetization region pair 60B. That is, the linear magnetization region 74B1 is configured in the same manner as the linear magnetization region 60B1 described in the third modification example, and has the same geometrical characteristic as the linear magnetization region 60B1, and the linear magnetization region 74B2 is configured in the same manner as the linear magnetization region 60B2 described in the third modification example, and has the same geometrical characteristic as the linear magnetization region 60B2.

Fifth Modification Example

Figure 24:
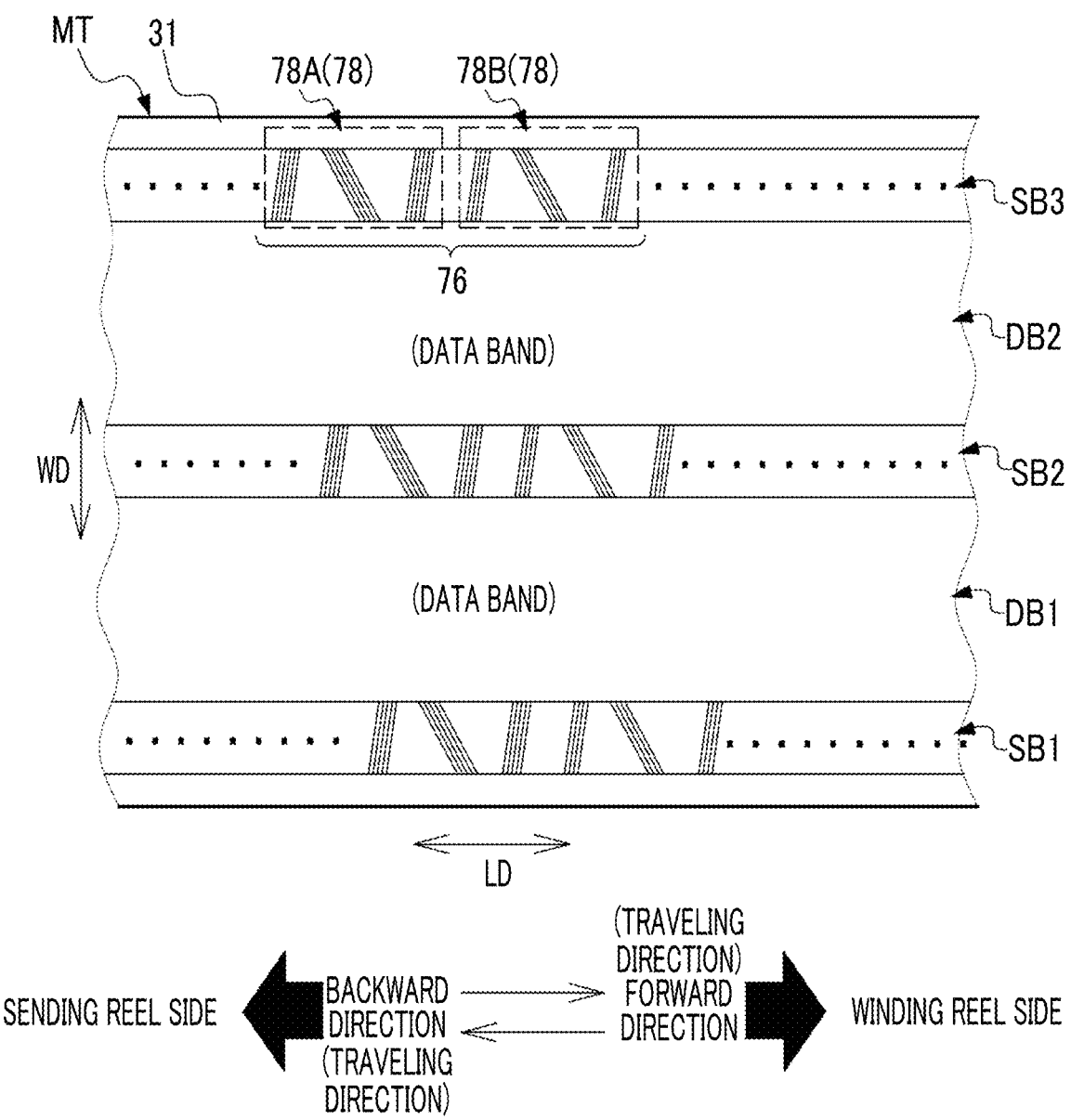
FIG. 24 is a conceptual diagram showing a fifth modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 22, the form example has been described in which the servo band SB is divided by a plurality of frames 70 along the longitudinal direction LD of the magnetic tape MT, but the technology of the present disclosure is not limited to this. For example, as shown in FIG. 24, the servo band SB may be divided by a frame 76 along the longitudinal direction LD of the magnetic tape MT. The frame 76 is defined by a set of servo patterns 78. A plurality of servo patterns 78 are recorded in the servo band SB along the longitudinal direction LD of the magnetic tape MT. Similarly to the plurality of servo patterns 72 (see FIG. 22), the plurality of servo patterns 78 are disposed at regular intervals along the longitudinal direction LD of the magnetic tape MT.

In the example shown in FIG. 24, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD of the magnetic tape MT, and the servo pattern 78A is positioned on the upstream side in the forward direction and the servo pattern 78B is positioned on the downstream side in the forward direction in the frame 76.

Figure 25:
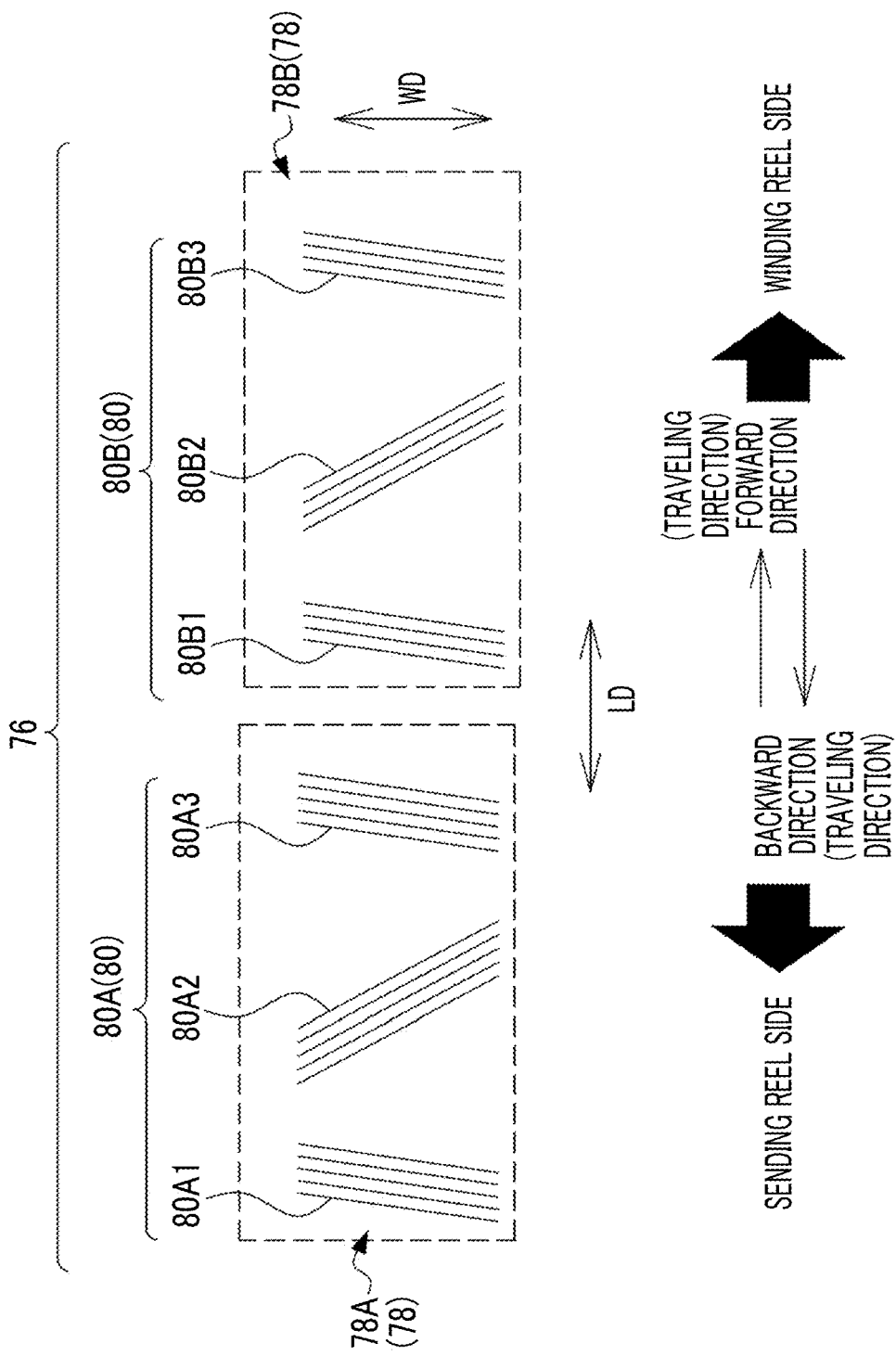
FIG. 25 is a conceptual diagram showing the fifth modification example, and is a conceptual diagram showing an example of an aspect of the servo pattern included in the magnetic tape.

As an example, as shown in FIG. 25, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD of the magnetic tape MT. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 25, and have the same geometrical characteristics as the linear magnetization region pair 74A. That is, the linear magnetization region 80A1 is configured in the same manner as the linear magnetization region 74A1 shown in FIG. 25, and have the same geometrical characteristic as the linear magnetization region 74A1, and the linear magnetization region 80A2 is configured in the same manner as the linear magnetization region 74A2 shown in FIG. 25, and have the same geometrical characteristic as the linear magnetization region 74A2.

In addition, the linear magnetization region 80A3 is configured in the same manner as the linear magnetization region 80A1, and has the same geometrical characteristic as the linear magnetization region 80A1.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD of the magnetic tape MT. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 25, and have the same geometrical characteristics as the linear magnetization region pair 74B. That is, the linear magnetization region 80B1 is configured in the same manner as the linear magnetization region 74B1 shown in FIG. 25, and have the same geometrical characteristic as the linear magnetization region 74B1, and the linear magnetization region 80B2 is configured in the same manner as the linear magnetization region 74B2 shown in FIG. 25, and have the same geometrical characteristic as the linear magnetization region 74B2.

In addition, the linear magnetization region 80B3 is configured in the same manner as the linear magnetization region 80B1, and has the same geometrical characteristic as the linear magnetization region 80B1.

Sixth Modification Example

Figure 26:
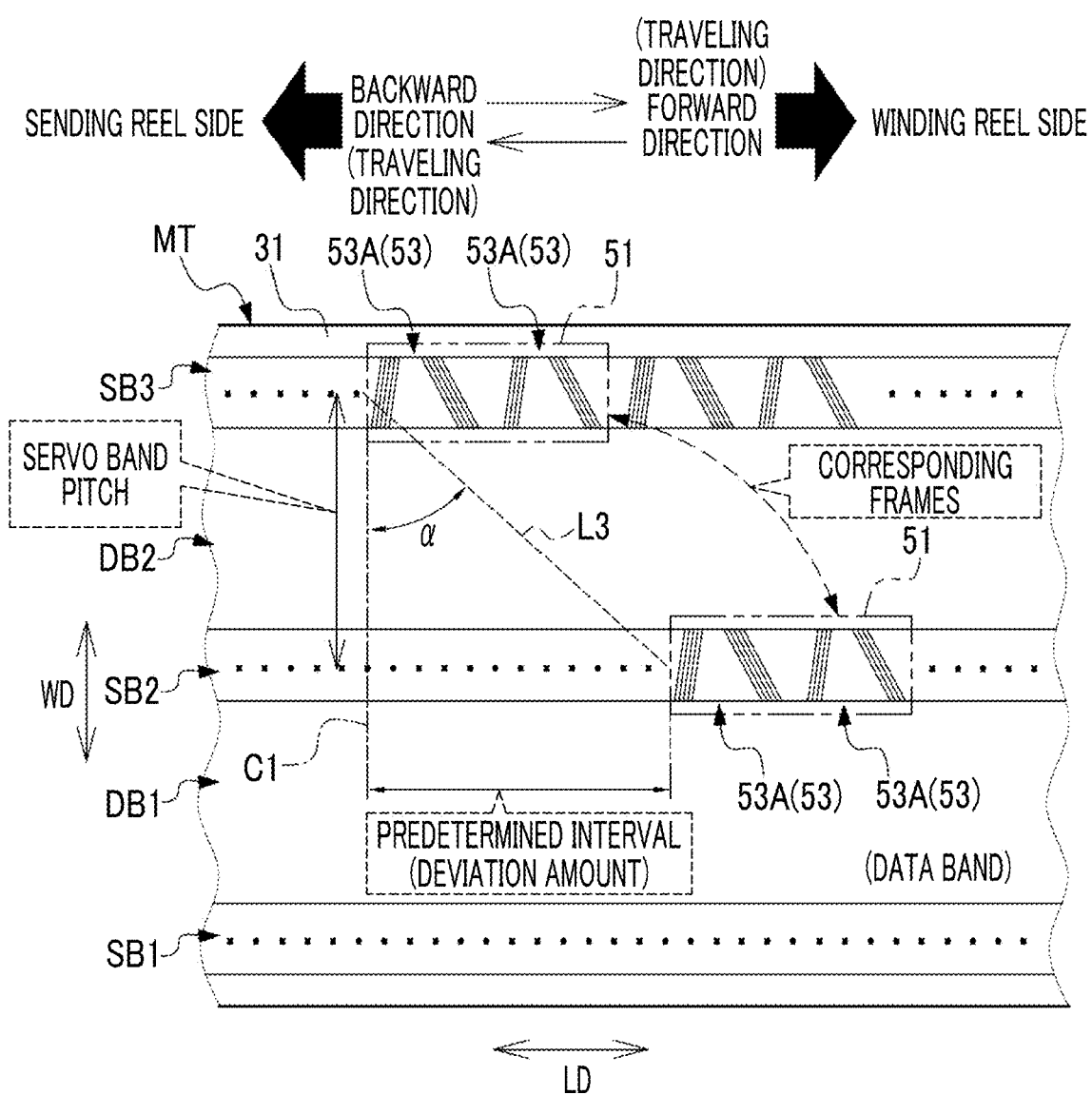
FIG. 26 is a conceptual diagram showing a sixth modification example, and is a conceptual diagram showing an example of an aspect in which a state in which the frames corresponding to each other between the servo bands adjacent to each other in the width direction of the magnetic tape according to the embodiment deviate from each other at the predetermined interval is observed from the front surface side of the magnetic tape.

In the third modification example described above, the form example has been described in which the predetermined interval is defined based on the angle α, the servo band pitch, and the frame length, but the technology of the present disclosure is not limited to this, and the predetermined interval may be defined without using the frame length. For example, as shown in FIG. 26, the predetermined interval is defined based on the angle α formed by the interval between the frames 51 having a correspondence relationship between the servo bands SB adjacent to each other in the width direction WD (in the example shown in FIG. 26, a line segment L3) and the imaginary straight line C1, and the pitch between the servo bands SB adjacent to each other in the width direction WD (that is, the servo band pitch). In this case, for example, the predetermined interval is calculated from Expression (2).

(Predetermined interval)=(Servo band pitch)×tan α     (2)

As described above, Expression (2) does not include the frame length. This means that the predetermined interval is calculated even in a case in which the frame length is not considered. Therefore, with the present configuration, the predetermined interval can be calculated more easily than in a case of calculating the predetermined interval from Expression (1).

Seventh Modification Example

It should be noted that, in the third modification example described above, the form example has been described in which the servo band SB is divided by a plurality of frames 51 along the longitudinal direction LD of the magnetic tape MT, but the technology of the present disclosure is not limited to this. For example, as shown in FIG. 27, the servo band SB may be divided by a frame 82 along the longitudinal direction LD of the magnetic tape MT.

The frame 82 is defined by a set of servo patterns 84. A plurality of servo patterns 84 are recorded in the servo band SB along the longitudinal direction LD of the magnetic tape MT. The plurality of servo patterns 84 are disposed at regular intervals along the longitudinal direction LD of the magnetic tape MT, similarly to the plurality of servo patterns 52 (see FIG. 8) recorded in the magnetic tape MT.

Figure 27:
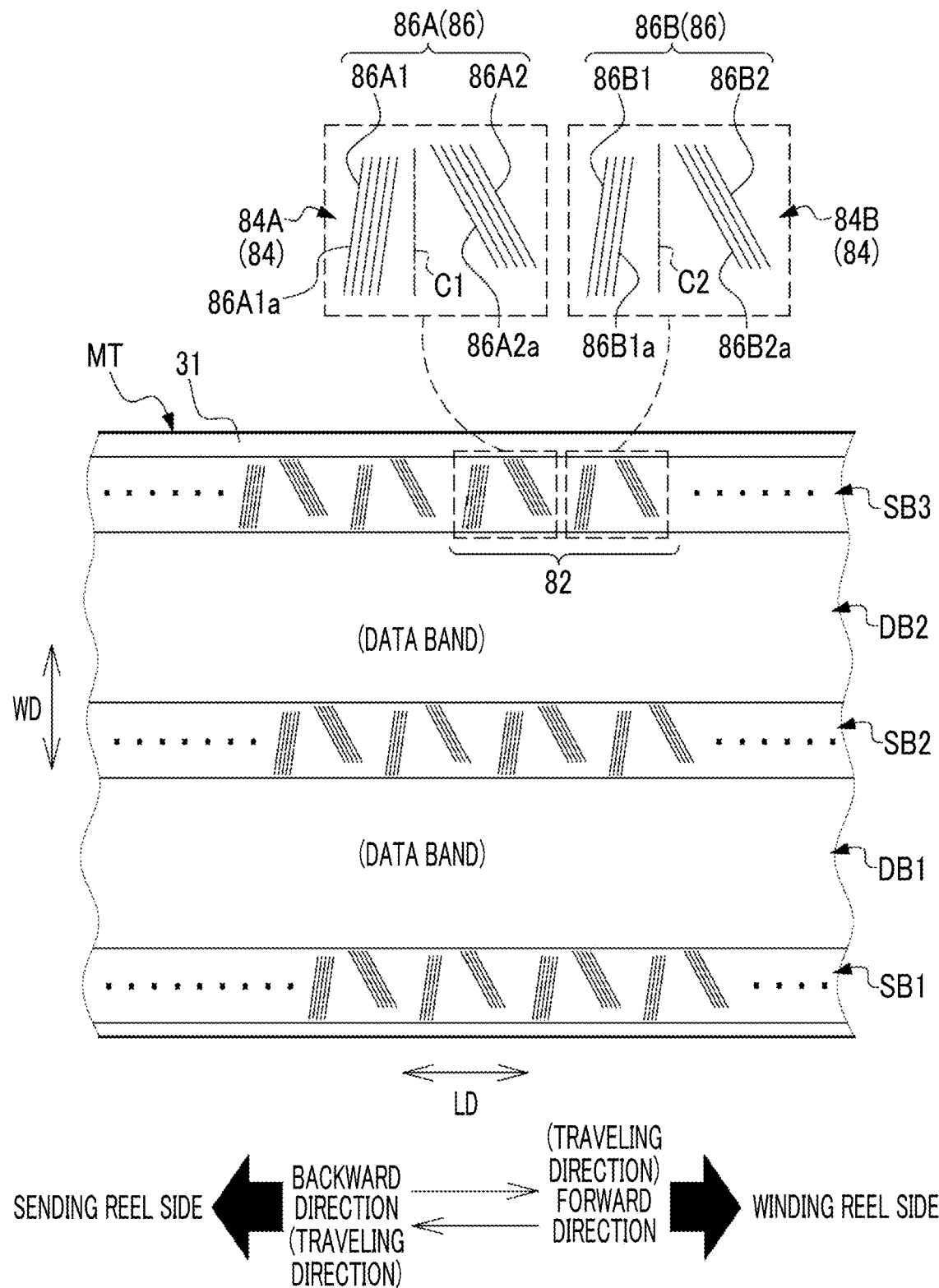
FIG. 27 is a conceptual diagram showing a seventh modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 27, servo patterns 84A and 84B are shown as an example of the set of servo patterns 84 included in the frame 82. The servo patterns 84A and 84B are adjacent to each other along the longitudinal direction LD of the magnetic tape MT, and the servo pattern 84A is positioned on the upstream side in the forward direction in the frame 82, and the servo pattern 84B is positioned on the downstream side in the forward direction.

The servo pattern 84A consists of the linear magnetization region pair 86A. In the example shown in FIG. 27, a pair of linear magnetization regions 86A1 and 86A2 is shown as an example of the linear magnetization region pair 86A. Each of the linear magnetization regions 86A1 and 86A2 is a linearly magnetized region.

The linear magnetization regions 86A1 and 86A2 are inclined in opposite directions with respect to the imaginary straight line C1. The linear magnetization regions 86A1 and 86A2 are not parallel to each other and are inclined at different angles with respect to the imaginary straight line C1. The linear magnetization region 86A1 has a steeper inclined angle with respect to the imaginary straight line C1 than the linear magnetization region 86A2. Here, "steep" means that, for example, an angle of the linear magnetization region 86A1 with respect to the imaginary straight line C1 is smaller than an angle of the linear magnetization region 86A2 with respect to the imaginary straight line C1.

In addition, the overall position of the linear magnetization region 86A1 and the overall position of the linear magnetization region 86A2 deviate from each other in the width direction WD. That is, the position of one end of the linear magnetization region 86A1 and the position of one end of the linear magnetization region 86A2 are not uniform in the width direction WD, and the position of the other end of the linear magnetization region 86A1 and the position of the other end of the linear magnetization region 86A2 are not uniform in the width direction WD.

In the servo pattern 84A, a plurality of magnetization straight lines 86A1a are included in the linear magnetization region 86A1, and a plurality of magnetization straight lines 86A2a are included in the linear magnetization region 86A2. The number of the magnetization straight lines 86A1a included in the linear magnetization region 86A1 is the same as the number of the magnetization straight lines 86A2a included in the linear magnetization region 86A2.

The linear magnetization region 86A1 is a set of magnetization straight lines 86A1a, which are five magnetized straight lines, and the linear magnetization region 86A2 is a set of magnetization straight lines 86A2a, which are five magnetized straight lines.

In the servo band SB, the position of one end of each of all the magnetization straight lines 86A1a included in the linear magnetization region 86A1 in the width direction WD is aligned, and the position of the other end of each of all the magnetization straight lines 86A1a included in the linear magnetization region 86A1 in the width direction WD is also aligned. In addition, in the servo band SB, the position of one end of each of all the magnetization straight lines 86A2a included in the linear magnetization region 86A2 in the width direction WD is aligned, and the position of the other end of each of all the magnetization straight lines 86A2a included in the linear magnetization region 86A2 in the width direction WD is also aligned.

The servo pattern 84B consists of the linear magnetization region pair 86B. In the example shown in FIG. 27, a pair of linear magnetization regions 86B1 and 86B2 is shown as an example of the linear magnetization region pair 86B. Each of the linear magnetization regions 86B1 and 86B2 is a linearly magnetized region.

The linear magnetization regions 86B1 and 86B2 are inclined in opposite directions with respect to the imaginary straight line C2. The linear magnetization regions 86B1 and 86B2 are not parallel to each other and are inclined at different angles with respect to the imaginary straight line C2. The linear magnetization region 86B1 has a steeper inclined angle with respect to the imaginary straight line C2 than the linear magnetization region 86B2. Here, "steep" means that, for example, an angle of the linear magnetization region 86B1 with respect to the imaginary straight line C2 is smaller than an angle of the linear magnetization region 86B2 with respect to the imaginary straight line C2.

In addition, the overall position of the linear magnetization region 86B1 and the overall position of the linear magnetization region 86B2 deviate from each other in the width direction WD. That is, the position of one end of the linear magnetization region 86B1 and the position of one end of the linear magnetization region 86B2 are not uniform in the width direction WD, and the position of the other end of the linear magnetization region 86B1 and the position of the other end of the linear magnetization region 86B2 are not uniform in the width direction WD.

In the servo pattern 84B, a plurality of magnetization straight lines 86B1a are included in the linear magnetization region 86B1, and a plurality of magnetization straight lines 86B2*a* are included in the linear magnetization region 86B2. The number of the magnetization straight lines 86B1*a* included in the linear magnetization region 86B1 is the same as the number of the magnetization straight lines 86B2*a* included in the linear magnetization region 86B2.

The total number of the magnetization straight lines 86B1*a* and 86B2*a* included in the servo pattern 84B is different from the total number of the magnetization straight lines 86A1*a* and 86A2*a* included in the servo pattern 84A. In the example shown in FIG. 38, the total number of the magnetization straight lines 86A1*a* and 86A2*a* included in the servo pattern 84A is ten, whereas the total number of the magnetization straight lines 86B1*a* and 86B2*a* included in the servo pattern 84B is eight.

The linear magnetization region 86B1 is a set of magnetization straight lines 86B1*a*, which are four magnetized straight lines, and the linear magnetization region 86B2 is a set of magnetization straight lines 86B2*a*, which are four magnetized straight lines.

In the servo band SB, the position of one end of each of all the magnetization straight lines 86B1*a* included in the linear magnetization region 86B1 in the width direction WD is aligned, and the position of the other end of each of all the magnetization straight lines 86B1*a* included in the linear magnetization region 86B1 in the width direction WD is also aligned. In addition, in the servo band SB, the position of one end of each of all the magnetization straight lines 86B2*a* included in the linear magnetization region 86B2 in the width direction WD is aligned, and the position of the other end of each of all the magnetization straight lines 86B2*a* included in the linear magnetization region 86B2 in the width direction WD is also aligned.

It should be noted that, here, the set of magnetization straight lines 86A1*a*, which are five magnetized straight lines, is described as an example of the linear magnetization region 86A1, the set of magnetization straight lines 86A2*a*, which are five magnetized straight lines, is described as an example of the linear magnetization region 86A2, the set of magnetization straight lines 86B1*a*, which are four magnetized straight lines, is described as an example of the linear magnetization region 86B1, and the set of magnetization straight lines 86B2*a*, which are four magnetized straight lines, is described as an example of the linear magnetization region 86B2, but the technology of the present disclosure is not limited thereto. For example, the linear magnetization region 86A1 need only have the number of the magnetization straight lines 86A1*a* that contribute to specifying the position of the magnetic head 28 on the magnetic tape MT, the linear magnetization region 86A2 need only have the number of the magnetization straight lines 86A2*a* that contribute to specifying the position of the magnetic head 28 on the magnetic tape MT, the linear magnetization region 86B1 need only have the number of the magnetization straight lines 86B1*a* that contribute to specifying the position of the magnetic head 28 on the magnetic tape MT, and the linear magnetization region 86B2 need only have the number of the magnetization straight lines 86B2*a* that contribute to specifying the position of the magnetic head 28 on the magnetic tape MT.

Here, the geometrical characteristic of the linear magnetization region pair 86A on the magnetic tape MT will be described with reference to FIG. 28.

Figure 28:
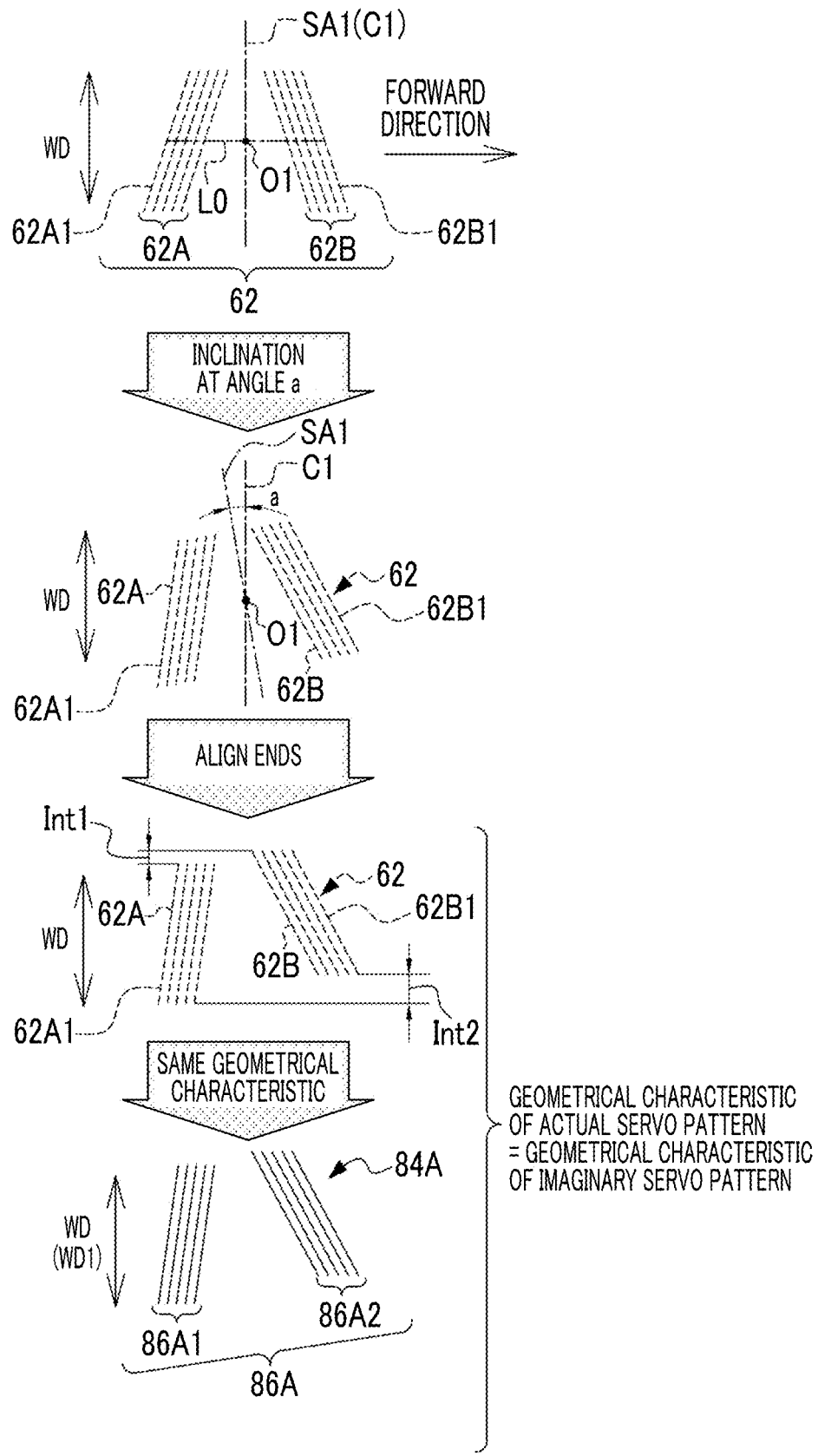
FIG. 28 is a conceptual diagram showing the seventh modification example, and is a conceptual diagram showing the relationship between the geometrical characteristic of the actual servo pattern and the geometrical characteristic of the imaginary servo pattern.

As an example, as shown in FIG. 28, the geometrical characteristic of the linear magnetization region pair 86A on the magnetic tape MT can be expressed by using an imaginary linear region pair 62. Here, the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. Moreover, the position of one end of each of all the straight lines 62A1 included in the imaginary linear region 62A of the imaginary linear region pair 62 in this state in the width direction WD is aligned, and the position of the other end of each of all the straight lines 62A1 included in the imaginary linear region 62A in the width direction WD is also aligned. In addition, similarly, the position of one end of each of all the straight lines 62B1 included in the imaginary linear region 62B of the imaginary linear region pair 62 in the width direction WD is aligned, and the position of the other end of each of all the straight lines 62B1 included in the imaginary linear region 62B in the width direction WD is also aligned. As a result, the imaginary linear region 62A and the imaginary linear region 62B deviate from each other in the width direction WD.

That is, one end of the imaginary linear region 62A and one end of the imaginary linear region 62B deviate from each other in the width direction WD at a regular interval Int1, and the other end of the imaginary linear region 62A and the other end of the imaginary linear region 62B deviate from each other in the width direction WD at a regular interval Int2.

The geometrical characteristic of the imaginary linear region pair 62 (that is, the geometrical characteristic of the imaginary servo pattern) obtained as described above corresponds to the geometrical characteristic of the actual servo pattern 84A. That is, the geometrical characteristic of the linear magnetization region pair 86A on the magnetic tape MT corresponds to the geometrical characteristic based on the imaginary linear region pair 62 inclined line-symmetrically with respect to the imaginary straight line C1 in a case in which the entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region 62A corresponds to the linear magnetization region 86A1 of the servo pattern 84A, and the imaginary linear region 62B corresponds to the linear magnetization region 86A2 of the servo pattern 84A. Therefore, in the servo band SB, the servo pattern 84A consisting of the linear magnetization region pair 86A in which one end of the linear magnetization region 86A1 and one end of the linear magnetization region 86A2 deviate from each other in the width direction WD at the regular interval Int1, and the other end of the linear magnetization region 86A1 and the other end of the linear magnetization region 86A2 deviate from each other in the width direction WD at the regular interval Int2 is recorded (see FIG. 27).

It should be noted that the linear magnetization region pair 86B is different from the linear magnetization region pair 86A only in that the four magnetization straight lines 86B1*a* are provided instead of the five magnetization straight lines 86A1*a* and the four magnetization straight lines 86B2*a* are provided instead of the five magnetization straight lines 86A2*a* (see FIG. 27). Therefore, in the servo band SB, the servo pattern 84B consisting of the linear magnetization region pair 86B in which one end of the linear magnetization region 86B1 and one end of the linear magnetization region 86B2 deviate from each other in the width direction WD at the regular interval Int1, and the other end of the linear magnetization region 86B1 and the other end of the linear magnetization region 86B2 deviate from each other in the width direction WD at the regular interval Int2 is recorded (see FIG. 27).

Figure 29:
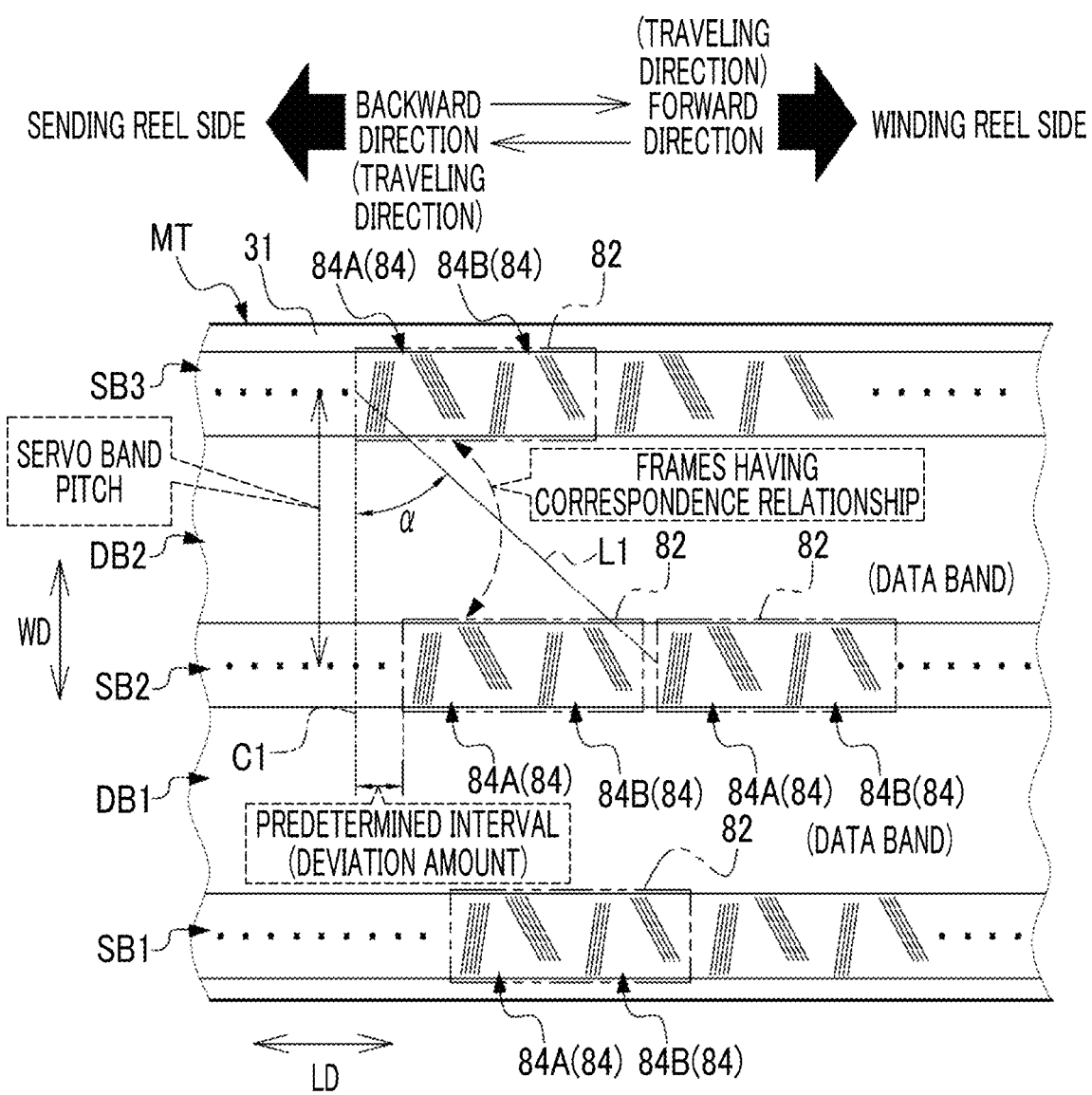
FIG. 29 is a conceptual diagram showing the seventh modification example, and is a conceptual diagram showing an example of an aspect in which a state in which the frames corresponding to each other between the servo bands adjacent to each other in the width direction of the magnetic tape deviate from each other at the predetermined interval is observed from the front surface side of the magnetic tape.

As an example, as shown in FIG. 29, the plurality of servo bands SB are formed on the magnetic tape MT in the width direction WD, and the frames 82 having a correspondence relationship between the servo bands SB deviate from each other at predetermined intervals in the longitudinal direction LD, between the servo bands SB adjacent to each other in the width direction WD of the magnetic tape MT. This means that the servo patterns 84 having a correspondence relationship between the servo bands SB deviate from each other at the predetermined interval described in the first modification example in the longitudinal direction LD between the servo bands SB adjacent to each other in the width direction WD of the magnetic tape MT. The predetermined interval is defined by Expression (1) described in the third modification example.

Figure 30:
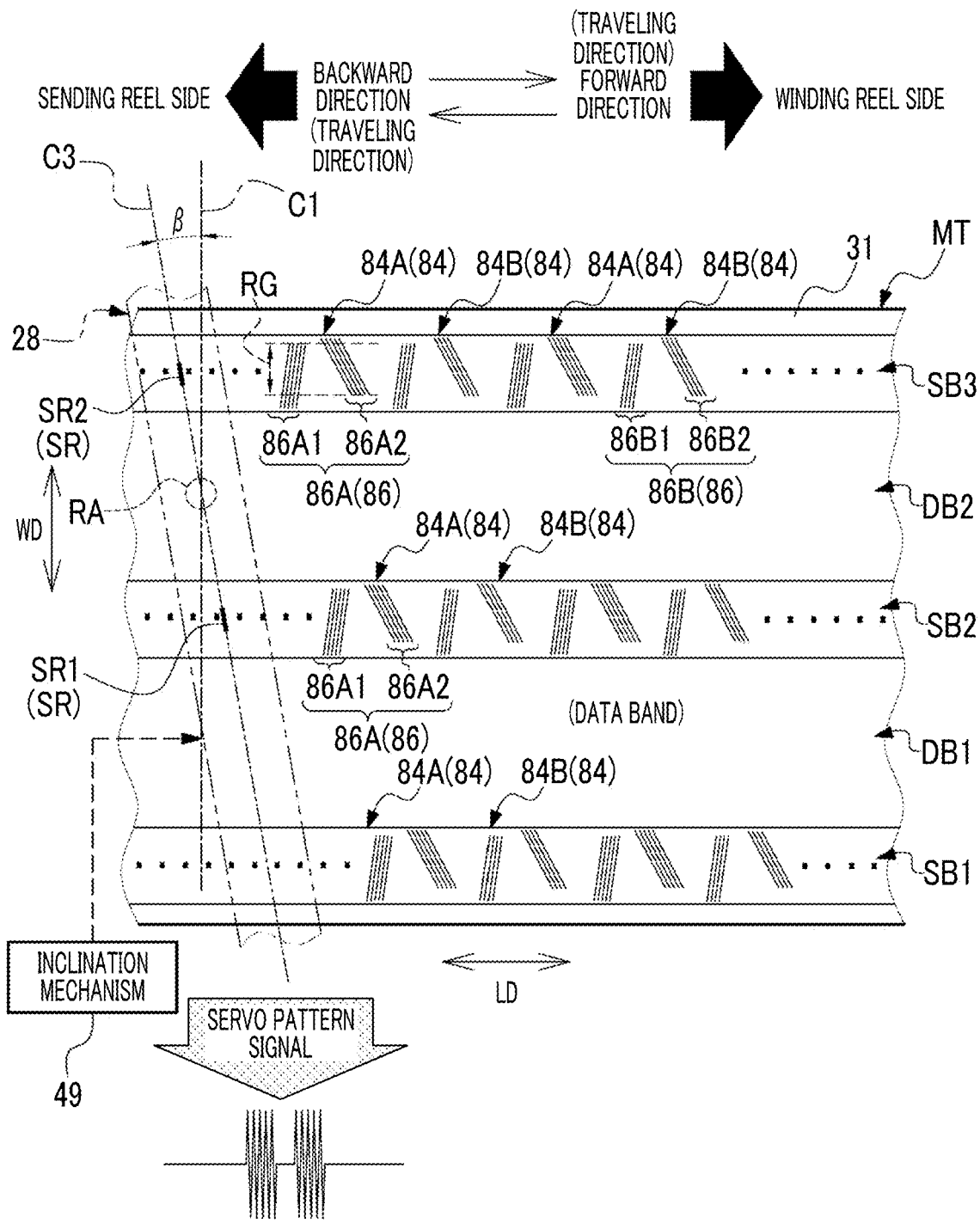
FIG. 30 is a conceptual diagram showing seventh modification example, and is a conceptual diagram showing an example of an aspect in which a state in which the servo pattern is read by the servo reading element provided in the magnetic head that is skewed on the magnetic tape is observed from the front surface side of the magnetic tape.

Similarly to the third modification example described above, in the seventh modification example, as shown in FIG. 30 as an example, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 30). That is, the magnetic head 28 is inclined at the angle β to the upstream side in the forward direction on the magnetic tape MT. In this state, in a case in which the servo pattern 84A is read by the servo reading element SR along the longitudinal direction LD within a range RG in which the linear magnetization regions 86A1 and 86A2 overlap with each other in the width direction WD, the variation due to the azimuth loss between the servo pattern signal derived from the linear magnetization region 86A1 and the servo pattern signal derived from the linear magnetization region 86A2 is smaller than in the examples shown in FIG. 29. In addition, also in a case in which the servo pattern 84B (that is, the linear magnetization region pair 86B) is read by the servo reading element SR, similarly, the variation due to the azimuth loss between the servo pattern signal derived from the linear magnetization region 86B1 and the servo pattern signal derived from the linear magnetization region 86B2 is small.

Eighth Modification Example

Figure 31:
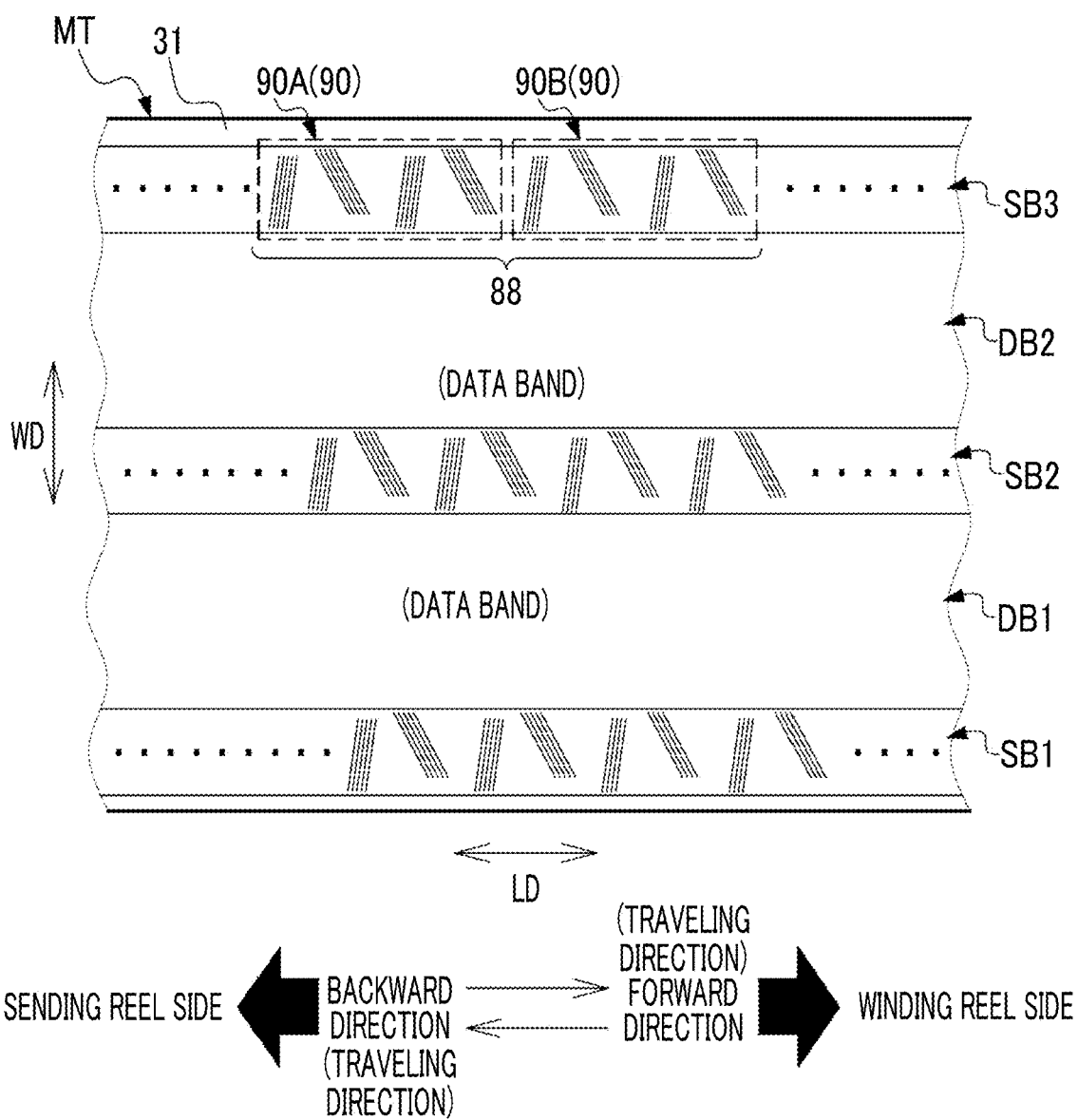
FIG. 31 is a conceptual diagram showing an eighth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the seventh modification example described above, the form example has been described in which the servo band SB is divided by a plurality of frames 82 along the longitudinal direction LD of the magnetic tape MT, but the technology of the present disclosure is not limited to this. For example, as shown in FIG. 31, the servo band SB may be divided by a frame 88 along the longitudinal direction LD of the magnetic tape MT. The frame 88 is defined by a set of servo patterns 90. A plurality of servo patterns 90 are recorded in the servo band SB along the longitudinal direction LD of the magnetic tape MT. Similarly to the plurality of servo patterns 84 (see FIG. 27), the plurality of servo patterns 90 are disposed at regular intervals along the longitudinal direction LD of the magnetic tape MT.

In the example shown in FIG. 31, a pair of servo patterns 90A and 90B is shown as an example of the set of servo patterns 90. Each of the servo patterns 90A and 90B is an M-shaped magnetized servo pattern. The servo patterns 90A and 90B are adjacent to each other along the longitudinal direction LD of the magnetic tape MT, and the servo pattern 90A is positioned on the upstream side in the forward direction in the frame 88, and the servo pattern 90B is positioned on the downstream side in the forward direction.

Figure 32:
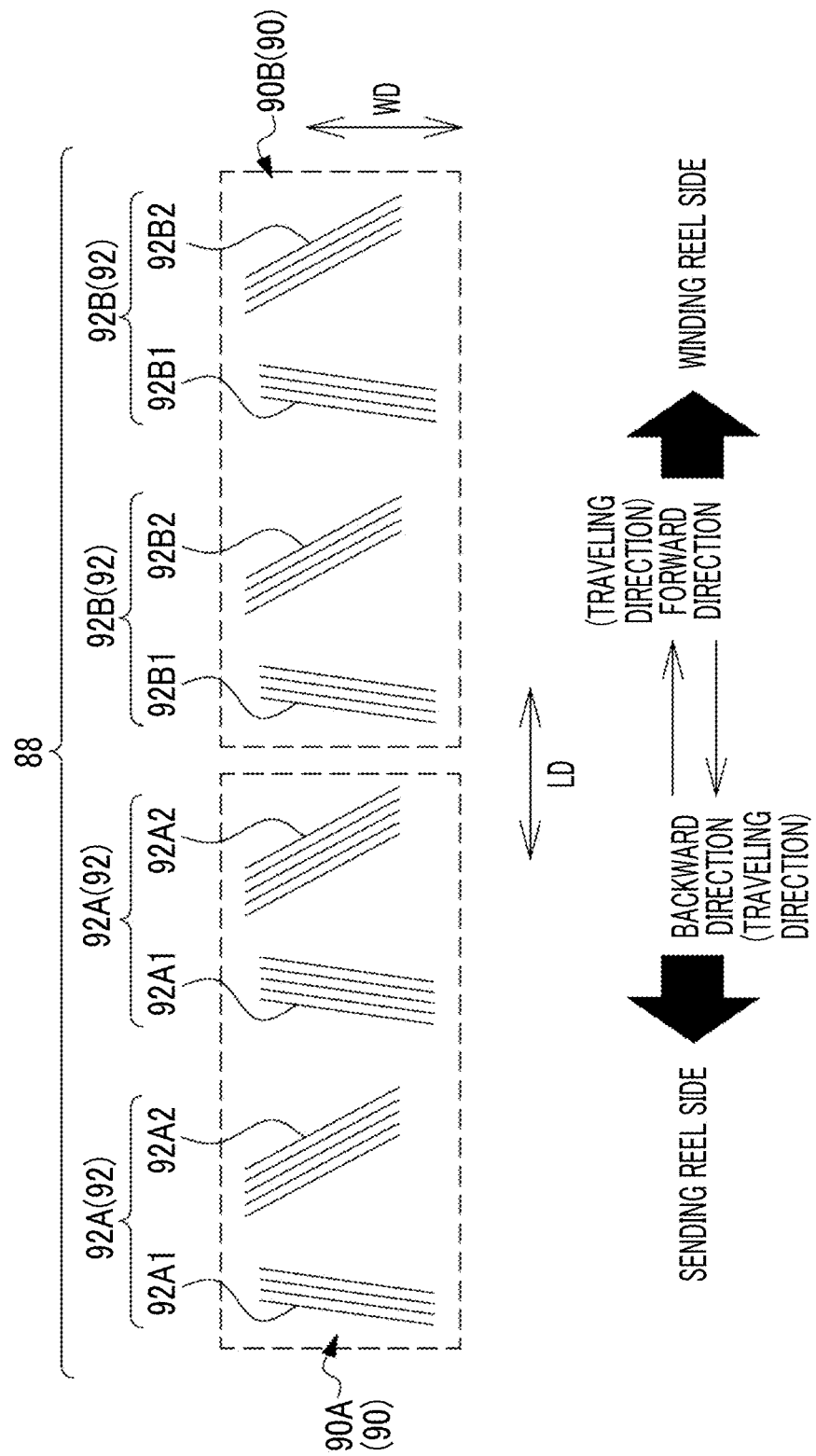
FIG. 32 is a conceptual diagram showing the eighth modification example, and is a conceptual diagram showing an example of an aspect of the servo pattern included in the magnetic tape.

As an example, as shown in FIG. 32, the servo pattern 90 consists of a linear magnetization region pair 92. The linear magnetization region pair 92 is classified into a linear magnetization region pair 92A and a linear magnetization region pair 92B.

The servo pattern 90A consists of a set of linear magnetization region pairs 92A. The set of linear magnetization region pairs 92A are disposed in a state of being adjacent to each other along the longitudinal direction LD of the magnetic tape MT.

In the example shown in FIG. 32, a pair of linear magnetization regions 92A1 and 92A2 is shown as an example of the linear magnetization region pair 92A. The linear magnetization region pair 92A is configured in the same manner as the linear magnetization region pair 86A (see FIG. 27) described in the seventh modification example, and has the same geometrical characteristic as the linear magnetization region pair 86A. That is, the linear magnetization region 92A1 is configured in the same manner as the linear magnetization region 86A1 (see FIG. 27) described in the seventh modification example and has the same geometrical characteristic as the linear magnetization region 86A1, and the linear magnetization region 92A2 is configured in the same manner as the linear magnetization region 86A2 (see FIG. 27) described in the seventh modification example and has the same geometrical characteristic as the linear magnetization region 86A2.

The servo pattern 90B consists of a set of linear magnetization region pairs 92B. The set of linear magnetization region pairs 92B are disposed in a state of being adjacent to each other along the longitudinal direction LD of the magnetic tape MT.

In the example shown in FIG. 32, a pair of linear magnetization regions 92B1 and 92B2 is shown as an example of the linear magnetization region pair 92B. The linear magnetization region pair 92B is configured in the same manner as the linear magnetization region pair 86B (see FIG. 27) described in the seventh modification example, and has the same geometrical characteristic as the linear magnetization region pair 86B. That is, the linear magnetization region 92B1 is configured in the same manner as the linear magnetization region 86B1 (see FIG. 27) described in the seventh modification example and has the same geometrical characteristic as the linear magnetization region 86B1, and the linear magnetization region 92B2 is configured in the same manner as the linear magnetization region 86B2 (see FIG. 27) described in the seventh modification example and has the same geometrical characteristic as the linear magnetization region 86B2.

Ninth Modification Example

Figure 33:
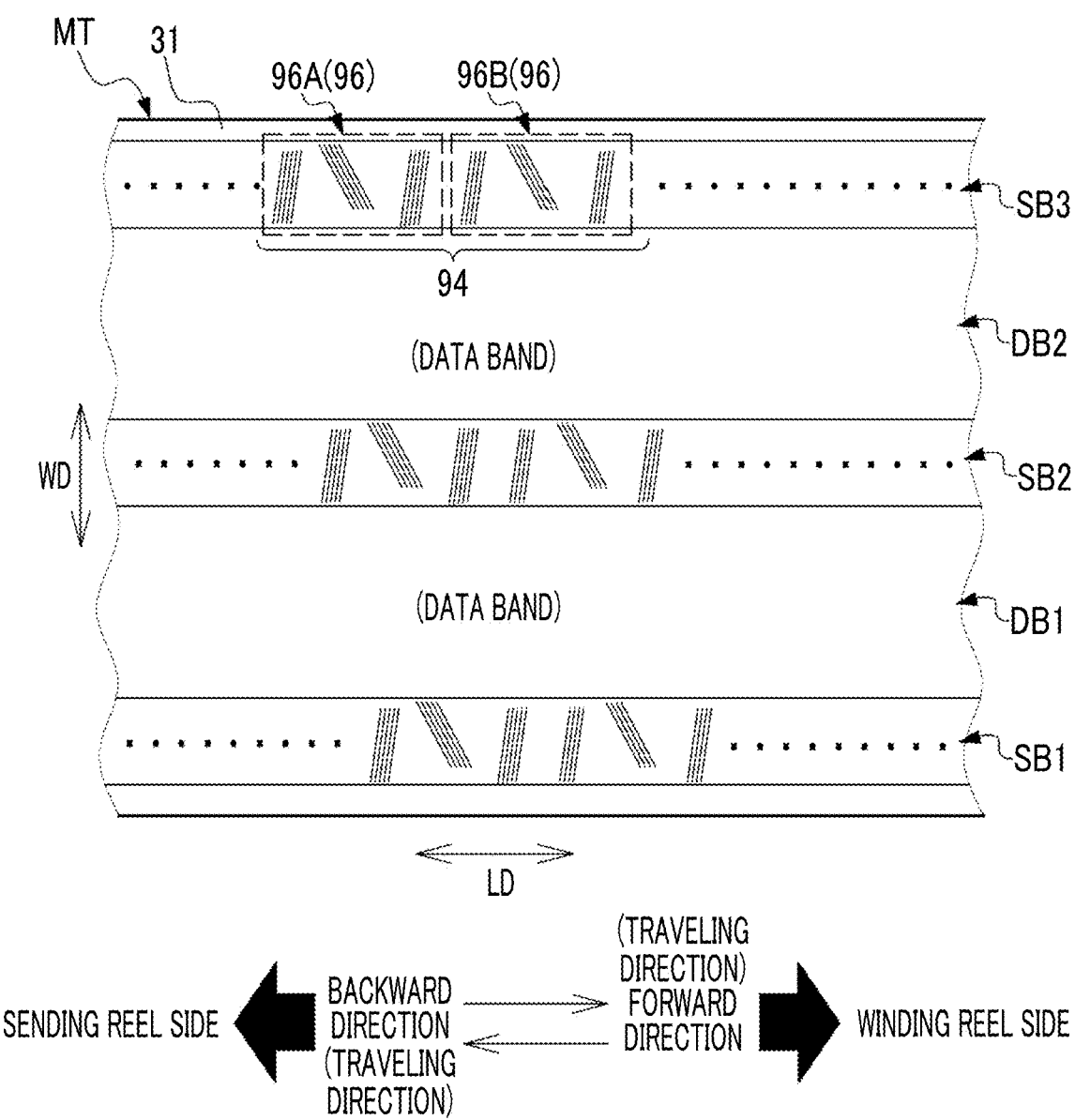
FIG. 33 is a conceptual diagram showing a ninth modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 31, the form example has been described in which the servo band SB is divided by a plurality of frames 88 along the longitudinal direction LD of the magnetic tape MT, but the technology of the present disclosure is not limited to this. For example, as shown in FIG. 33, the servo band SB may be divided by a frame 94 along the longitudinal direction LD of the magnetic tape MT. The frame 94 is defined by a set of servo patterns 96. A plurality of servo patterns 96 are recorded in the servo band SB along the longitudinal direction LD of the magnetic tape MT. Similarly to the plurality of servo patterns 90 (see FIG. 31), the plurality of servo patterns 96 are disposed at regular intervals along the longitudinal direction LD of the magnetic tape MT.

In the example shown in FIG. 33, servo patterns 96A and 96B are shown as an example of the set of servo patterns 96. Each of the servo patterns 96A and 96B is an N-shaped magnetized servo pattern. The servo patterns 96A and 96B are adjacent to each other along the longitudinal direction LD of the magnetic tape MT, and the servo pattern 96A is positioned on the upstream side in the forward direction in the frame 94, and the servo pattern 96B is positioned on the downstream side in the forward direction.

Figure 34:
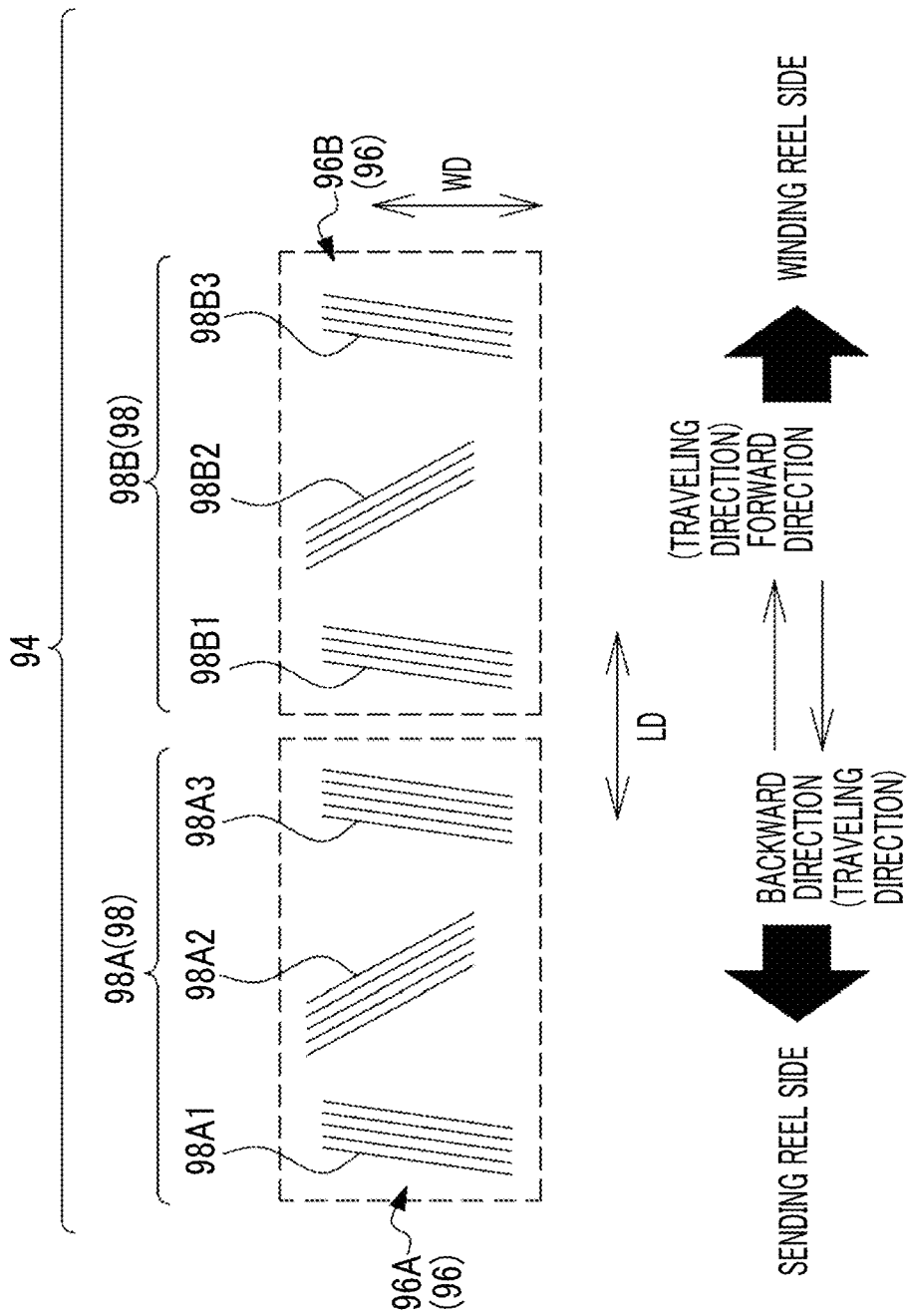
FIG. 34 is a conceptual diagram showing the ninth modification example, and is a conceptual diagram showing an example of an aspect of the servo pattern included in the magnetic tape.

As an example, as shown in FIG. 34, the servo pattern 96 consists of a linear magnetization region group 98. The linear magnetization region group 98 is classified into a linear magnetization region group 98A and a linear magnetization region group 98B.

The servo pattern 96A consists of the linear magnetization region group 98A. The linear magnetization region group 98A consists of linear magnetization regions 98A1, 98A2, and 98A3. The linear magnetization regions 98A1, 98A2, and 98A3 are disposed in a state of being adjacent to each other along the longitudinal direction LD of the magnetic tape MT. The linear magnetization regions 98A1, 98A2, and 98A3 are disposed in the order of the linear magnetization regions 98A1, 98A2, and 98A3 from the upstream side in the forward direction.

The linear magnetization regions 98A1 and 98A2 are configured in the same manner as the linear magnetization region pair 92A shown in FIG. 32, and have the same geometrical characteristics as the linear magnetization region pair 92A. That is, the linear magnetization region 98A1 is configured in the same manner as the linear magnetization region 92A1 shown in FIG. 32, and has the same geometrical characteristic as the linear magnetization region 92A1, and the linear magnetization region 98A2 is configured in the same manner as the linear magnetization region 92A2 shown in FIG. 32, and has the same geometrical characteristic as the linear magnetization region 92A2.

In addition, the linear magnetization region 98A3 is configured in the same manner as the linear magnetization region 92A1, and has the same geometrical characteristic as the linear magnetization region 92A1.

The servo pattern 96B consists of the linear magnetization region group 98B. The linear magnetization region group 98B consists of linear magnetization regions 98B1, 98B2, and 98B3. The linear magnetization regions 98B1, 98B2, and 98B3 are disposed in a state of being adjacent to each other along the longitudinal direction LD of the magnetic tape MT. The linear magnetization regions 98B1, 98B2, and 98B3 are disposed in the order of the linear magnetization regions 98B1, 98B2, and 98B3 from the upstream side in the forward direction.

The linear magnetization regions 98B1 and 98B2 are configured in the same manner as the linear magnetization region pair 92B shown in FIG. 32, and have the same geometrical characteristics as the linear magnetization region pair 92B. That is, the linear magnetization region 98B1 is configured in the same manner as the linear magnetization region 92B1 shown in FIG. 32, and has the same geometrical characteristic as the linear magnetization region 92B1, and the linear magnetization region 98B2 is configured in the same manner as the linear magnetization region 92B2 shown in FIG. 32, and has the same geometrical characteristic as the linear magnetization region 92B2.

In addition, the linear magnetization region 98B3 is configured in the same manner as the linear magnetization region 92B1, and has the same geometrical characteristic as the linear magnetization region 92B1.

Tenth Modification Example

Figure 35:
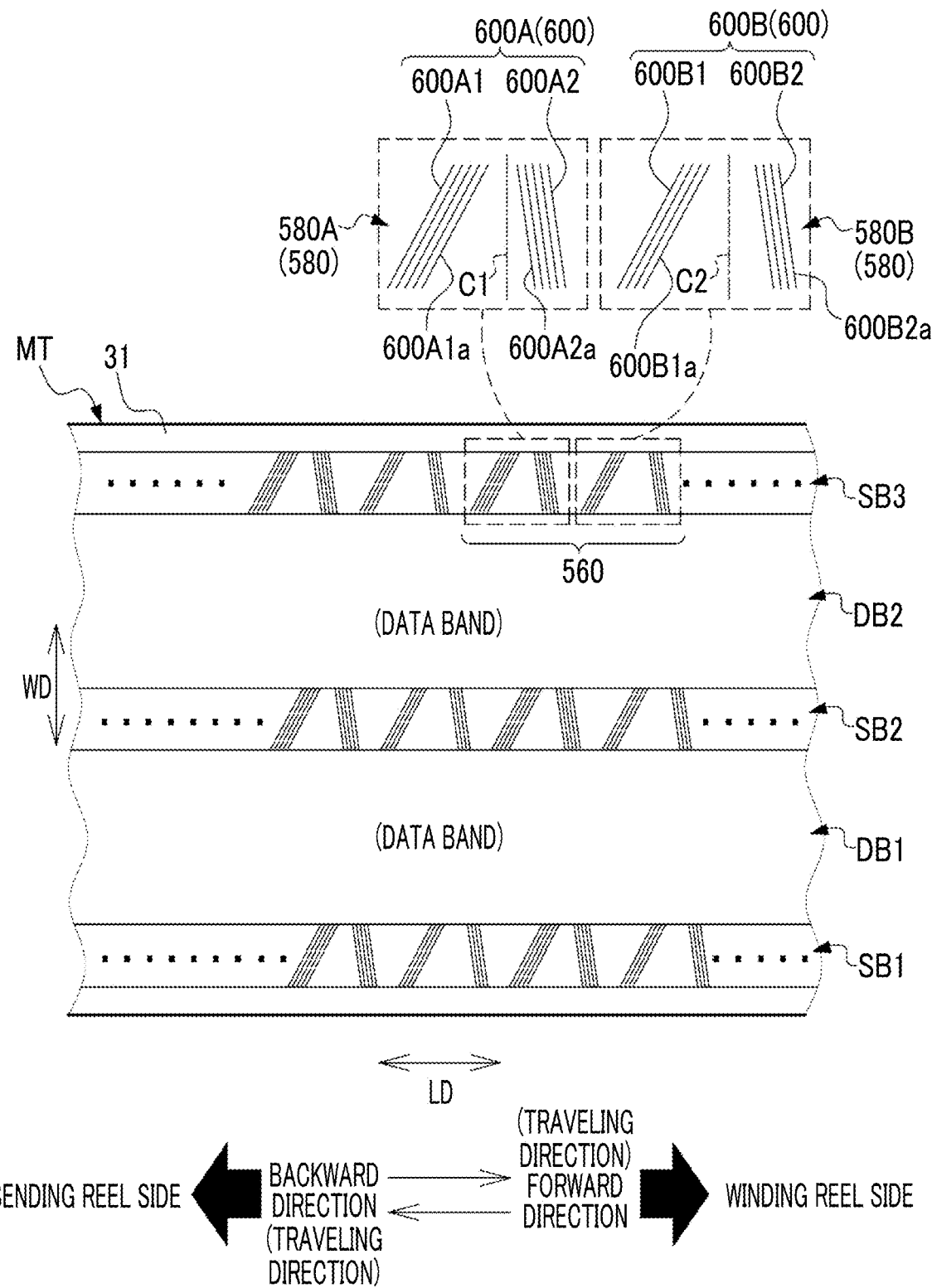
FIG. 35 is a conceptual diagram showing a tenth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the third modification example described above (for example, example shown in FIG. 17), the form example has been described in which the servo band SB is divided by the plurality of frames 51 along the longitudinal direction LD of the magnetic tape MT, but the technology of the present disclosure is not limited to this. For example, as shown in FIG. 35, the servo band SB may be divided by a frame 560 along the longitudinal direction LD of the magnetic tape MT. The frame 560 is defined by a set of servo patterns 580. A plurality of servo patterns 580 are recorded in the servo band SB along the longitudinal direction LD of the magnetic tape MT.

The plurality of servo patterns 580 are disposed at regular intervals along the longitudinal direction LD of the magnetic tape MT, similarly to the plurality of servo patterns 52.

The servo pattern 580 consists of a linear magnetization region pair 600. The linear magnetization region pair 600 is classified into a linear magnetization region pair 600A and a linear magnetization region pair 600B. That is, the linear magnetization region pair 600 is different from the linear magnetization region pair 60 (see FIG. 17) in that the linear magnetization region pair 600A is provided instead of the linear magnetization region pair 60A, and the linear magnetization region pair 600B is provided instead of the linear magnetization region pair 60B.

The servo pattern 580A consists of the linear magnetization region pair 600A. The linear magnetization region pair 600A is different from the linear magnetization region pair 60A in that the linear magnetization region 600A1 is provided instead of the linear magnetization region 60A1, and the linear magnetization region 600A2 is provided instead of the linear magnetization region 60A2. Each of the linear magnetization regions 600A1 and 600A2 is a linearly magnetized region.

The linear magnetization regions 600A1 and 600A2 are inclined in opposite directions with respect to the imaginary straight line C1. The linear magnetization regions 600A1 and 600A2 are not parallel to each other and are inclined at different angles with respect to the imaginary straight line C1. The linear magnetization region 600A2 has a steeper inclined angle with respect to the imaginary straight line C1 than the linear magnetization region 600A1. Here, "steep" means that, for example, an angle of the linear magnetization region 600A2 with respect to the imaginary straight line C1 is smaller than an angle of the linear magnetization region 600A1 with respect to the imaginary straight line C1. In addition, a total length of the linear magnetization region 600A2 is shorter than a total length of the linear magnetization region 600A1.

The linear magnetization region 600A1 is different from the linear magnetization region 60A1 in that a plurality of magnetization straight lines 600A1a are provided instead of the plurality of magnetization straight lines 60A1a. The linear magnetization region 600A2 is different from the linear magnetization region 60A2 in that a plurality of magnetization straight lines 600A2a are provided instead of the plurality of magnetization straight lines 60A2a.

The plurality of magnetization straight lines 600A1a are included in the linear magnetization region 600A1, and the plurality of magnetization straight lines 600A2a are included in the linear magnetization region 600A2. The number of the magnetization straight lines 600A1a included in the linear magnetization region 600A1 is the same as the number of the magnetization straight lines 600A2a included in the linear magnetization region 600A2.

The linear magnetization region 600A1 is a linear magnetization region corresponding to a first line symmetry region. The first line symmetry region refers to a region in which the linear magnetization region 60A2 (see FIG. 17) described in the third modification example is formed line-symmetrically with respect to the imaginary straight line C1. That is, the linear magnetization region 600A1 can be said to be a linear magnetization region formed by a geometrical characteristic of a mirror image of the linear magnetization region 60A2 (see FIG. 17) (that is, geometrical characteristic obtained by performing the mirror image with respect to the linear magnetization region 60A2 (see FIG. 17) with the imaginary straight line C1 as a line symmetry axis).

The linear magnetization region 600A2 is a linear magnetization region corresponding to a second line symmetry region. The second line symmetry region refers to a region in which the linear magnetization region 60A1 (see FIG. 17) described in the third modification example is formed line-symmetrically with respect to the imaginary straight line C1. That is, the linear magnetization region 600A2 can be said to be a linear magnetization region formed by a geometrical characteristic of a mirror image of the linear magnetization region 60A1 (see FIG. 17) (that is, geometrical characteristic obtained by performing the mirror image with respect to the linear magnetization region 60A1 (see FIG. 17) with the imaginary straight line C1 as a line symmetry axis).

That is, in the example shown in FIG. 18, the geometrical characteristic of the imaginary linear region pair 62 obtained by aligning the positions of both ends of the imaginary linear region 62A and the positions of both ends of the imaginary linear region 62B in a case in which the entirety of the imaginary linear region pair 62 is inclined with respect to the imaginary straight line C1 by inclining the symmetry axis SA1 of the imaginary linear regions 62A and 62B with respect to the imaginary straight line C1 at the angle a clockwise as viewed from the paper surface side of FIG. 18 with the center O1 as the rotation axis corresponds to the geometrical characteristic of the servo pattern 580A.

The servo pattern 580B consists of the linear magnetization region pair 600B. The linear magnetization region pair 600B is different from the linear magnetization region pair 60B in that the linear magnetization region 600B1 is provided instead of the linear magnetization region 60B1, and the linear magnetization region 600B2 is provided instead of the linear magnetization region 60B2. Each of the linear magnetization regions 600B1 and 600B2 is a linearly magnetized region.

The linear magnetization regions 600B1 and 600B2 are inclined in opposite directions with respect to the imaginary straight line C2. The linear magnetization regions 600B1 and 600B2 are not parallel to each other and are inclined at different angles with respect to the imaginary straight line C2. The linear magnetization region 600B2 has a steeper inclined angle with respect to the imaginary straight line C2 than the linear magnetization region 600B 1. Here, "steep" means that, for example, an angle of the linear magnetization region 600B2 with respect to the imaginary straight line C2 is smaller than an angle of the linear magnetization region 600B1 with respect to the imaginary straight line C2.

The plurality of magnetization straight lines 600B1a are included in the linear magnetization region 600B1, and the plurality of magnetization straight lines 600B2a are included in the linear magnetization region 600B2. The number of the magnetization straight lines 600B1a included in the linear magnetization region 600B1 is the same as the number of the magnetization straight lines 600B2a included in the linear magnetization region 600B2.

The total number of the magnetization straight lines 600B1a and 600B2a included in the servo pattern 580B is different from the total number of the magnetization straight lines 600A1a and 600A2a included in the servo pattern 580A. In the example shown in FIG. 35, the total number of the magnetization straight lines 600A1a and 600A2a included in the servo pattern 580A is ten, whereas the total number of the magnetization straight lines 600B1a and 600B2a included in the servo pattern 580B is eight.

The linear magnetization region 600B1 is a set of magnetization straight lines 600B1a, which are four magnetized straight lines, and the linear magnetization region 600B2 is a set of magnetization straight lines 600B2a, which are four magnetized straight lines. In the servo band SB, the positions of both ends of the linear magnetization region 600B1 (that is, the positions of both ends of each of the four magnetization straight lines 600B1a) and the positions of both ends of the linear magnetization region 600B2 (that is, the positions of both ends of each of the four magnetization straight lines 600B2a) are aligned in the width direction WD.

As described above, the geometrical characteristic of the servo pattern 580A corresponds to the geometrical characteristic of the mirror image of the linear magnetization region 60A2 (see FIG. 17) and the geometrical characteristic of the mirror image of the linear magnetization region 60A2 (see FIG. 17) (that is, geometrical characteristic of the mirror image of the servo pattern 53A shown in FIG. 17), and the geometrical characteristic of the servo pattern 580B corresponds to the geometrical characteristic of the mirror image of the linear magnetization region 60B2 (see FIG. 17) and the geometrical characteristic of the mirror image of the linear magnetization region 60B2 (see FIG. 17) (that is, geometrical characteristic of the mirror image of the servo pattern 53B shown in FIG. 17). However, this is merely an example, and instead of the servo pattern 580, the servo pattern formed by the geometrical characteristic of the mirror image of the servo pattern 72 shown in FIG. 22, the geometrical characteristic of the mirror image of the servo pattern 78 shown in FIG. 24, the geometrical characteristic of the mirror image of the servo pattern 84 shown in FIG. 27, the geometrical characteristic of the mirror image of the servo pattern 90 shown in FIG. 31, or the geometrical characteristic of the mirror image of the servo pattern 96 shown in FIG. 33 may be applied.

It should be noted that, even in a case in which the geometrical characteristic of the servo pattern is changed in this way, the inclination mechanism 49 changes the direction of the inclination (that is, azimuth) of the imaginary straight line C3 with respect to the imaginary straight line C4 and the inclined angle (for example, angle β shown in FIG. 21) in accordance with the geometrical characteristic of the servo pattern. That is, even in a case in which the geometrical characteristic of the servo pattern is changed, as in the same manner in the third modification example described above, the inclination mechanism 49 rotates, under the control of the control device 30A, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle (for example, angle β shown in FIG. 21) such that the variation in the servo pattern signal is reduced.

Other Modification Examples

In the embodiment described above, the form example has been described in which the front surface 31 of the magnetic tape MT is subjected to the magnetic processing by the magnetic head 28, but the technology of the present disclosure is not limited to this. For example, the back surface 33 of the magnetic tape MT may be formed of the surface of the magnetic layer, and the back surface 33 may be subjected to the magnetic processing by the magnetic head 28.

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 or the magnetic tape MT are integrated in advance (for example, before the data is recorded in the data band DB)), the technology of the present disclosure is established.

Figure 36:
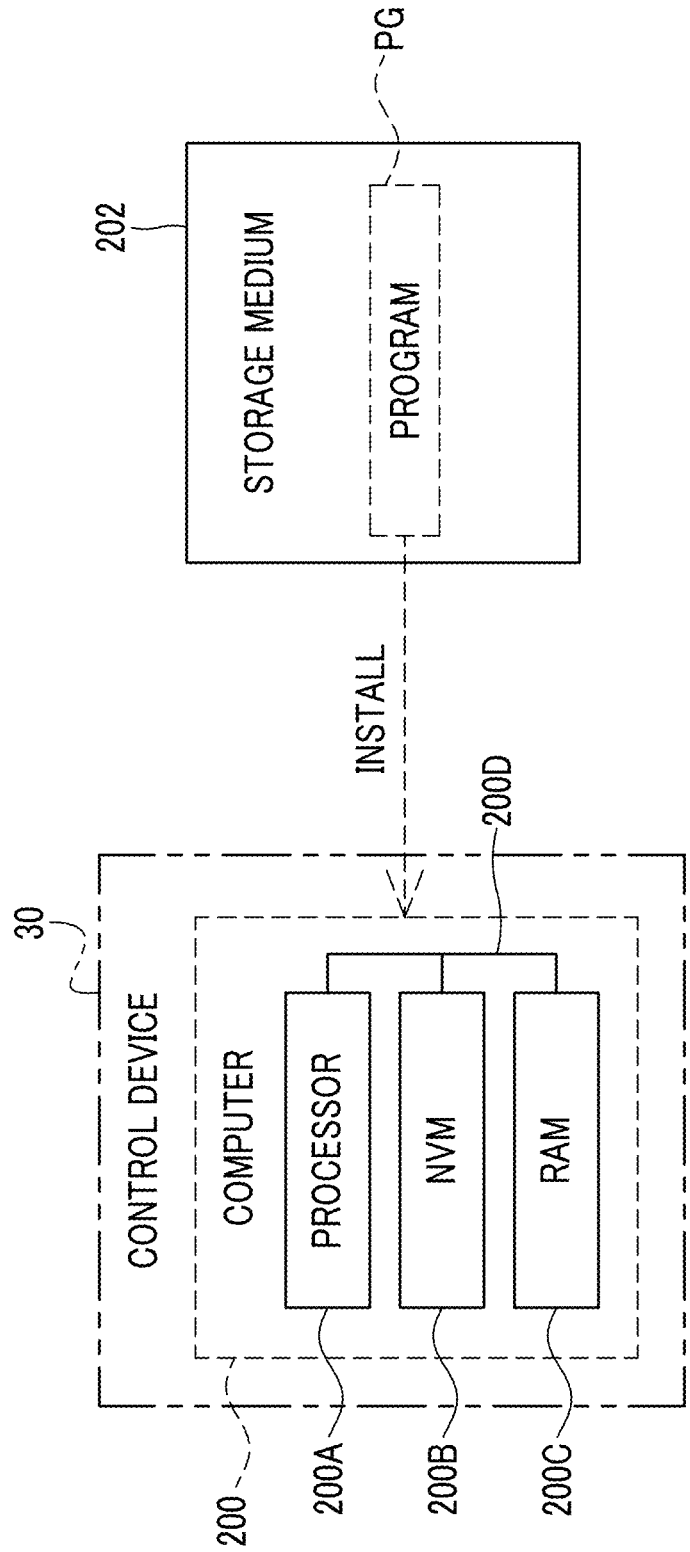
FIG. 36 is a conceptual diagram showing an example of an aspect in which a program stored in a storage medium is installed in a computer of the control device.

In the embodiment described above, the form example has been described in which the control device 30 (see FIG. 3) is realized by the ASIC, but the technology of the present disclosure is not limited to this, and the control device 30 may be realized by the software configuration. In a case in which the control device 30A is realized by the software configuration, for example, as shown in FIG. 36, the control device 30 comprises a computer 200.

The computer 200 includes a processor 200A (for example, a single CPU or a plurality of CPUs), an NVM 200B, and a RAM 200C. The processor 200A, the NVM 200B, and the RAM 200C are connected to a bus 200D. A program PG is stored in a portable storage medium 202 (for example, an SSD or a USB memory) which is a computer-readable non-transitory storage medium.

The program PG stored in the storage medium 202 is installed in the computer 200. The processor 200A executes the data read/write processing (see FIGS. 13A and 13B) in accordance with the program PG.

In addition, the program PG may be stored in a storage device of another computer or server device connected to the computer 200 via a communication network (not shown), and the program PG may be downloaded in response to a request from the control device 30 and installed in the computer 200.

In the example shown in FIG. 36, although the computer 200 has been described as an example, the technology of the present disclosure is not limited to this, and a device including an ASIC, an FPGA, and/or a PLC may be applied instead of the computer 200. In addition, instead of the computer 200, a hardware configuration and the software configuration may be used in combination.

As the hardware resource for executing the data read/write processing of the control device 30 (see FIG. 3), various processors shown below can be used. Examples of the processor include the CPU which is a general-purpose processor functioning as the hardware resource for executing the data read/write processing by executing software, that is, a program. In addition, examples of the processor include a dedicated electronic circuit which is a processor having a circuit configuration designed to be dedicated to executing specific processing, such as an FPGA, a PLC, or an ASIC described as an example. A memory is built in or connected to any processor, and any processor executes the data read/write processing by using the memory.

The hardware resource for executing the data read/write processing of the control device 30 may be composed of one of those various processors or may be composed of a combination of two or more processors of the same type or different types (for example, a combination of a plurality of FPGAs or a combination of a CPU and an FPGA).

In addition, the hardware resource for executing the data read/write processing of the control device 30 may be one processor. As a configuring example of one processor, first, there is a form in which one processor is composed of a combination of one or more CPUs and software and the processor functions as the hardware resource for executing the data read/write processing. Secondly, as represented by SoC, there is a form in which a processor that realizes the functions of the entire system including a plurality of hardware resources for executing the data read/write processing with one IC chip is used. In this way, the data read/write processing of the control device 30 is realized by using one or more of the various processors described above as the hardware resource.

Further, as the hardware structure of these various processors, more specifically, it is possible to use an electronic circuit in which circuit elements, such as semiconductor elements, are combined. In addition, the data read/write processing is merely an example. Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A magnetic tape in which the data band and the pair of servo bands read by a magnetic head are formed, the magnetic head comprising:
a first servo reading element pair that reads a pair of servo bands adjacent to each other via a data band having a plurality of tracks from a magnetic tape in which the data band and the pair of servo bands are formed;
a second servo reading element pair that reads the pair of servo bands at a timing different from a timing of the first servo reading element pair; and
a plurality of magnetic elements that are disposed in a straight line and perform magnetic processing on a track in accordance with a reading result of the first servo reading element pair or the second servo reading element pair among the plurality of tracks,
wherein the first servo reading element pair consists of a first servo reading element and a second servo reading element,
the second servo reading element pair consists of a third servo reading element and a fourth servo reading element,
the first servo reading element and the third servo reading element are disposed on one end side of the plurality of magnetic elements and read one servo band of the pair of servo bands, and
the second servo reading element and the fourth servo reading element are disposed on the other end side of the plurality of magnetic elements and read the other servo band of the pair of servo bands
wherein a base film of the magnetic tape is made of polyethylene terephthalate, polyethylene naphthalate, or polyamide,
wherein the pair of servo bands are used shared in a plurality of numbers of channels, and
wherein the plurality of numbers of channels are 32 channels and 64 channels.

2. The magnetic tape according to claim 1, wherein a length of the servo band in a width direction of the magnetic tape is a length common to a case in which the number of the plurality of magnetic elements corresponds to 32 channels and a case in which the number of the plurality of magnetic elements corresponds to 64 channels.

3. The magnetic tape according to claim 2, wherein:
the servo band is read by the first servo reading element pair in a case in which the number of the plurality of magnetic elements corresponds to 32 channels and the magnetic processing on the data band is performed in a forward direction, and
the servo band is read by the second servo reading element pair in a case in which the number of the plurality of magnetic elements corresponds to 32 channels and the magnetic processing on the data band is performed in a reverse direction.

4. The magnetic tape according to claim 2, wherein:
one region obtained by dividing the servo band into two regions in the width direction of the magnetic tape is read by the first servo reading element pair in a case in which the number of the plurality of magnetic elements corresponds to 64 channels and the magnetic processing on the data band is performed in a forward direction, and
the other region obtained by dividing the servo band into two regions in the width direction of the magnetic tape is read by the first servo reading element pair in a case in which the number of the plurality of magnetic elements corresponds to 64 channels and the magnetic processing on the data band is performed in a reverse direction.

5. A magnetic tape cartridge comprising:
the magnetic tape according to claim 1 accommodated therein.

6. A magnetic tape drive comprising:
the magnetic head according to claim 1; and
a control device that controls the magnetic tape and the magnetic head.

* * * * *